US010428169B2

(12) United States Patent
Tamura et al.

(10) Patent No.: US 10,428,169 B2
(45) Date of Patent: Oct. 1, 2019

(54) POLYMER, COMPOSITION, OPTICAL FILM, AND LIQUID CRYSTAL DISPLAY DEVICE

(71) Applicant: FUJIFILM Corporation, Tokyo (JP)

(72) Inventors: Akio Tamura, Kanagawa (JP); Jun Takeda, Kanagawa (JP); Yuki Matsuda, Kanagawa (JP); Nobuyuki Akutagawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/405,038

(22) Filed: Jan. 12, 2017

(65) Prior Publication Data

US 2017/0121441 A1    May 4, 2017

Related U.S. Application Data

(63) Continuation of application No. PCT/JP2015/003577, filed on Jul. 15, 2015.

(30) Foreign Application Priority Data

Jul. 18, 2014  (JP) ................. 2014-148352
Dec. 26, 2014  (JP) ................. 2014-266385

(51) Int. Cl.

| G02F 1/1333 | (2006.01) |
|---|---|
| C08F 222/22 | (2006.01) |
| C08F 20/30 | (2006.01) |
| G02F 1/13363 | (2006.01) |
| C08F 222/20 | (2006.01) |
| C09K 19/06 | (2006.01) |
| C09K 19/38 | (2006.01) |
| G02B 5/30 | (2006.01) |
| G02F 1/1334 | (2006.01) |
| C09K 19/18 | (2006.01) |
| C09K 19/32 | (2006.01) |
| C09K 19/34 | (2006.01) |
| C09K 19/40 | (2006.01) |
| C08F 222/10 | (2006.01) |
| C09K 19/04 | (2006.01) |
| G02F 1/1335 | (2006.01) |

(Continued)

(52) U.S. Cl.
CPC ............ *C08F 222/22* (2013.01); *C08F 20/30* (2013.01); *C08F 222/1006* (2013.01); *C08F 222/20* (2013.01); *C09K 19/061* (2013.01); *C09K 19/18* (2013.01); *C09K 19/32* (2013.01); *C09K 19/3477* (2013.01); *C09K 19/3488* (2013.01); *C09K 19/3491* (2013.01); *C09K 19/3852* (2013.01); *C09K 19/40* (2013.01); *G02B 5/3016* (2013.01); *G02F 1/1334* (2013.01); *G02F 1/13363* (2013.01); *C08F 2222/102* (2013.01); *C09K 2019/0429* (2013.01); *C09K 2019/0448* (2013.01); *C09K 2019/2078* (2013.01); *C09K 2019/328* (2013.01); *G02B 6/0056* (2013.01); *G02B 6/0065* (2013.01); *G02F 1/13362* (2013.01); *G02F 1/133615* (2013.01); *G02F 2001/133614* (2013.01); *G02F 2001/133633* (2013.01); *G02F 2001/133635* (2013.01); *G02F 2202/022* (2013.01)

(58) Field of Classification Search
CPC .............. G02F 1/1333; G02F 1/13362; G02F 1/133615; G02F 1/1334; G02F 1/13363; G02F 2001/133614; G02F 2001/133633; G02F 2001/133635; G02F 2202/022; C08F 20/30; C08F 222/22; C08F 20/20; C08F 20/1006; C08F 2222/102; G02B 5/3016; G02B 6/0056; G02B 6/0065; C09K 19/061; C09K 19/3852; C09K 19/18; C09K 19/32; C09K 19/3477; C09K 19/3488; C09K 19/3491; C09K 19/40; C09K 2019/0448; C09K 2019/0429; C09K 2019/2078; C09K 2019/328
USPC ..................................... 252/299.01
See application file for complete search history.

(56) References Cited

U.S. PATENT DOCUMENTS

| 8,003,005 B2 * | 8/2011 | He ................. C09K 19/0403 |
| | | 252/299.01 |
| 8,828,507 B2 * | 9/2014 | He ................. C09K 19/0403 |
| | | 252/299.01 |
| 9,475,901 B2 * | 10/2016 | Saha .................... C08F 220/30 |

(Continued)

FOREIGN PATENT DOCUMENTS

| CN | 101131436 A | 2/2008 |
| CN | 101373295 A | 2/2009 |

(Continued)

OTHER PUBLICATIONS

International Search Report issued in connection with International Patent Application No. PCT/JP2015/003577 dated Nov. 17, 2015.

(Continued)

*Primary Examiner* — Geraldina Visconti
(74) *Attorney, Agent, or Firm* — Edwards Neils, LLC; Jean C. Edwards, Esq.

(57) ABSTRACT

A polymer having a partial structure formed by performing radical polymerization with respect to a compound having a mesogenic group derived from at least one type of liquid crystal compound selected from a rod-like liquid crystal compound and a disk-like liquid crystal compound, and two or more polymerizable groups, in which the polymer is a branched polymer, and a composition containing the polymer, an optical film, and a liquid crystal display device.

11 Claims, 3 Drawing Sheets

(51) Int. Cl.
*F21V 8/00* (2006.01)
*C09K 19/20* (2006.01)

(56) References Cited

U.S. PATENT DOCUMENTS

| | | |
|---|---|---|
| 2006/0222784 A1 | 10/2006 | Saigusa et al. |
| 2007/0170394 A1 | 7/2007 | Kawamura et al. |
| 2008/0055521 A1 | 3/2008 | Mizutani et al. |
| 2008/0064879 A1 | 3/2008 | Takahashi et al. |
| 2009/0051858 A1 | 2/2009 | Nakamura et al. |
| 2010/0078592 A1 | 4/2010 | Li et al. |
| 2010/0119738 A1 | 5/2010 | Suzuki et al. |
| 2010/0222594 A1 | 9/2010 | Takahashi et al. |
| 2011/0135850 A1 | 6/2011 | Saha et al. |

FOREIGN PATENT DOCUMENTS

| | | | |
|---|---|---|---|
| CN | 101739893 A | 6/2010 | |
| CN | 102695732 A | 9/2012 | |
| CN | 102933994 A | 2/2013 | |
| JP | 06-018864 A | 1/1994 | |
| JP | 2005-257711 A | 9/2005 | |
| JP | 2006-016599 A | 1/2006 | |
| JP | 2006-076992 A | 3/2006 | |
| JP | 2006-124639 A | 5/2006 | |
| JP | 2006-307150 A | 11/2006 | |
| JP | 2007-023180 A | 2/2007 | |
| JP | 2007-131740 A | 5/2007 | |
| JP | 2007-231193 A | 9/2007 | |
| JP | 2008-257205 A | 10/2008 | |
| JP | 2010-138283 A | 6/2010 | |
| JP | 2012-087197 A | 5/2012 | |
| WO | WO-2012074047 A1 * | 6/2012 | ............... C09D 4/06 |

OTHER PUBLICATIONS

Written Opinion issued in connection with International Patent Application No. PCT/JP2015/003577 dated Nov. 17, 2015.

Tomohiro Hirano et al.; Synthesis and Characterization of Soluble Hyperbranched Polymer via Initiator-Fragment Incorporation Radical Polymerization of Divinylbenzene with Dimethyl 2,2'-Azobisisobutyrate; Journal of Applied Polymer Science; 2006; pp. 664-670; vol. 100; Wiley Periodicals, Inc.

T. Sato; Nanosize Hyperbranched Polymers; Functional Material; 2006; pp. 44-52; vol. 26, No. 8.

Office Action, issued by the State Intellectual Property Office dated Feb. 24, 2018, in connection with Chinese Patent Application No. 201580038568.5.

Office Action, issued by the Korean Intellectual Property Office (KIPO) dated Nov. 17, 2017 in connection with Korean Patent Application No. 10-2017-7001967.

Office Action, issued by the Japanese Patent Office (JPO) dated Mar. 6, 2018 in connection with Japanese Patent Application No. 2016-534284.

Office Action, issued by the State Intellectual Property Office dated Nov. 16, 2018, in connection with Chinese Patent Application No. 201580038568.5.

* cited by examiner

POLYMER, COMPOSITION, OPTICAL FILM, AND LIQUID CRYSTAL DISPLAY DEVICE

CROSS-REFERENCE TO RELATED APPLICATIONS

This application is a Continuation of PCT International Application No. PCT/JP2015/003577 filed on Jul. 15, 2015, which was published under PCT Article 21(2) in Japanese and which claims priority under 35 U.S.C. § 119(a) to Japanese Patent Application No. 2014-148352 filed on Jul. 18, 2014 and Japanese Patent Application No. 2014-266385 filed on Dec. 26, 2014. The above applications are hereby expressly incorporated by reference, in their entirety, into the present application.

BACKGROUND OF THE INVENTION

1. Field of the Invention

The present invention relates to a polymer, a composition, an optical film, and a liquid crystal display device.

2. Description of the Related Art

Recently, a polymer material has been increasingly used in various fields. According to this, properties of the surface or the interface thereof become important along with properties of the polymer as a matrix according to each field. For example, in a liquid crystal display device (LCD), a film having birefringence which is formed of an optical anisotropic body of which the orientation is immobilized by performing an orientation treatment with respect to a polymerizable liquid crystal material, and then, by performing curing with an ultraviolet ray is practically used as an optical compensation film (a phase difference plate) disposed between a liquid crystal cell and a polarizing plate. There is a case where the optical compensation film is prepared by applying a polymerizable liquid crystal material onto an orientation film. In this case, an orientation restraining force of the orientation film is imparted onto the interface in contact with the orientation film, but the orientation restraining force is not imparted onto the vicinity of the interface with air which is not in contact with the orientation film, and thus, an orientation defect occurs.

For example, in JP2006-016599A, adding a polymer containing a fluoroalkyl group into a polymerizable liquid crystal composition is proposed as one of methods for performing surface modification. It is disclosed that an optical anisotropic body having no orientation defect in the vicinity of an air interface can be provided by using such a polymer. The polymer includes a monomer having a radical polymerizable double bond as a raw material, and mono (meth)acrylate represented by General Formula (1) is described as an example of the monomer.

In addition, in JP2005-257711A, a preparation method of a phase difference plate including an optical anisotropic layer without using an orientation film is disclosed. In JP2005-257711A, monofunctional monomers are subjected to radical polymerization, and then, are subjected to a terminal conversion reaction or a polymer reaction, and thus, a monomer having a double bond is prepared, and a polymer formed by polymerizing the monomer is contained, and thus, an optical anisotropic layer is formed.

On the other hand, recently, a dendrimer, a hyperbranched polymer, or the like, a so-called 3-dimensional dendritic polymer (also referred to as a dendritic polymer) has properties different from those of a general linear polymer, and the application thereof has attracted attention. In a case where the dendritic polymer is synthesized by performing radical polymerization with respect to a material containing a divinyl monomer, the monomer is crosslinked, and thus, an undissolved and unmelted polymer is generated. Therefore, in T. Hirano et al., "Synthesis and Characterization of Soluble Hyperbranched Polymer via Initiator-Fragment Incorporation Radical Polymerization of Divinylbenzene with Dimethyl 2,2'-Azobisisobutyrate", Journal of Applied Polymer Science, Vol. 100, pp. 664-670, 2006 and T. Sato, "Nanosize Hyperbranched Polymers", Functional Material, Vol. 26, No. 8, pp. 44-52, 2006, a method of obtaining an hyperbranched polymer in which an initiator is incorporated into a polymer terminal by polymerizing a monomer in the presence of a radical polymerization initiator having a high concentration, so-called initiator incorporation radical polymerization is proposed. A manufacturing method of a hyperbranched polymer using a styrene compound having two vinyl groups and an azo-based polymerization initiator is described as an example. It is described that the polymer obtained as described above has a low viscosity and excellent solubility.

SUMMARY OF THE INVENTION

A polymer containing a fluorine atom, such as the polymer containing the fluoroalkyl group described above, for example, a fluorine-based surfactant or a silicone-based surfactant is unevenly distributed on the surface of a coated film by using the hydrophilic group, and decreases a surface tension of the coated film. In addition, such a polymer also remains on the prepared film, and thus, in a case where a laminated film is prepared by further applying an upper layer onto the film, a surface tension of a coating liquid is insufficient with respect to a hydrophilic surface of the film, and so-called cissing occurs in which the coating liquid bounces off the surface of the film at the time of performing coating, and thus, the coating is not performed.

Suppressing fluidity by increasing the viscosity of the coating liquid is considered as a method of preventing the cissing. However, in general, it is difficult to form a homogeneous coated film having a high viscosity.

In addition, in the polymer described in JP2005-257711A, the polymer is a linear polymer, and thus, in a case where the polymer is added to a composition for a coated film, compatibility deteriorates.

In consideration of the circumstances described above, an object of the present invention is to provide a novel polymer in which coating wettability is improved even at a low viscosity, and thus, cissing rarely occurs at the time of being used for forming a coated film. In addition, another object of the present invention is to provide a composition containing the polymer. Further, still another object of the present invention is to provide an optical film which can function as a support film for preparing a laminated film, and the like, and includes a surface on which cissing of a coating liquid for forming an upper layer rarely occurs, and to provide a liquid crystal display device including the optical film.

As a result of intensive studies of the present inventors for attaining the objects described above, it has been found that a polymer having a mesogenic group derived from a rod-like liquid crystal compound or a disk-like liquid crystal compound which is not examined in the related art as a branched structure is synthesized, and a composition containing the obtained polymer is used, and thus, an optical film can be obtained in which coating unevenness or cissing, and an orientation defect are reduced.

That is, the objects described above are attained by the following means.

A polymer of the present invention comprises a partial structure formed by performing radical polymerization with respect to a compound having a mesogenic group derived from at least one type of liquid crystal compound selected from a rod-like liquid crystal compound and a disk-like liquid crystal compound, and two or more polymerizable groups, and the polymer is a branched polymer.

Here, the polymer "being the branched polymer" indicates that the polymer has a 3-dimensional crosslinking structure, and at least one polymerization initiator segment is incorporated into a terminal. The polymerization initiator segment is different according to a polymerization initiator structure used at the time of polymerizing the polymer, and it is possible to confirm that a polymer segment is incorporated into the polymer by a method such as nuclear magnetic resonance (NMR) spectrum measurement or infrared (IR) spectrum measurement, mass analysis measurement, or element analysis measurement.

It is preferable that the compound having the mesogenic group derived from the rod-like liquid crystal compound and the two or more polymerizable groups is a compound represented by General Formula (X) described below.

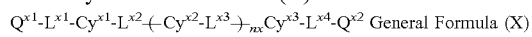

General Formula (X)

In General Formula (X), $Q^{x1}$ and $Q^{x2}$ each independently represent a polymerizable group, $L^{x1}$ and $L^{x4}$ each independently represent a divalent linking group, $L^{x2}$ and $L^{x3}$ each independently represent a single bond or a divalent linking group, $Cy^{x1}$, $Cy^{x2}$, and $Cy^{x3}$ represent a divalent cyclic group, and nx represents an integer of 0 to 3.

It is preferable that the compound having the mesogenic group derived from the disk-like liquid crystal compound and the two or more polymerizable groups is a compound represented by General Formula (I) described below.

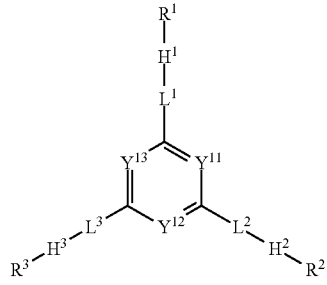

General Formula (I)

In General Formula (I), $Y^{11}$, $Y^{12}$, and $Y^{13}$ each independently represent a methine which may be substituted or a nitrogen atom, $L^1$, $L^2$, and $L^3$ each independently represent a single bond or a divalent linking group, $H^1$, $H^2$, and $H^3$ each independently represent General Formula (I-A) described below or General Formula (I-B) described below, and $R^1$, $R^2$, and $R^3$ each independently represent General Formula (I-R) described below.

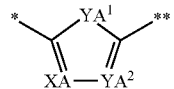

General Formula (I-A)

In General Formula (I-A), $YA^1$ and $YA^2$ each independently represent methine which may have a substituent or a nitrogen atom, XA represents an oxygen atom, a sulfur atom, methylene, or imino, * represents a bonding position with respect to an $L^1$ side to an $L^3$ side in General Formula (I) described above, and ** represents a bonding position with respect to an $R^1$ side to a $R^3$ side in General Formula (I) described above.

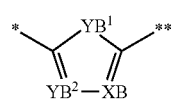

General Formula (I-B)

In General Formula (I-B), $YB^1$ and $YB^2$ each independently represent methine which may have a substituent or a nitrogen atom, XB represents an oxygen atom, a sulfur atom, methylene, or imino, * represents a bonding position with respect to an $L^1$ side to an $L^3$ side in General Formula (I) described above, and ** represents a bonding position with respect to an $R^1$ side to a $R^3$ side in General Formula (I) described above.

General Formula (I-R)

In General Formula (I-R), * represents a bonding position with respect to an $H^1$ side to an $H^3$ side in General Formula (I), $L^{r1}$ represents a single bond or a divalent linking group, $Q^2$ represents a divalent group having at least one type of cyclic structure, n1 represents an integer of 0 to 4, $L^{r2}$ and $L^{r3}$ each independently represent a divalent linking group, $Q^1$ represents a polymerizable group or a hydrogen atom, and here, at least two of a plurality of $Q^1$'s represent a polymerizable group.

It is preferable that the polymer of the present invention has a partial structure formed by performing a polymerization reaction with respect to a compound having a fluorine atom.

It is preferable that the compound having the fluorine atom is a compound represented by General Formula (a) described below.

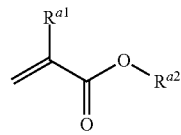

General Formula (a)

In General Formula (a), $R^{a1}$ represents a hydrogen atom or an alkyl group having 1 to 20 carbon atoms, and $R^{a2}$ represents an alkyl group having 1 to 20 carbon atoms or an alkenyl group having 1 to 20 carbon atoms in which at least one carbon atom has a fluorine atom as a substituent.

A weight-average molecular weight of the polymer of the present invention is 1,000 to 300,000 in terms of polystyrene by using a gel permeation chromatography (GPC).

A composition of the present invention comprises the polymer the present invention.

The composition of the present invention may further comprise a liquid crystal compound.

In the composition of the present invention, the liquid crystal compound may be a polymerizable liquid crystal compound.

It is preferable that the polymerizable liquid crystal compound of the present invention is at least one type of polymerizable liquid crystal compound selected from a polymerizable rod-like liquid crystal compound and a polymerizable disk-like liquid crystal compound.

An optical film of the present invention comprises a cholesteric liquid crystal layer containing the polymer of the present invention on a support.

The optical film of the present invention may have a laminated structure formed by laminating a plurality of cholesteric liquid crystal layers.

Here, the cholesteric liquid crystal layer indicates a layer of which a liquid crystal compound phase is immobilized in cholesteric orientation by coating and drying a composition containing a liquid crystal compound, and then, curing the composition.

It is preferable that in the plurality of cholesteric liquid crystal layers, at least one cholesteric liquid crystal layer is a cholesteric liquid crystal layer containing a rod-like liquid crystal compound, and at least one cholesteric liquid crystal layer is a cholesteric liquid crystal layer containing a disk-like liquid crystal compound.

In the optical film of the present invention, the cholesteric liquid crystal layer containing the rod-like liquid crystal compound and the cholesteric liquid crystal layer containing the disk-like liquid crystal compound may be in contact with each other.

A liquid crystal display device of the present invention comprises at least a backlight unit including the optical film of the present invention; and a liquid crystal cell.

The polymer of the present invention has the partial structure formed by performing radical polymerization with respect to the compound having the mesogenic group derived from at least one type of liquid crystal compound selected from the rod-like liquid crystal compound and the disk-like liquid crystal compound, and the two or more polymerizable groups, and the polymer is the branched polymer, and according to such a configuration, in a case where the polymer of the present invention is used in a liquid for forming a coated film, wettability of the liquid for forming a coated film is improved, and cissing rarely occurs. Further, in a case where an upper layer is further applied onto the surface of the coated film, cissing of a coating liquid rarely occurs.

In addition, by using the polymer or the composition the present invention, it is possible to obtain an optical film in which cissing of the coating liquid for forming an upper layer rarely occurs, and surface conditions are excellent, and an orientation defect is reduced.

DESCRIPTION OF THE PREFERRED EMBODIMENTS

Figure 1:
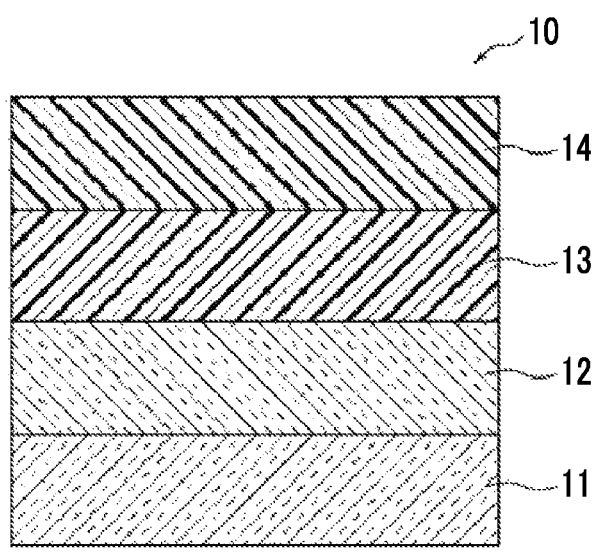
FIG. 1 is a schematic sectional view of an optical film of an embodiment according to the present invention.

The following description is based on representative embodiments of the present invention, but the present invention is not limited to such embodiments. Furthermore, herein, a numerical range represented by using "to" indicates a range including numerical values before and after "to" as the lower limit value and the upper limit value.

[Polymer]

A polymer of the present invention has a partial structure formed by performing radical polymerization with respect to a compound having a mesogenic group derived from at least one type of liquid crystal compound selected from a rod-like liquid crystal compound and a disk-like liquid crystal compound, and two or more polymerizable groups, and is a branched polymer. The polymer of the present invention is a polymer having the mesogenic group derived from the rod-like liquid crystal compound or the disk-like liquid crystal compound as a branched structure (hereinafter, also referred to as a mesogenic group-containing polymer), and thus, in order to have a plurality of branched structures in the molecules, entanglement between molecular chains of the polymer decreases, and solubility with respect to various solvents or compatibility with respect to a matrix resin is high, compared to a polymer liquid crystal polymer of the related art. For this reason, by using a composition containing the mesogenic group-containing polymer of the present invention, it is possible to form a coated film having excellent surface properties.

The mesogenic group-containing polymer of the present invention contains the mesogenic group derived from the rod-like liquid crystal compound or the disk-like liquid crystal compound.

Azomethines, azoxys, cyanobiphenyls, cyanophenyl esters, benzoic acid esters, cyclohexane carboxylic acid phenyl esters, cyanophenyl cyclohexanes, phenyl pyrimidines substituted with cyano, phenyl pyrimidines substituted with alkoxy, phenyl dioxanes, tolans, and alkenyl cyclohexyl benzonitriles are preferably used as the rod-like liquid crystal compound forming the mesogenic group in the mesogenic group-containing polymer of the present invention.

Compounds described in Makromol. Chem., Vol. 190, P. 2255 (1989), Advanced Materials Vol. 5, P. 107 (1993), U.S. Pat. Nos. 4,683,327A, 5,622,648A, 5,770,107A, WO95/22586A, WO95/24455A, WO97/00600A, WO98/23580A, WO98/52905A, JP1989-272551A (JP-H01-272551A), JP1994-16616A (JP-H06-16616A), JP1995-110469A (JP-H07-110469A), JP1999-80081A (JP-H11-80081A), JP2001-329873A, and the like can be used as the rod-like liquid crystal compound. In addition, it is preferable to have a structure derived from a compound represented by General Formula (X) described below as the mesogenic group derived from the rod-like liquid crystal compound.

$$Q^{x1}\text{-}L^{x1}\text{-}Cy^{x1}\text{-}L^{x2}\text{-}(Cy^{x2}\text{-}L^{x3})_{nx}\text{-}Cy^{x3}\text{-}L^{x4}\text{-}Q^{x2} \quad \text{General Formula (X)}$$

In the formula, $Q^{x1}$ and $Q^{x2}$ each independently represent a polymerizable group, $L^{x1}$ and $L^{x4}$ each independently represent a divalent linking group, $L^{x2}$ and $L^{x3}$ each independently represent a single bond or a divalent linking group, $Cy^{x1}$, $Cy^{x2}$, and $Cy^{x3}$ represent a divalent cyclic group, and nx represents an integer of 0 to 3.

Hereinafter, the rod-like liquid crystal compound represented by General Formula (X) will be further described.

In the formula, $Q^{x1}$ and $Q^{x2}$ each independently represent a polymerizable group. It is preferable that a polymerization reaction of the polymerizable group is addition polymerization. In other words, it is preferable that the polymerizable group is a functional group which can be subjected to an addition polymerization reaction. Examples of the polymerizable group include Formulas (M-1) to (M-6) described below.

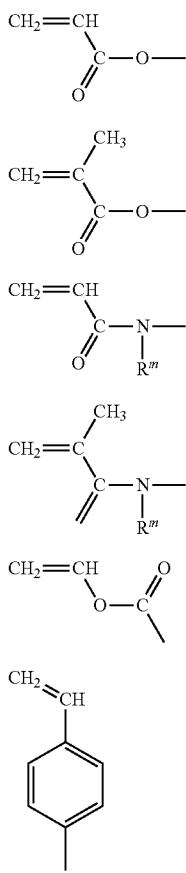

(M-1)
(M-2)
(M-3)
(M-4)
(M-5)
(M-6)

In Formulas (M-3) and (M-4), $R^m$ represents a hydrogen atom or an alkyl group having 1 to 20 carbon atoms, is more preferably an alkyl group having 1 to 7 carbon atoms, and is most preferably a hydrogen atom or a methyl group.

In Formulas (M-1) to (M-6) described above, (M-1) or (M-2) is preferable, and (M-1) is more preferable.

$L^{X1}$ and $L^{X4}$ each independently represent a divalent linking group. It is preferable that $L^{X1}$ and $L^{X4}$ are each independently a divalent linking group selected from the group consisting of —O—, —S—, —CO—, —NR$^{x1}$—, —C=N—, a divalent chained group, a divalent cyclic group, and a combination thereof. $R^{x1}$ is a hydrogen atom or an alkyl group having 1 to 7 carbon atoms. Examples of the divalent linking group formed of the combination will be described or Cy$^{X3}$).

Lx-1: —C(=O)O-Divalent Chained Group-O—
Lx-2: —C(=O)O-Divalent Chained Group-OC(=O)—
Lx-3: —C(=O)O-Divalent Chained Group-OC(=O)O—
Lx-4: —C(=O)O-Divalent Chained Group-O-Divalent Cyclic Group-
Lx-5: —C(=O)O-Divalent Chained Group-O-Divalent Cyclic Group-C(=O)O—
Lx-6: —C(=O)O-Divalent Chained Group-O-Divalent Cyclic Group-OC(=O)—
Lx-7: —C(=O)O-Divalent Chained Group-O-Divalent Cyclic Group-Divalent Chained Group-
Lx-8: —C(=O)O-Divalent Chained Group-O-Divalent Cyclic Group-Divalent Chained Group-C(=O)O—
Lx-9: —C(=O)O-Divalent Chained Group-O-Divalent Cyclic Group-Divalent Chained Group-OC(=O)—
Lx-10: —C(=O)O-Divalent Chained Group-OC(=O)-Divalent Cyclic Group-
Lx-11: —C(=O)O-Divalent Chained Group-OC(=O)-Divalent Cyclic Group-C(=O)O—
Lx-12: —C(=O)O-Divalent Chained Group-OC(=O)-Divalent Cyclic Group-OC(=O)—
Lx-13: —C(=O)O-Divalent Chained Group-OC(=O)-Divalent Cyclic Group-Divalent Chained Group-
Lx-14: —C(=O)O-Divalent Chained Group-OC(=O)-Divalent Cyclic Group-Divalent Chained Group-C(=O)O—
Lx-15: —C(=O)O-Divalent Chained Group-OC(=O)-Divalent Cyclic Group-Divalent Chained Group-OC(=O)—
Lx-16: —C(=O)O-Divalent Chained Group-OC(=O)O-Divalent Cyclic Group-
Lx-17: —C(=O)O-Divalent Chained Group-OC(=O)O-Divalent Cyclic Group-C(=O)O—
Lx-18: —C(=O)O-Divalent Chained Group-OC(=O)O-Divalent Cyclic Group-OC(=O)—
Lx-19: —C(=O)O-Divalent Chained Group-OC(=O)O-Divalent Cyclic Group-Divalent Chained Group-
Lx-20: —C(=O)O-Divalent Chained Group-OC(=O)O-Divalent Cyclic Group-Divalent Chained Group-C(=O)O—
Lx-21: —C(=O)O-Divalent Chained Group-OC(=O)O-Divalent Cyclic Group-Divalent Chained Group-OC(=O)—

The divalent chained group indicates an alkylene group, a substituted alkylene group, an alkenylene group, a substituted alkenylene group, an alkynylene group, and a substituted alkynylene group. The alkylene group, the substituted alkylene group, the alkenylene group, and the substituted alkenylene group are preferable, and the alkylene group and the alkenylene group are more preferable.

The alkylene group may have a branch. The number of carbon atoms of the alkylene group is preferably 1 to 12, is more preferably 2 to 10, and is most preferably 2 to 8.

An alkylene portion of the substituted alkylene group is identical to the alkylene group described above. Examples of a substituent include a halogen atom.

The alkenylene group may have a branch. The number of carbon atoms of the alkenylene group is preferably 2 to 12, is more preferably 2 to 10, and is most preferably 2 to 8.

An alkenylene portion of the substituted alkenylene group is identical to the alkenylene group described above. Examples of a substituent include a halogen atom.

The alkynylene group may have a branch. The number of carbon atoms of the alkynylene group is preferably 2 to 12, is more preferably 2 to 10, and is most preferably 2 to 8.

An alkynylene portion of the substituted alkynylene group is identical to the alkynylene group described above. Examples of a substituent include a halogen atom.

Specific examples of the divalent chained group include ethylene, trimethylene, propylene, tetramethylene, 2-methyl-tetramethylene, pentamethylene, hexamethylene, octamethylene, 2-butenylene, 2-butynylene, and the like.

The definition and the example of the divalent cyclic group are identical to the definition and the example of Cy$^{x1}$, Cy$^{x2}$, and Cy$^{x3}$ described below.

$L^{X2}$ and $L^{X3}$ each independently represent a single bond or a divalent linking group. It is preferable that $L^{X2}$ and $L^{X3}$ are each independently a divalent linking group selected from the group consisting of —O—, —S—, —CO—, —NR$^{x2}$—, —C=N—, a divalent chained group, a divalent cyclic group, and a combination thereof, or a single bond. $R^{x2}$ described above is a hydrogen atom or an alkyl group having 1 to 7 carbon atoms, is preferably a hydrogen atom or an alkyl group having 1 to 4 carbon atoms, is more preferably a hydrogen atom, a methyl group, or an ethyl group, and is most preferably a hydrogen atom. The definition of the divalent chained group and the divalent cyclic group is identical to the definition in $L^{X1}$ and $L^{X4}$.

Examples of the divalent linking group which is preferable as $L^{X2}$ or $L^{X3}$ include —C(=O)O—, —OC(=O)—, —OC(=O)O—, —OC(=O)NR$^{x2}$—, —COS—, —SCO—, —CONR$^{x2}$—, —NR$^{x2}$CO—, —(CR$^{xa}$R$^{xb}$)jx-, —C=C—C(=O)O—, —C=N—, —C=N—N=C—, and the like.

Here, $R^{xa}$ and $R^{xb}$ each independently represent a hydrogen atom or an alkyl group (for example, an alkyl group having 1 to 3 carbon atoms, and preferably a methyl group), and jx represents an integer of greater than or equal to 1, and is preferably an integer in a range of 1 to 3.

In the compound represented by General Formula (X), nx represents 0, 1, 2, or 3. In a case where nx is 2 or 3, a plurality of $L^{X3}$'s may be identical to each other or different from each other, and a plurality of $Cy^{X2}$'s may also be identical to each other or different from each other. nx is preferably 1 or 2, and is more preferably 1.

In the compound represented by General Formula (X), $Cy^{X1}$, $Cy^{X2}$, and $Cy^{X3}$ are each independently a divalent cyclic group. A ring included in the divalent cyclic group is preferably a 5-membered ring, a 6-membered ring, or a 7-membered ring, is more preferably a 5-membered ring or a 6-membered ring, and is most preferably a 6-membered ring. The ring included in the cyclic group may be a fused ring. Here, a monocyclic ring is more preferable than the fused ring.

The ring included in the cyclic group may be any one of an aromatic ring, aliphatic ring, and a heterocyclic ring. Examples of the aromatic ring include a benzene ring and a naphthalene ring. Examples of the aliphatic ring include a cyclohexane ring. Examples of the heterocyclic ring include a pyridine ring and a pyrimidine ring.

1,4-phenylene is preferable as a cyclic group having a benzene ring. Naphthalene-1,5-diyl and naphthalene-2,6-diyl are preferable as a cyclic group having a naphthalene ring. 1,4-cyclohexylene is preferable as a cyclic group having a cyclohexane ring. Pyridine-2,5-diyl is preferable as a cyclic group having a pyridine ring. Pyrimidine-2,5-diyl is preferable as a cyclic group having a pyrimidine ring.

The cyclic group may have a substituent. Examples of the substituent include a halogen atom, a cyano group, a nitro group, an alkyl group having 1 to 5 carbon atoms, an alkyl group having 1 to 5 carbon atoms which is substituted with halogen, an alkoxy group having 1 to 5 carbon atoms, an alkyl thio group having 1 to 5 carbon atoms, an acyloxy group having 2 to 6 carbon atoms, an alkoxy carbonyl group having 2 to 6 carbon atoms, a carbamoyl group, a carbamoyl group having 2 to 6 carbon atoms which is substituted with alkyl, and an acyl amino group having 2 to 6 carbon atoms.

A structure containing at least one type selected from the group consisting of a compound represented by General Formula (X-I) described below and a compound represented by General Formula (X-II) described below is most preferable as the structure derived from the compound represented by General Formula (X).

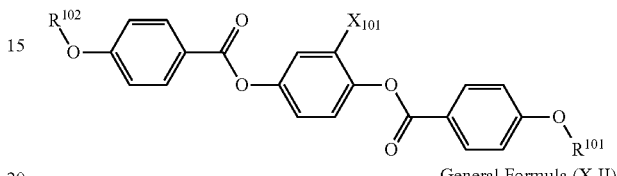

General Formula (X-I)

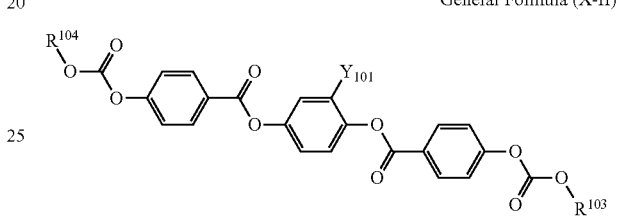

General Formula (X-II)

In General Formula (X-I) and General Formula (X-II), $R^{101}$ to $R^{104}$ each independently represent a polymerizable group, and $X_{101}$ and $Y_{101}$ each independently represent a hydrogen atom, a methyl group, an ethyl group, a halogen group, a fluorinated alkyl group, or an aldehyde group. Examples of the halogen group include a chlorine atom and a bromine atom.

The definition of $R^{101}$ to $R^{104}$ is identical to the definition of $Q^{x1}$ and $Q^{x4}$, and it is preferable that $R^{101}$ to $R^{104}$ are a group represented by —(CH$_2$)ny-O(O=)C—CH=C(R$^{xc}$R$^{xd}$). Here, it is preferable that $R^{xc}$ and $R^{xd}$ each independently represent a hydrogen atom or an alkyl group (for example, an alkyl group having 1 to 3 carbon atoms, and preferably a methyl group), and ny is an integer of 2 to 8.

In General Formula (X-I) or (X-II), it is preferable that $X_{101}$ and $Y_{101}$ represent a methyl group from the viewpoint of suppressing crystal precipitation. It is preferable that ny is an integer of 4 to 8 from the viewpoint of exhibiting properties as a liquid crystal.

Hereinafter, examples of the compound represented by General Formula (X) will be described. The present invention is not limited thereto.

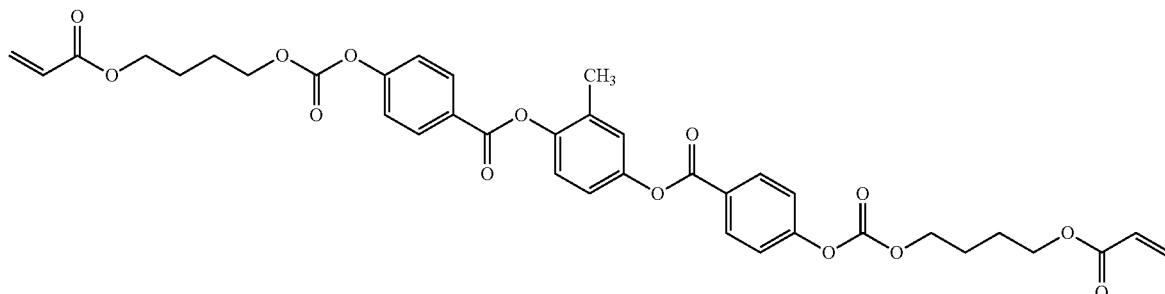

(X-1)

(X-2)
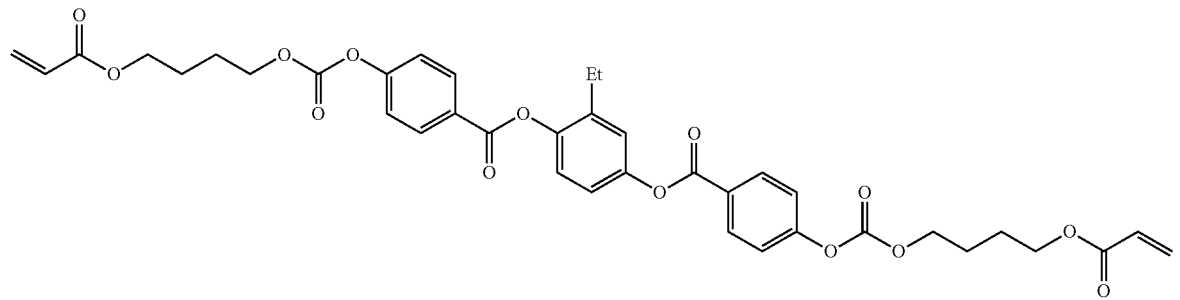
(X-3)
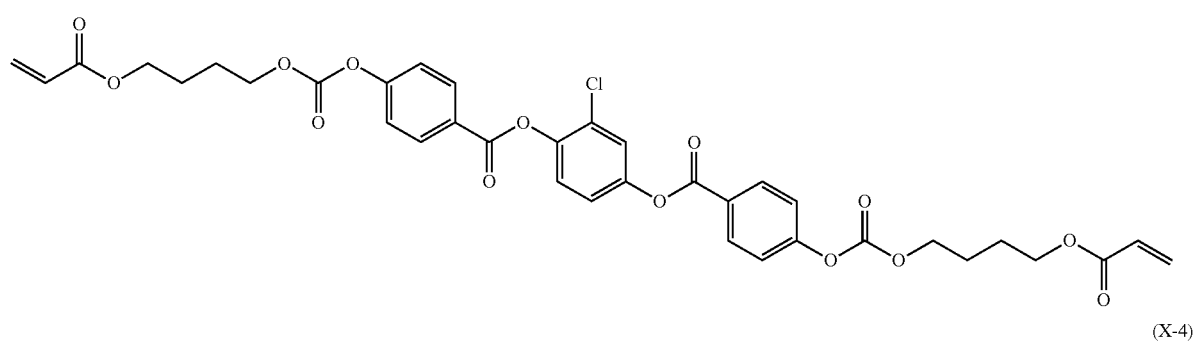
(X-4)
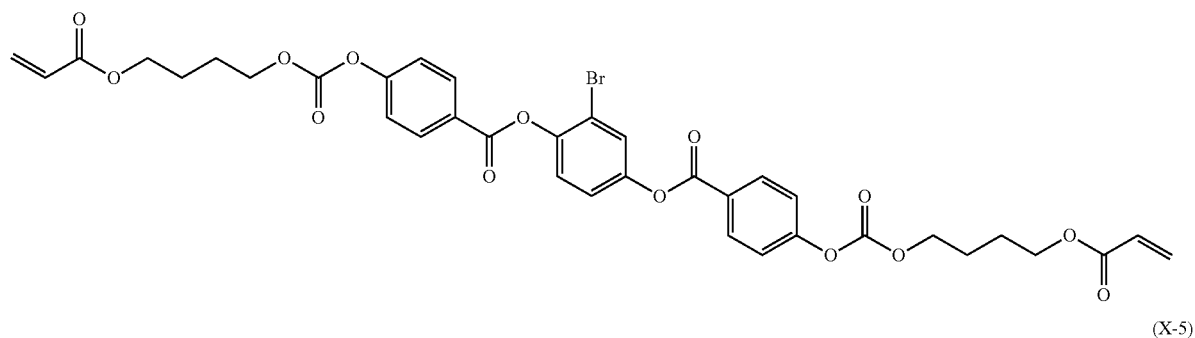
(X-5)
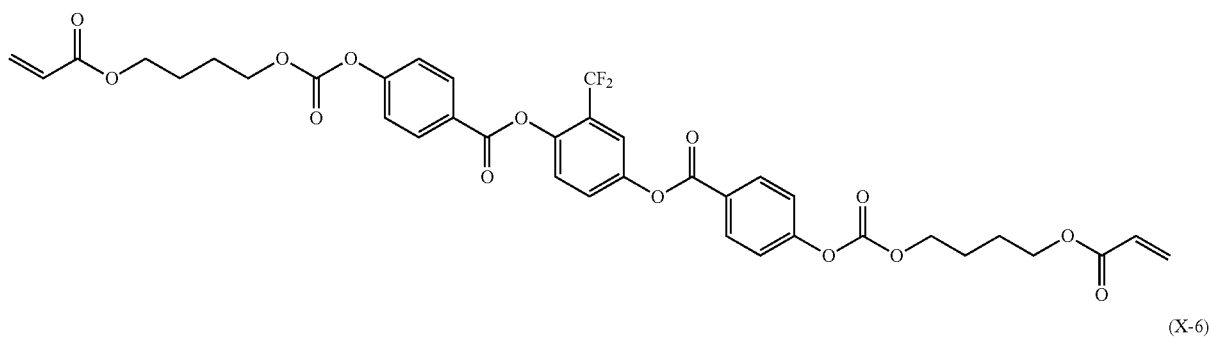
(X-6)
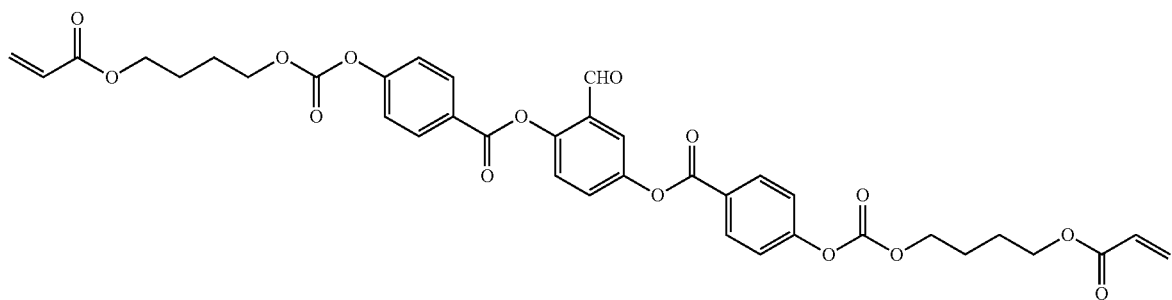

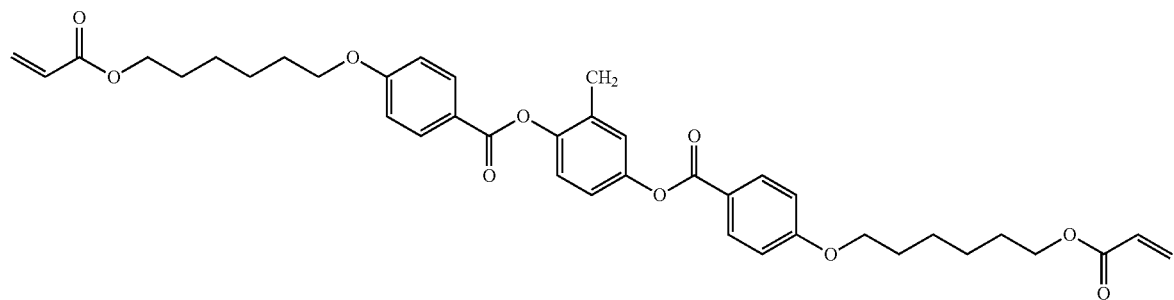
(X-7)
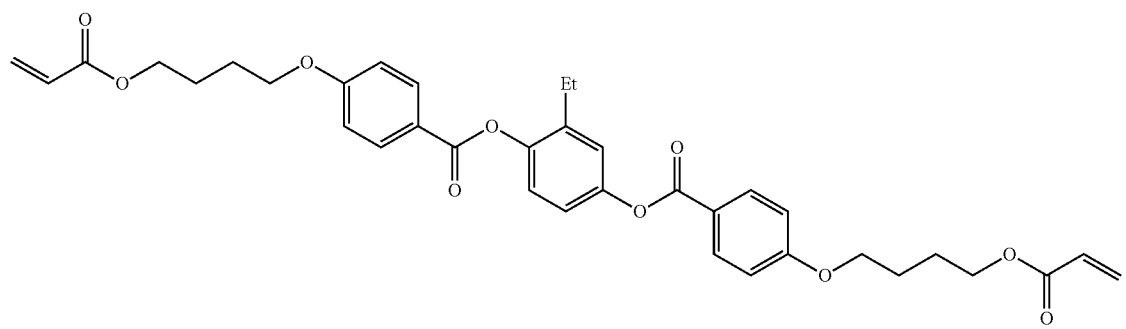
(X-8)
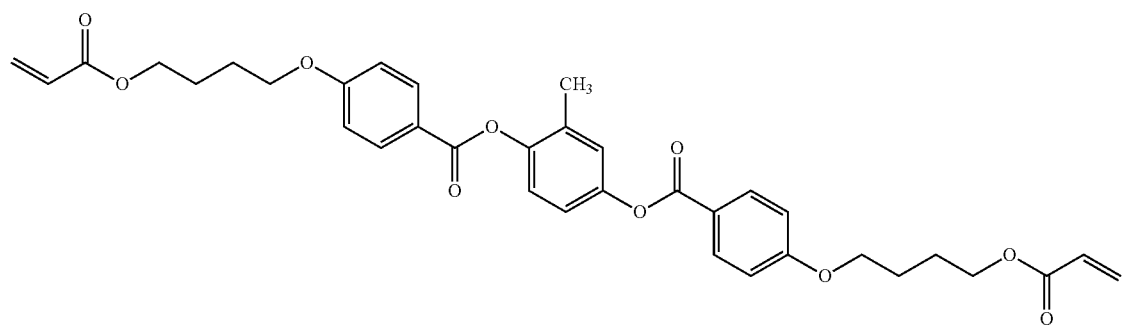
(X-9)
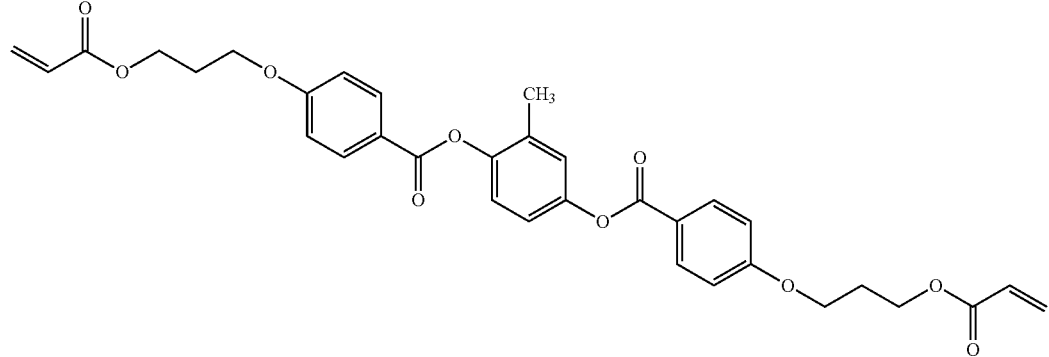
(X-10)

-continued
(X-11)
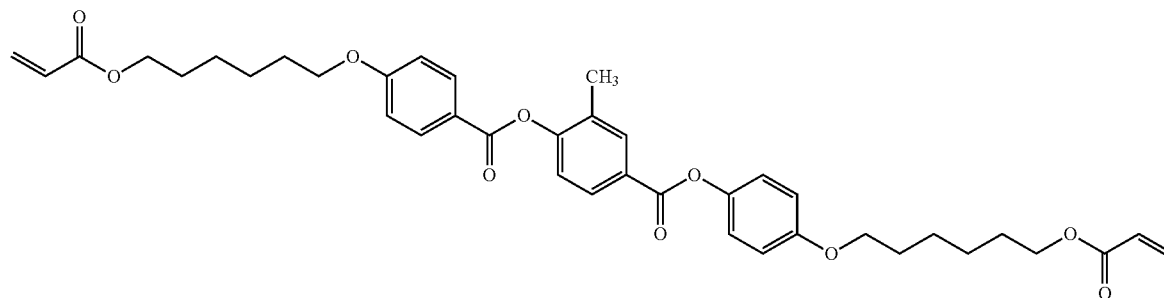
(X-12)
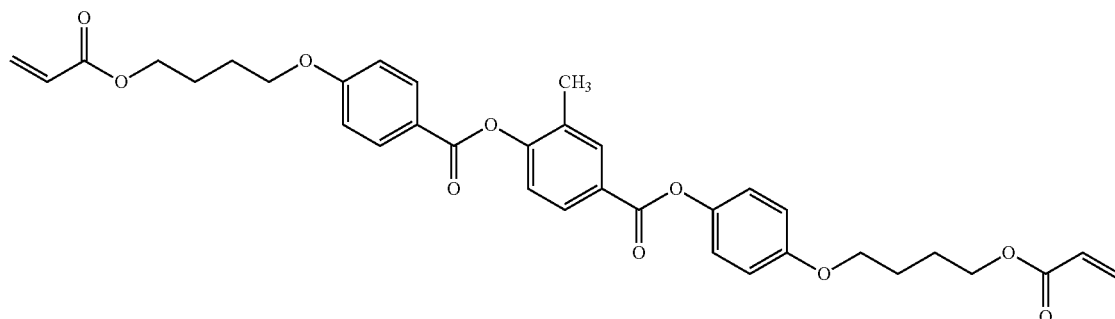
(X-13)
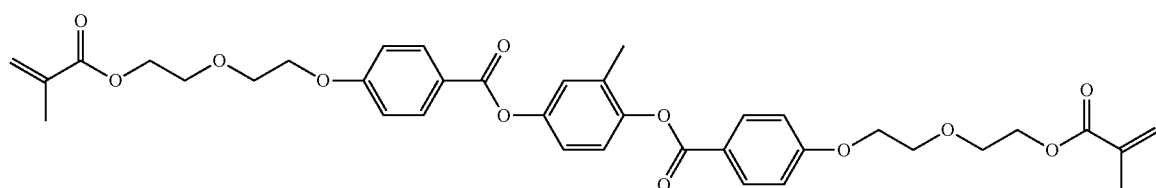
(X-14)
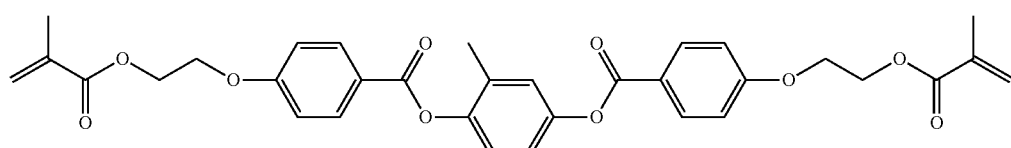
(X-15)
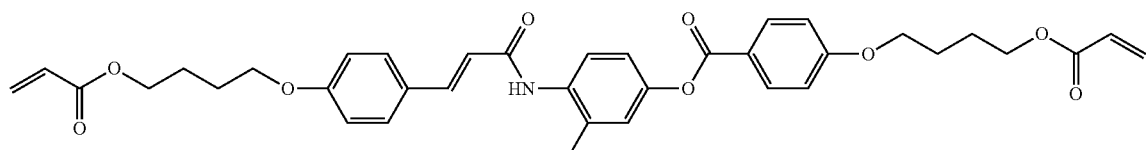
(X-16)
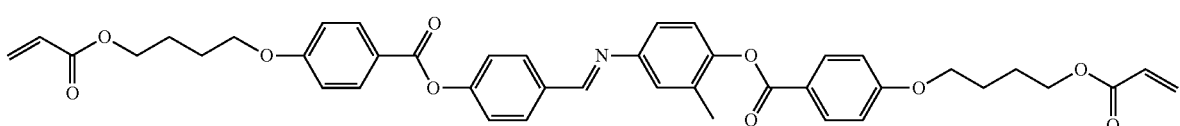
(X-17)
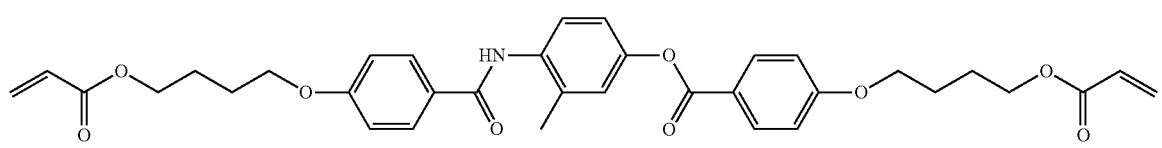

-continued
(X-18)
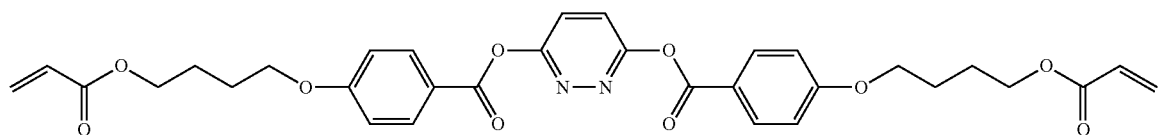
(X-19)
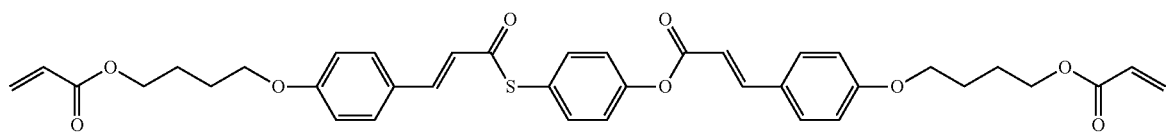
(X-20)
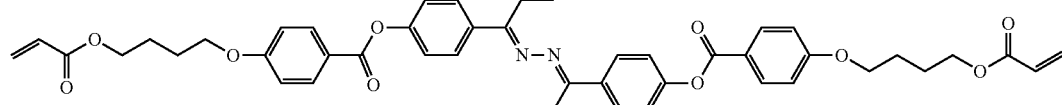
(X-21)
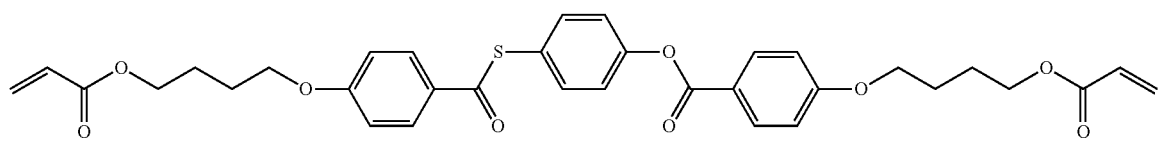
(X-22)
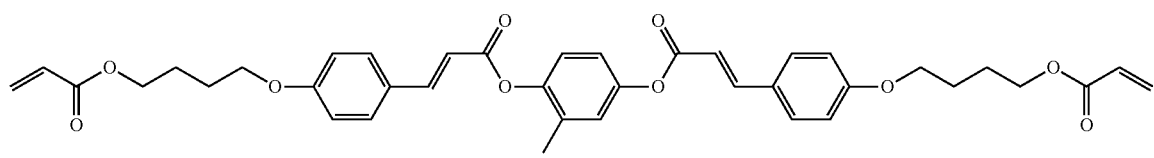
(X-23)
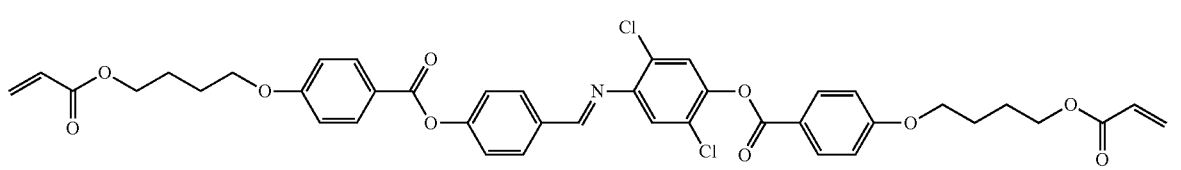
(X-24)
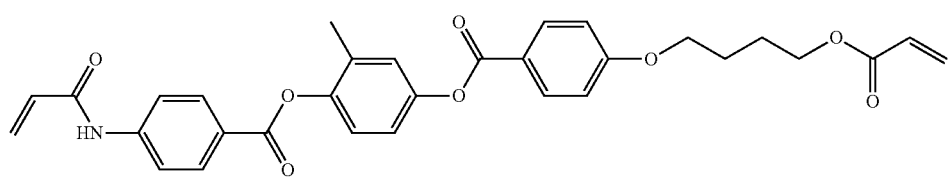
(X-25)
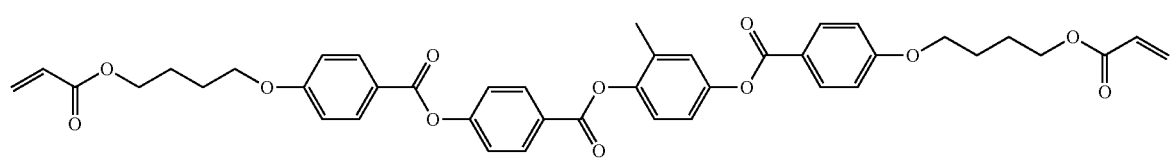
(X-26)
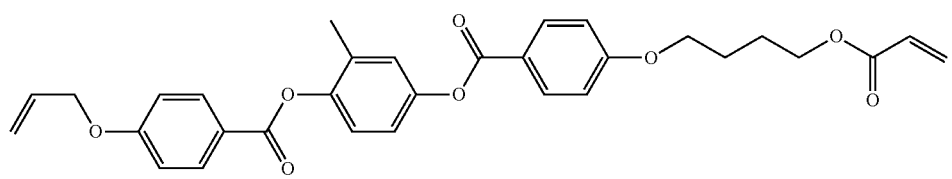

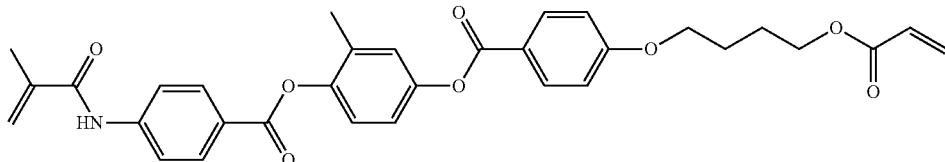

(X-27)

A mesogenic group having a structure derived from a compound represented by General Formula (I) described below is also preferable as the mesogenic group derived from the disk-like liquid crystal compound.

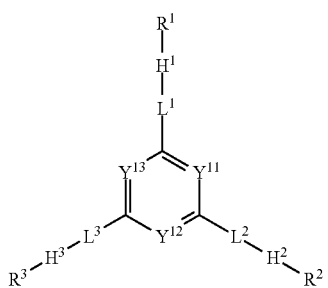

General Formula (I)

In General Formula (I), $Y^{11}$, $Y^{12}$, and $Y^{13}$ each independently represent methine which may have a substituent or a nitrogen atom, $L^1$, $L^2$, and $L^3$ each independently represent a single bond or a divalent linking group, and $H^1$, $H^2$, and $H^3$ each independently represent a group of General Formula (I-A) or (I-B).

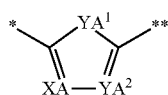

General Formula (I-A)

In General Formula (I-A), $YA^1$ and $YA^2$ each independently represent methine which may have a substituent or a nitrogen atom, XA represents an oxygen atom, a sulfur atom, methylene, or imino, * represents a bonding position with respect to an $L^1$ side to an $L^3$ side in General Formula (I) described above, and ** represents a bonding position with respect to an $R^1$ side to an $R^3$ side in General Formula (I) described above.

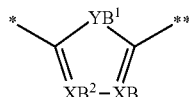

General Formula (I-B)

In General Formula (I-B), $YB^1$ and $YB^2$ each independently represent methine which may have a substituent or a nitrogen atom, XB represents an oxygen atom, a sulfur atom, methylene, or imino, * represents a bonding position with respect to an $L^1$ side to an $L^3$ side in General Formula (I) described above, and ** represents a bonding position with respect to an $R^1$ side to an $R^3$ side in General Formula (I) described above.

$R^1$, $R^2$, and $R^3$ each independently represent General Formula (I-R) described below.

$$*{-}(L^{r1}{-}Q^2{-})_{n1}L^{r2}{-}L^{r3}{-}Q^1 \qquad \text{General Formula (I-R)}$$

In General Formula (I-R), * represents a bonding position with respect to an $H^1$ side to an $H^3$ side in General Formula (I), $L^{r1}$ represents a single bond or a divalent linking group, $Q^2$ represents a divalent group (a cyclic group) having at least one type of cyclic structure, n1 represents an integer of 0 to 4, $L^{r2}$ and $L^{r3}$ each independently represent a divalent linking group, $Q^1$ represents a polymerizable group or a hydrogen atom, and at least two of a plurality of $Q^1$'s represent a polymerizable group.

In General Formula (I), $Y^{11}$, $Y^{12}$, and $Y^{13}$ each independently represent methine which may have a substituent or a nitrogen atom, and the methine which may have a substituent is preferable, and un-substituted methine is more preferable.

Preferred examples of the substituent that the methine may have can include an alkyl group, an alkoxy group, an aryloxy group, an acyl group, an alkoxy carbonyl group, an acyloxy group, an acyl amino group, an alkoxy carbonyl amino group, an alkyl thio group, an aryl thio group, a halogen atom, and a cyano group. In the substituents, the alkyl group, the alkoxy group, the alkoxy carbonyl group, the acyloxy group, the halogen atom, and the cyano group are more preferable, and an alkyl group having 1 to 12 carbon atoms, an alkoxy group having 1 to 12 carbon atoms, an alkoxy carbonyl group having 2 to 12 carbon atoms, an acyloxy group having 2 to 12 carbon atoms, the halogen atom, and the cyano group are even more preferable.

$L^1$, $L^2$, and $L^3$ each independently represent a single bond or a divalent linking group.

In a case where $L^1$, $L^2$, and $L^3$ are the divalent linking group, it is preferable that $L^1$, $L^2$, and $L^3$ are each independently a divalent linking group selected from the group consisting of —O—, —S—, —C(=O)—, —NR$^7$—, —CH=CH—, a divalent cyclic group, and a combination thereof. $R^7$ described above is a hydrogen atom or an alkyl group having 1 to 7 carbon atoms, is preferably a hydrogen atom or an alkyl group having 1 to 4 carbon atoms, is more preferably a hydrogen atom, a methyl group, or an ethyl group, and is most preferably a hydrogen atom.

The divalent cyclic group of $L^1$, $L^2$, and $L^3$ is a divalent linking group having at least one type of cyclic structure (hereinafter, also referred to as a cyclic group). The cyclic group is preferably a 5-membered ring, a 6-membered ring, or a 7-membered ring, is more preferably a 5-membered ring or a 6-membered ring, and is most preferably a 6-membered ring. A ring included in the cyclic group may be a fused ring. Here, a monocyclic ring is more preferable than the fused ring. In addition, the ring included in the cyclic group may be any one of an aromatic ring, an aliphatic ring, and a heterocyclic ring. Preferred examples of the aromatic ring include a benzene ring and a naphthalene ring. Preferred examples of the aliphatic ring include a cyclohexane ring. A ring containing at least one of a sulfur atom, a nitrogen atom, or an oxygen atom is preferable as the heterocyclic ring, and preferred examples of the heterocyclic ring include a pyridine ring, a pyrimidine ring, and an oxadiazole ring. The cyclic group is more preferably an aromatic ring and a heterocyclic ring. Furthermore, it is more preferable that the divalent cyclic group of the present invention is a divalent linking group formed of only a cyclic structure (here, including a substituent) (the same applies to the following).

In the divalent cyclic group represented by $L^1$, $L^2$, and $L^3$, a 1,4-phenylene group is preferable as a cyclic group having a benzene ring. A naphthalene-1,5-diyl group and a naphthalene-2,6-diyl group are preferable as a cyclic group having a naphthalene ring. A 1,4-cyclohexylene group is preferable as a cyclic group having a cyclohexane ring. A pyridine-2,5-diyl group is preferable as a cyclic group having a pyridine ring. A pyrimidine-2,5-diyl group is preferable as a cyclic group having a pyrimidine ring. A 1,2,4-oxadiazole-3,5-diyl group is preferable as a cyclic group having an oxadiazole ring.

The divalent cyclic group represented by $L^1$, $L^2$, and $L^3$ may have a substituent. Examples of the substituent include a halogen atom (preferably, a fluorine atom and a chlorine atom), a cyano group, a nitro group, an alkyl group having 1 to 16 carbon atoms, an alkenyl group having 2 to 16 carbon atoms, an alkynyl group having 2 to 16 carbon atoms, an alkyl group having 1 to 16 carbon atoms which is substituted with halogen, an alkoxy group having 1 to 16 carbon atoms, an acyl group having 2 to 16 carbon atoms, an alkyl thio group having 1 to 16 carbon atoms, an acyloxy group having 2 to 16 carbon atoms, an alkoxy carbonyl group having 2 to 16 carbon atoms, a carbamoyl group, a carbamoyl group having 2 to 16 carbon atoms which is substituted with an alkyl group, and an acyl amino group having 2 to 16 carbon atoms.

A single bond, *—O—C(=O)—, *—C(=O)—O—, *—CH=CH—, *-Divalent Cyclic Group-, *—O—C(=O)-Divalent Cyclic Group-, *—C(=O)—O-Divalent Cyclic Group-, *—CH=CH-Divalent Cyclic Group-, *—C≡C-Divalent Cyclic Group-, *-Divalent Cyclic Group-O—C(=O)—, *-Divalent Cyclic Group-C(=O)—O—, *-Divalent Cyclic Group-CH=CH—, and *-Divalent Cyclic Group-C≡C— are preferable as $L^1$, $L^2$, and $L^3$. In particular, the single bond, *—CH=CH—, *—C≡C—, *—CH=CH-Divalent Cyclic Group-, and *—C≡C-Divalent Cyclic Group- are preferable, and the single bond is most preferable. Here, * represents a bonding position with respect to a 6-membered ring side including $Y^{11}$, $Y^{12}$, and $Y^{13}$ in General Formula (I).

In General Formula (I), $H^1$, $H^2$, and $H^3$ each independently represent a group of General Formula (I-A) or (I-B).

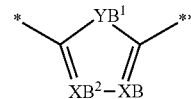

General Formula (I-A)

In General Formula (I-A), $YA^1$ and $YA^2$ each independently represent methine which may have a substituent or a nitrogen atom, XA represents an oxygen atom, a sulfur atom, methylene, or imino, * represents a bonding position with respect to an $L^1$ side to an $L^3$ side in General Formula (I) described above, and ** represents a bonding position with respect to an $R^1$ side to an $R^3$ side in General Formula (I) described above.

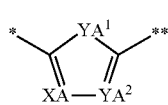

General Formula (I-B)

In General Formula (I-B), $YB^1$ and $YB^2$ each independently represent methine which may have a substituent or a nitrogen atom, XB represents an oxygen atom, a sulfur atom, methylene, or imino, * represents a bonding position with respect to an L' side to an $L^3$ side in General Formula (I) described above, and ** represents a bonding position with respect to an $R^1$ side to an $R^3$ side General Formula (I) described above.

$R^1$, $R^2$, and $R^3$ each independently represent General Formula (I-R) described below.

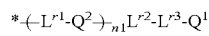

General Formula (I-R)

In General Formula (I-R), * represents a bonding position with respect to an $H^1$ side to an $H^3$ side in General Formula (I). $L^{r1}$ represents a single bond or a divalent linking group. $Q^2$ represents a divalent group having at least one type of cyclic structure (a cyclic group).

$L^{r1}$ represents a single bond or a divalent linking group. In a case where $L^{r1}$ is the divalent linking group, a divalent linking group selected from the group consisting of —O—, —S—, —C(=O)—, —NR'—, —CH=CH—, —C≡C— and a combination thereof is preferable. $R^7$ described above is a hydrogen atom or an alkyl group having 1 to 7 carbon atoms, is preferably a hydrogen atom or an alkyl group having 1 to 4 carbon atoms, is more preferably a hydrogen atom, a methyl group, or an ethyl group, and is most preferably a hydrogen atom.

$L^{r1}$ is preferably any one of a single bond, *—O—CO—, *—CO—O—, *—CH=CH—, and *—C≡C— (here, *** represents * side in General Formula (I-R)), and is more preferably a single bond.

$Q^2$ represents a divalent group having at least one type of cyclic structure (a cyclic group). A cyclic group having 5-membered ring, a 6-membered ring, or a 7-membered ring is preferable as such a cyclic group, cyclic group having a 5-membered ring or a 6-membered ring is more preferable, and a cyclic group having a 6-membered ring is even more preferable. A cyclic structure included in the cyclic group described above may be a fused ring. Here, a monocyclic ring is more preferable than the fused ring. In addition, a ring included in the cyclic group may be any one of an aromatic ring, an aliphatic ring, and a heterocyclic ring. Preferred examples of the aromatic ring include a benzene ring, a naphthalene ring, an anthracene ring, and a phenanthrene ring. Preferred examples of the aliphatic ring include a cyclohexane ring. A ring having at least one of a nitrogen atom or an oxygen atom is preferable as the heterocyclic ring, and preferred example of the heterocyclic ring include a pyridine ring, a pyrimidine ring, and an oxadiazole ring.

In $Q^2$ described above, a 1,4-phenylene group is preferable as a cyclic group having a benzene ring. A naphthalene-1,4-diyl group, a naphthalene-1,5-diyl group, a naphthalene-1,6-diyl group, a naphthalene-2,5-diyl group, and a naphthalene-2,6-diyl group, and a naphthalene-2,7-diyl group are preferable as a cyclic group having a naphthalene ring. A 1,4-cyclohexylene group is preferable as a cyclic group having a cyclohexane ring. A pyridine-2,5-diyl group is preferable as a cyclic group having a pyridine ring. A pyrimidine-2,5-diyl group is preferable as a cyclic group having a pyrimidine ring. A 1,2,4-oxadiazole-3,5-diyl group is preferable as the oxadiazole ring. Among them, the 1,4-phenylene group, the naphthalene-2,6-diyl group, the 1,4-cyclohexylene group, and the 1,2,4-oxadiazole-3,5-diyl group particularly preferable.

$Q^2$ may have a substituent. Examples of the substituent include a halogen atom (a fluorine atom, a chlorine atom, a bromine atom, and an iodine atom), a cyano group, a nitro group, an alkyl group having 1 to 16 carbon atoms, an alkenyl group having 2 to 16 carbon atoms, an alkynyl group having 2 to 16 carbon atoms, an alkyl group having 1 to 16 carbon atoms which is substituted with halogen, an alkoxy group having 1 to 16 carbon atoms, an acyl group having 2 to 16 carbon atoms, an alkyl thio group having 1 to 16 carbon atoms, an acyloxy group having 2 to 16 carbon atoms, an alkoxy carbonyl group having 2 to 16 carbon atoms, a carbamoyl group, a carbamoyl group having 2 to 16 carbon atoms which is substituted with alkyl, and an acyl amino group having 2 to 16 carbon atoms. Among them, the halogen atom, the cyano group, an alkyl group having 1 to 6 carbon atoms, and an alkyl group having 1 to 6 carbon atoms which is substituted with halogen are preferable, the halogen atom, an alkyl group having 1 to 4 carbon atoms, and an alkyl group having 1 to 4 carbon atoms which is substituted with halogen are more preferable, and the halogen atom, an alkyl group having 1 to 3 carbon atoms, and a trifluoromethyl group are even more preferable.

n1 represents an integer of 0 to 4. n1 is preferably an integer of 1 to 3, and is more preferably 1 or 2.

$L^{r2}$ represents —O—, —O—C(=O)—, —C(=O)—O—, —O—C(=O)—O—, —S—, —NH—, —SO$_2$—, —CH$_2$—, —CH=CH—, or —C≡C—, ** represents a bonding position with respect to $Q^2$.

$L^{r2}$ is preferably —O—, —O—C(=O)—, —C(=O)—O—, —O—C(=O)—O—, —CH$_2$—, —CH=CH—, and —C≡C—, and is more preferably —O—, —O—C(=O)—, —O—C(=O)—O—, and **—CH$_2$—.

When $L^{r2}$ is a group having a hydrogen atom, the hydrogen atom may be substituted with a substituent. Preferred examples of such a substituent include a halogen atom, a cyano group, a nitro group, an alkyl group having 1 to 6 carbon atoms, an alkyl group having 1 to 6 carbon atoms which is substituted with halogen, an alkoxy group having 1 to 6 carbon atoms, an acyl group having 2 to 6 carbon atoms, an alkyl thio group having 1 to 6 carbon atoms, an acyloxy group having 2 to 6 carbon atoms, an alkoxy carbonyl group having 2 to 6 carbon atoms, a carbamoyl group, a carbamoyl group having 2 to 6 carbon atoms which is substituted with alkyl, and an acyl amino group having 2 to 6 carbon atoms, and the halogen atom and the alkyl group having 1 to 6 carbon atoms are more preferable.

$L^{r3}$ represents a divalent linking group selected from the group consisting of —O—, —S—, —C(=O)—, —SO$_2$—, —NH—, —CH$_2$—, —CH=CH—, —C≡C—, and a combination thereof. Here, a hydrogen atom of —NH—, —CH$_2$—, and —CH=CH— may be substituted with a substituent. Preferred examples of such a substituent include a halogen atom, a cyano group, a nitro group, an alkyl group having 1 to 6 carbon atoms, an alkyl group having 1 to 6 carbon atoms which is substituted with halogen, an alkoxy group having 1 to 6 carbon atoms, an acyl group having 2 to 6 carbon atoms, an alkyl thio group having 1 to 6 carbon atoms, an acyloxy group having 2 to 6 carbon atoms, an alkoxy carbonyl group having 2 to 6 carbon atoms, a carbamoyl group, a carbamoyl group having 2 to 6 carbon atoms which is substituted with alkyl, and an acyl amino group having 2 to 6 carbon atoms, and the halogen atom and the alkyl group having 1 to 6 carbon atoms are more preferable. By being substituted with such a substituent, it is possible to improve solubility with respect to a solvent to be used at the time of preparing a liquid crystalline composition from a liquid crystalline compound of the present invention.

It is preferable that $L^{r3}$ is selected from the group consisting of —O—, —C(=O)—, —CH$_2$—, —CH=CH—, —C≡C—, and a combination thereof. It is preferable that $L^{r3}$ contains 1 to 20 carbon atoms, and it is more preferable that $L^{r3}$ contains 2 to 14 carbon atoms. Further, it is preferable that $L^{r3}$ contains 1 to 16 —CH$_2$—'s, and it is more preferable that $L^{r3}$ contains 2 to 12 —CH$_2$—'s.

$Q^1$ represents a polymerizable group or a hydrogen atom, and at least two of a plurality of $Q^1$'s represent a polymerizable group. In addition, it is preferable that all of the plurality of $Q^1$'s are the polymerizable group. The definition of $Q^1$ is identical to the definition of $Q^{x1}$ and $Q^{x4}$, and the preferred range thereof is also identical to those of $Q^{x1}$ and $Q^{x4}$.

In the compound of General Formula (I), a compound represented by General Formula (I') described below is more preferable.

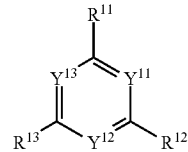

General Formula (I')

In General Formula (I'), $Y^{11}$, $Y^{12}$, and $Y^{13}$ are identical to $Y^{11}$, $Y^{12}$, and $Y^{13}$ in General Formula (I), and $R^{11}$, $R^{12}$, and $R^{13}$ each independently represent General Formula (I'-A) described below, General Formula (I'-B) described below, or General Formula (I'-C) described below.

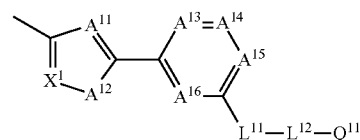

General Formula (I'-A)

In General Formula (I'-A), $A^{11}$, $A^{12}$, $A^{13}$, $A^{14}$, $A^{15}$, and $A^{16}$ each independently represent methine which may have a substituent or a nitrogen atom, $X^1$ represents an oxygen atom, a sulfur atom, methylene, or imino, $L^{11}$ and $L^{12}$ each independently represent a divalent linking group, and $Q^{11}$ represents a polymerizable group or a hydrogen atom.

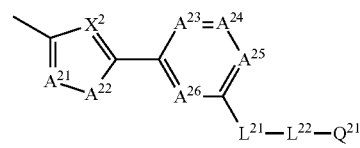

General Formula (I'-B)

In General Formula (I'-B), $A^{21}$, $A^{22}$, $A^{23}$, $A^{24}$, $A^{25}$, and $A^{26}$ each independently represent methine which may have a substituent or a nitrogen atom, $X^2$ represents an oxygen atom, a sulfur atom, methylene, or imino, $L^{21}$ and $L^{22}$ each independently represent a divalent linking group, and $Q^{21}$ represents a polymerizable group or a hydrogen atom.

General Formula (I'-C)

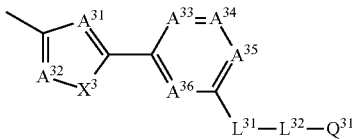

In General Formula (I'-C), $A^{31}$, $A^{32}$, $A^{33}$, $A^{34}$, $A^{35}$, and $A^{36}$ each independently represent methine which may have a substituent or a nitrogen atom, $X^3$ represents an oxygen atom, a sulfur atom, methylene, or imino, $L^{31}$ and $L^{32}$ each independently represent a divalent linking group, and $Q^{31}$ represents a polymerizable group or a hydrogen atom.

Here, at least two of $Q^{11}$, $Q^{21}$, or $Q^{31}$ represent a polymerizable group.

In General Formula (I'), $Y^{11}$, $Y^{12}$, and $Y^{13}$ are identical to $Y^{11}$, $Y^{12}$, and $Y^{13}$ in General Formula (I), and the preferred ranges thereof are also identical to those of $Y^{11}$, $Y^{12}$, and $Y^{13}$ in General Formula (I).

$R^{11}$, $R^{12}$, and $R^{13}$ each independently represent General Formula (I'-A) described below, General Formula (I'-B) described below, or General Formula (I'-C) described below. In a case of decreasing wavelength dispersibility of intrinsic birefringence, General Formula (I'-A) or General Formula (I'-C) is preferable, and General Formula (I'-A) is more preferable. It is preferable that $R^{11}$, $R^{12}$, and $R^{13}$ are $R^{11}=R^{12}=R^{13}$.

General Formula (I'-A)

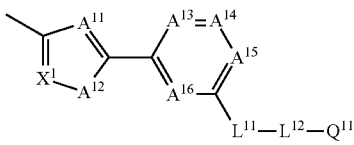

In General Formula (I'-A), $A^{11}$, $A^{12}$, $A^{13}$, $A^{14}$, $A^{15}$, and $A^{16}$ each independently represent methine which may have a substituent or a nitrogen atom.

It is preferable that at least one of $A^{11}$ or $A^{12}$ is a nitrogen atom, and it is more preferable that both of $A^{11}$ and $A^{12}$ are a nitrogen atom.

It is preferable that at least three of $A^{13}$, $A^{14}$, $A^{15}$, or $A^{16}$ are methine which may have a substituent, and it is more preferable that all of $A^{13}$, $A^{14}$, $A^{15}$, and $A^{16}$ are methine which may have a substituent. Further, it is preferable that the methine is un-substituted methine.

In a case where $A^{11}$, $A^{12}$, $A^{13}$, $A^{14}$, $A^{15}$, or $A^{16}$ is the methine which may have a substituent, examples of the substituent include a halogen atom (a fluorine atom, a chlorine atom, a bromine atom, and an iodine atom), a cyano group, a nitro group, an alkyl group having 1 to 16 carbon atoms, an alkenyl group having 2 to 16 carbon atoms, an alkynyl group having 2 to 16 carbon atoms, an alkyl group having 1 to 16 carbon atoms which is substituted with halogen, an alkoxy group having 1 to 16 carbon atoms, an acyl group having 2 to 16 carbon atoms, an alkyl thio group having 1 to 16 carbon atoms, an acyloxy group having 2 to 16 carbon atoms, an alkoxy carbonyl group having 2 to 16 carbon atoms, a carbamoyl group, a carbamoyl group having 2 to 16 carbon atoms which is substituted with alkyl, and an acyl amino group having 2 to 16 carbon atoms. Among them, the halogen atom, the cyano group, an alkyl group having 1 to 6 carbon atoms, and an alkyl group having 1 to 6 carbon atoms which is substituted with halogen are preferable, the halogen atom, an alkyl group having 1 to 4 carbon atoms, and an alkyl group having 1 to 4 carbon atoms which is substituted with halogen are more preferable, and the halogen atom, an alkyl group having 1 to 3 carbon atoms, and a trifluoromethyl group are even more preferable.

$X^1$ represents an oxygen atom, a sulfur atom, methylene, or imino, and the oxygen atom is preferable.

General Formula (I'-B)

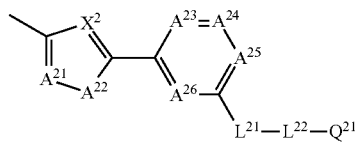

In General Formula (I'-B), $A^{21}$, $A^{22}$, $A^{23}$, $A^{24}$, $A^{25}$, and $A^{26}$ each independently represent methine which may have a substituent or a nitrogen atom.

It is preferable that at least one of $A^{21}$ or $A^{22}$ is a nitrogen atom, and it is more preferable that both of $A^{21}$ and $A^{22}$ are a nitrogen atom.

It is preferable that at least three of $A^{23}$, $A^{24}$, $A^{25}$, or $A^{26}$ are methine which may have a substituent, and it is more preferable that all of $A^{23}$, $A^{24}$, $A^{25}$, and $A^{26}$ are methine which may have a substituent. Further, it is preferable that the methine is un-substituted methine.

In a case where $A^{21}$, $A^{22}$, $A^{23}$, $A^{24}$, $A^{25}$, or $A^{26}$ is the methine which may have a substituent, examples of the substituent include a halogen atom (a fluorine atom, a chlorine atom, a bromine atom, and an iodine atom), a cyano group, a nitro group, an alkyl group having 1 to 16 carbon atoms, an alkenyl group having 2 to 16 carbon atoms, an alkynyl group having 2 to 16 carbon atoms, an alkyl group having 1 to 16 carbon atoms which is substituted with halogen, an alkoxy group having 1 to 16 carbon atoms, an acyl group having 2 to 16 carbon atoms, an alkyl thio group having 1 to 16 carbon atoms, an acyloxy group having 2 to 16 carbon atoms, an alkoxy carbonyl group having 2 to 16 carbon atoms, a carbamoyl group, a carbamoyl group having 2 to 16 carbon atoms which is substituted with alkyl, and an acyl amino group having 2 to 16 carbon atoms. Among them, the halogen atom, the cyano group, an alkyl group having 1 to 6 carbon atoms, and an alkyl group having 1 to 6 carbon atoms which is substituted with halogen are preferable, the halogen atom, an alkyl group having 1 to 4 carbon atoms, and an alkyl group having 1 to 4 carbon atoms which is substituted with halogen are more preferable, and the halogen atom, an alkyl group having 1 to 3 carbon atoms, and a trifluoromethyl group are even more preferable.

$X^2$ represents an oxygen atom, a sulfur atom, methylene, or imino, and the oxygen atom is preferable.

General Formula (I'-C)

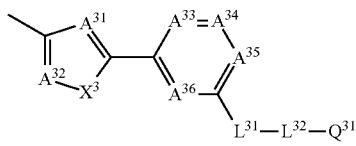

In General Formula (I'-C), $A^{31}$, $A^{32}$, $A^{33}$, $A^{34}$, $A^{35}$, and $A^{36}$ each independently represent methine which may have a substituent or a nitrogen atom.

It is preferable that at least one of $A^{31}$ or $A^{32}$ is a nitrogen atom, and it is more preferable that both of $A^{31}$ and $A^{32}$ are a nitrogen atom.

It is preferable that at least three of $A^{33}$, $A^{34}$, $A^{35}$, or $A^{36}$ are methine which may have a substituent, and it is more preferable that all of $A^{33}$, $A^{34}$, $A^{35}$, and $A^{36}$ are methine which may have a substituent. It is preferable that the methine is un-substituted methine.

In a case where $A^{31}$, $A^{32}$, $A^{33}$, $A^{34}$, $A^{35}$, or $A^{36}$ is the methine which may have a substituent, the methine may have a substituent. Examples of the substituent include a halogen atom (a fluorine atom, a chlorine atom, a bromine atom, and an iodine atom), a cyano group, a nitro group, an alkyl group having 1 to 16 carbon atoms, an alkenyl group having 2 to 16 carbon atoms, an alkynyl group having 2 to 16 carbon atoms, an alkyl group having 1 to 16 carbon atoms which is substituted with halogen, an alkoxy group having 1 to 16 carbon atoms, an acyl group having 2 to 16 carbon atoms, an alkyl thio group having 1 to 16 carbon atoms, an acyloxy group having 2 to 16 carbon atoms, an alkoxy carbonyl group having 2 to 16 carbon atoms, a carbamoyl group, a carbamoyl group having 2 to 16 carbon atoms which is substituted with alkyl, and an acyl amino group having 2 to 16 carbon atoms. Among them, the halogen atom, the cyano group, an alkyl group having 1 to 6 carbon atoms, and an alkyl group having 1 to 6 carbon atoms which is substituted with halogen are preferable, the halogen atom, an alkyl group having 1 to 4 carbon atoms, and an alkyl group having 1 to 4 carbon atoms which is substituted with halogen are more preferable, and the halogen atom, an alkyl group having 1 to 3 carbon atoms, and a trifluoromethyl group are even more preferable.

$X^3$ represents an oxygen atom, a sulfur atom, methylene, or imino, and the oxygen atom is preferable.

$L^{11}$ in General Formula (I'-A) and $L^{21}$ in General Formula (I'-B), and $L^{31}$ in General Formula (I'-C) each independently represent —O—, —C(=O)—, —O—C(=O)—, —C(=O)—O—, —O—C(=O)—O—, —S—, —NH—, —SO$_2$—, —CH$_2$—, —CH=CH—, or C≡C—. —O—, —C(=O)—, —O—C(=O)—, —C(=O)—O—, —O—C (=O)—O—, —CH$_2$—, —CH=CH—, and —C≡C— are preferable, and —O—, —O—C(=O)—, —C(=O)—O—, —O—C(=O)—O—, and —C≡C— are more preferable. In particular, —O—, —C(=O)—O— and —C≡C— are particularly preferable as $L^{11}$ in General Formula (I'-A) in which small wavelength dispersibility of intrinsic birefringence can be expected, and among them, —C(=O)—O— is preferable since a discotic nematic phase can be exhibited at a higher temperature. When the group described above contains a hydrogen atom, the hydrogen atom may be substituted with a substituent. Preferred examples of such a substituent include a halogen atom, a cyano group, a nitro group, an alkyl group having 1 to 6 carbon atoms, an alkyl group having 1 to 6 carbon atoms which is substituted with halogen, an alkoxy group having 1 to 6 carbon atoms, an acyl group having 2 to 6 carbon atoms, an alkyl thio group having 1 to 6 carbon atoms, an acyloxy group having 2 to 6 carbon atoms, an alkoxy carbonyl group having 2 to 6 carbon atoms, a carbamoyl group, a carbamoyl group having 2 to 6 carbon atoms which is substituted with alkyl, and an acyl amino group having 2 to 6 carbon atoms, and the halogen atom and the alkyl group having 1 to 6 carbon atoms are more preferable.

$L^{12}$ in General Formula (I'-A), $L^{22}$ in General Formula (I'-B), and $L^{32}$ in General Formula (I'-C) each independently represent a divalent linking group selected from the group consisting of —O—, —S—, —C(=O)—, —SO$_2$—, —NH—, —CH$_2$—, —CH=CH—, C≡C—, and a combination thereof. Here, a hydrogen atom of —NH—, —CH$_2$—, and —CH=CH— may be substituted with a substituent. Preferred examples of such a substituent include a halogen atom, a cyano group, a nitro group, a hydroxyl group, a carboxyl group, an alkyl group having 1 to 6 carbon atoms, an alkyl group having 1 to 6 carbon atoms which is substituted with halogen, an alkoxy group having 1 to 6 carbon atoms, an acyl group having 2 to 6 carbon atoms, an alkyl thio group having 1 to 6 carbon atoms, an acyloxy group having 2 to 6 carbon atoms, an alkoxy carbonyl group having 2 to 6 carbon atoms, a carbamoyl group, a carbamoyl group having 2 to 6 carbon atoms which is substituted with alkyl, and an acyl amino group having 2 to 6 carbon atoms, the halogen atom, the hydroxyl group, and the alkyl group having 1 to 6 carbon atoms are more preferable, and the halogen atom, a methyl group, and an ethyl group are particularly preferable.

It is preferable that $L^{12}$, $L^{22}$, and $L^{32}$ are each independently selected from the group consisting of —O—, —C(=O)—, —CH$_2$—, —CH=CH—, C≡C—, and a combination thereof.

It is preferable that $L^{12}$, $L^{22}$, and $L^{32}$ each independently contain 1 to 20 carbon atoms, and it is more preferable that $L^{12}$, $L^{22}$, and $L^{32}$ each independently contain 2 to 14 carbon atoms. It is preferable that the number of carbon atoms is 2 to 14, it is more preferable that the number of —CH$_2$—'s is 1 to 16, and it is even more preferable that the number of —CH$_2$—'s is 2 to 12.

The number of carbon atoms configuring $L^{12}$, $L^{22}$, and $L^{32}$ affects a phase transition temperature of a liquid crystal and solubility with respect to a solvent of a compound. In general, a transition temperature from a discotic nematic phase (an $N_D$ phase) to an isotropic liquid tends to decrease as the number of carbon atoms increases. In addition, the solubility with respect to the solvent, in general, tends to be improved as the number of carbon atoms increases.

$Q^{11}$ in General Formula (I'-A), $Q^{21}$ in General Formula (I'-B), and $Q^{31}$ in General Formula (I'-C) each independently represent a polymerizable group or a hydrogen atom, and at least two of $Q^{11}$, $Q^{21}$ or $Q^{31}$ represent a polymerizable group. In addition, it is preferable that all of $Q^{11}$, $Q^{21}$, and $Q^{31}$ are a polymerizable group. Examples of the polymerizable group are identical to the examples of the polymerization group represented by $Q^{X1}$ or $Q^{X2}$ in General Formula (X), and the preferred examples are also identical to those of the polymerization group represented by $Q^{X1}$ or $Q^{X2}$ in General Formula (X).

Specific examples of the compound represented by General Formula (I) include an exemplificative compound described in paragraphs [0068] to [0077] of JP2010-244038A and an exemplificative compound described in paragraphs [0040] to [0063] of JP2007-2220A. Here, the compound represented by General Formula (I) is not limited to the compounds.

The compounds described above can be synthesized by various methods, and for example, can be synthesized by a method described in [0064] to [0070] of JP2007-2220A.

It is preferable that a discotic liquid crystal compound has a columnar phase and a discotic nematic phase (an $N_D$ phase) as a liquid crystalline phase, and in the liquid crystalline phase, the discotic nematic phase (the $N_D$ phase) having excellent monodomain properties is preferable.

A disk-like liquid crystal compound having a structure derived from a compound represented by General Formula (1) described below is preferable as the disk-like liquid crystal compound forming the mesogenic group of the mesogenic group-containing polymer of the present invention.

$$D^{41}\text{-}(L^{41}\text{-}Q^{41})_{n41} \qquad \text{General Formula (1)}$$

In the formula, $D^{41}$ represents a disk-like core, $L^{41}$ represents a divalent linking group, $Q^{41}$ represents a polymerizable group, and n41 represents an integer of any one of 2 to 12.

Examples of the disk-like core ($D^{41}$) of the formula described above will be described below. L represents a divalent linking group, and Q represents a polymerizable group.

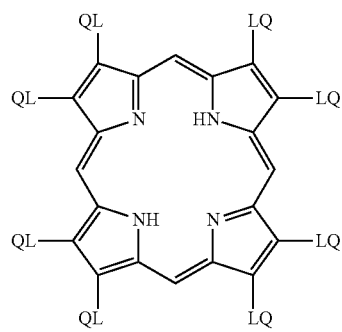
(D1)

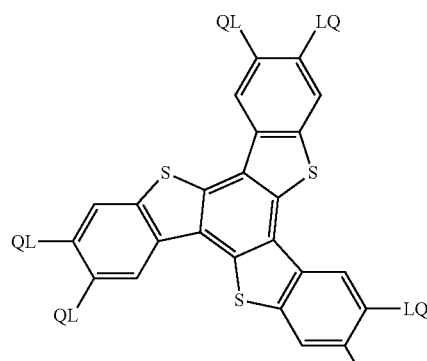
(D2)

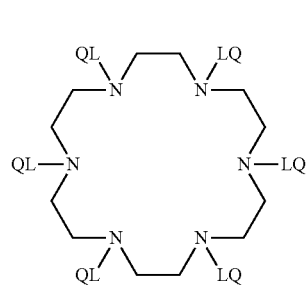
(D3)

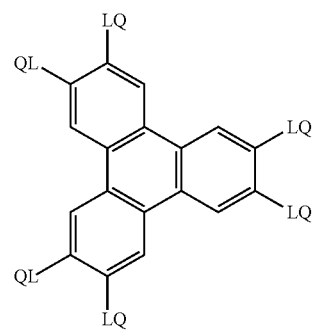
(D4)

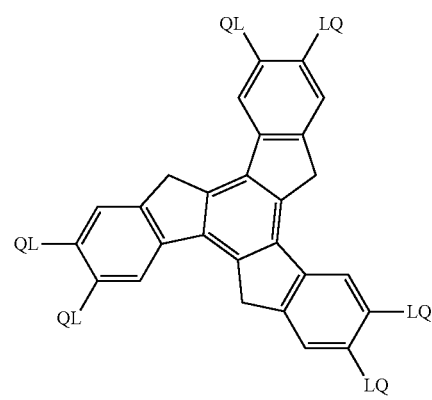
(D5)

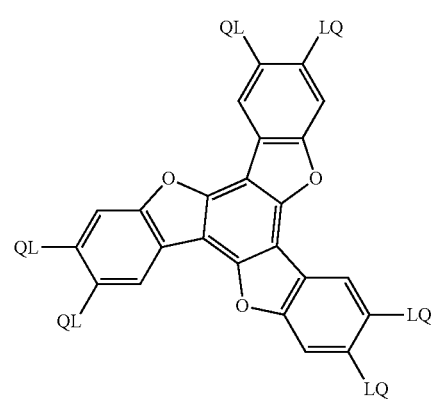
(D6)

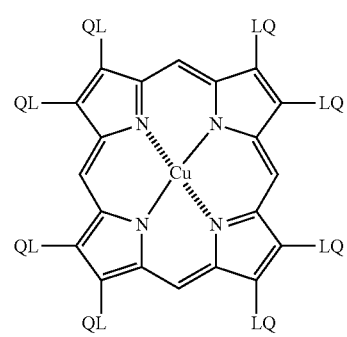
(D7)

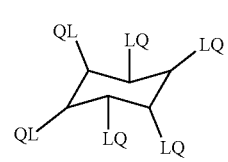
(D8)

-continued
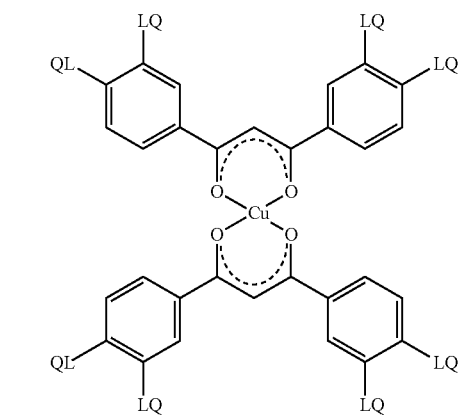
(D9)
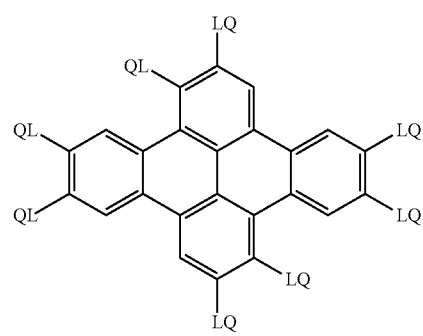
(D10)
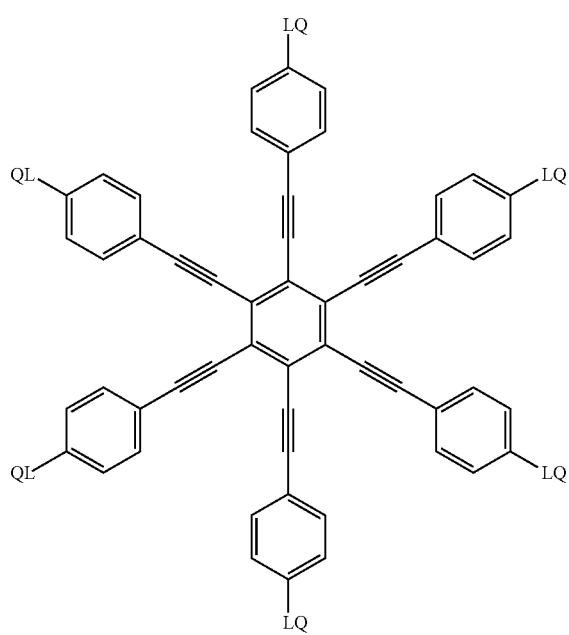
(D11)
-continued
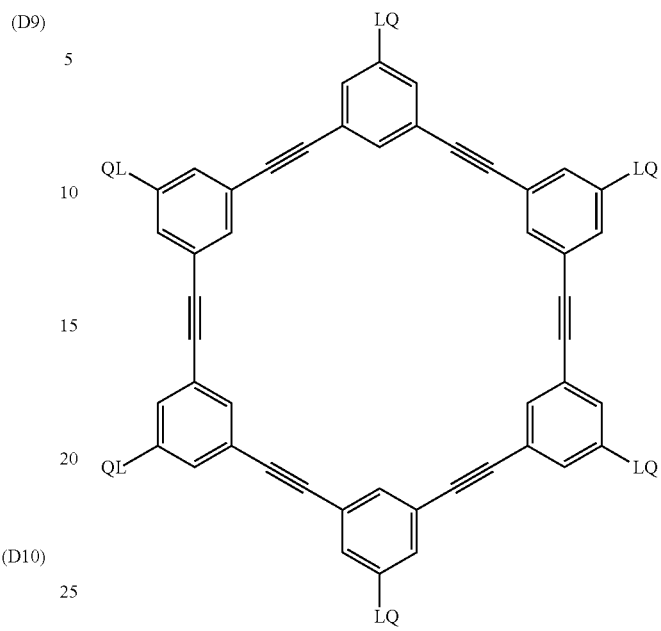
(D12)
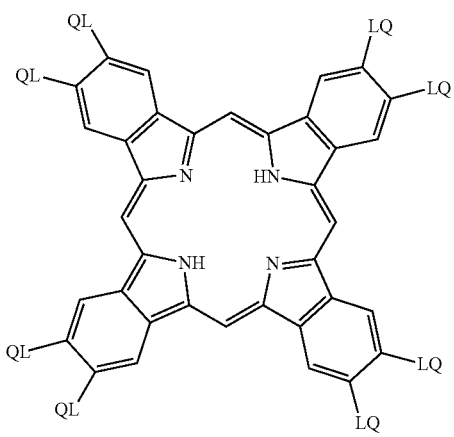
(D13)
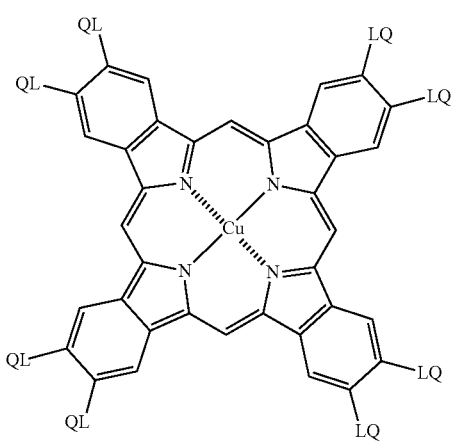
(D14)

-continued (D15)

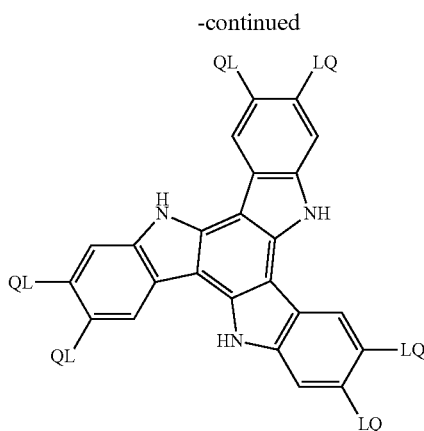

In General Formula (1) described above, it is preferable that a divalent linking group ($L^{41}$) is a divalent linking group selected from the group consisting of an alkylene group, an alkenylene group, an arylene group, —CO—, —NH—, —O—, —S—, and a combination thereof. It is more preferable that the divalent linking group ($L^{41}$) is a group formed by combining at least two divalent groups selected from the group consisting of an alkylene group, an alkenylene group, an arylene group, —CO—, —NH—, —O—, and —S—. It is most preferable that the divalent linking group ($L^{41}$) is a group formed by combining at least two divalent groups selected from the group consisting of an alkylene group, an alkenylene group, an arylene group, —CO—, and —O—. It is preferable that the number of carbon atoms of the alkylene group is 1 to 12. It is preferable that the number of carbon atoms of the alkenylene group is 2 to 12. It is preferable that the number of carbon atoms of the arylene group is 6 to 10. The alkylene group, the alkenylene group, and the arylene group may have a substituent (for example, an alkyl group, a halogen atom, cyano, an alkoxy group, and an acyloxy group). Examples of the divalent linking group ($L^{41}$) will be described below. * is bonded to a disk-like core ($D^{41}$), and ** is bonded to a polymerizable group ($Q^{41}$). AL indicates an alkylene group or an alkenylene group, and AR indicates an arylene group.

$L_{41}$-1: *-AL-OO—O-AL-**
$L_{41}$-2: *-AL-OO—O-AL-O—**
$L_{41}$-3: *-AL-OO—O-AL-O-AL-**
$L_{41}$-4: *-AL-OO—O-AL-O—OO—**
$L_{41}$-5: *—CO-AR-O-AL-**
$L_{41}$-6: *—CO-AR-O-AL-O—**
$L_{41}$-7: *—CO-AR-O-AL-O—CO—**
$L_{41}$-8: *—CO—NH-AL-**
$L_{41}$-9: *—NH-AL-O—**
$L_{41}$-10: *—NH-AL-O—OO—**
$L_{41}$-11: *—O-AL-**
$L_{41}$-12: *—O-AL-O—**
$L_{41}$-13: *—O-AL-O—OO—**
$L_{41}$-14: *—O-AL-O—CO—NH-AL-**
$L_{41}$-15: *—O-AL-S-AL-**
$L_{41}$-16: *—O—CO-AL-AR-O-AL-O—OO—**
$L_{41}$-17: *—O—CO-AR-O-AL-OO—**
$L_{41}$-18: *—O—CO-AR-O-AL-O—OO—**
$L_{41}$-19: *—O—CO-AR-O-AL-O-AL-O—OO—**
$L_{41}$-20: *—O—CO-AR-O-AL-O-AL-O-AL-O—OO—**
$L_{41}$-21: *—S-AL-**
$L_{41}$-22: *—S-AL-O—**
$L_{41}$-23: *—S-AL-O—OO—**
$L_{41}$-24: *—S-AL-S-AL-**
$L_{41}$-25: *—S-AR-AL-**

$Q^{41}$ represents a polymerizable group, and is identical to the polymerization group represented by $Q^{X1}$ or $Q^{X2}$ in General Formula (X). Furthermore, in a case where n41 is greater than or equal to 2, combinations of a plurality of $L^{41}$'s and $Q^{41}$'s may be different from each other, but it is preferable that the combinations of the plurality of $L^{41}$'s and $Q^{41}$'s are identical to each other.

A triphenylene derivative represented by General Formulas (1) to (3) which are described in JP1995-306317A (JP-H07-306317A), a triphenylene derivative represented by General Formula (I) which is described in JP1995-309813A (JP-H07-309813A), and a triphenylene derivative represented by General Formula (I) which is described in JP2001-100028A are preferable as the structure derived from the compound represented by General Formula (1). In the triphenylene derivative, a compound described below which has a linking group between a triphenylene structure and a polymerizable group is most preferable.

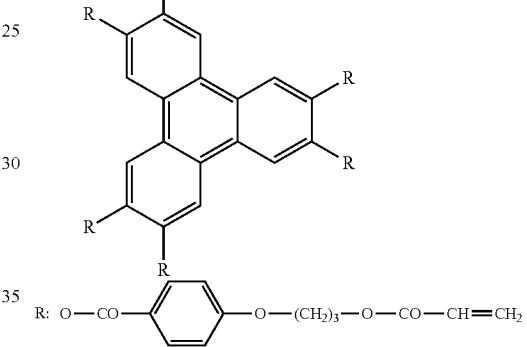

R: O—CO—⟨benzene⟩—O—(CH$_2$)$_3$—O—CO—CH═CH$_2$

The mesogenic group-containing polymer of the present invention may have a mesogenic group derived from a rod-like liquid crystal compound which is different from the compound represented by General Formula (X) and a disk-like liquid crystal compound which is different from the compound represented by General Formula (I), and for example, the mesogenic group-containing polymer of the present invention may have a mesogenic group derived from a rod-like liquid crystal compound or a disk-like liquid crystal compound which have one polymerizable group.

In addition, the mesogenic group-containing polymer of the present invention may have a mesogenic group derived from the rod-like liquid crystal compound and the disk-like liquid crystal compound in the same molecule.

It is preferable that the has a mesogenic group derived from either the rod-like liquid crystal compound or the disk-like liquid crystal compound from the viewpoint of compatibility, and in a case where the mesogenic group-containing polymer of the present invention has the mesogenic group derived from the rod-like liquid crystal compound which is different from the compound represented by General Formula (X) or the disk-like liquid crystal compound which is different from the compound represented by General Formula (I), it is preferable that the mesogenic group is similar to the compound represented by General Formula (X) or the compound represented by General Formula (I).

It is preferable that the mesogenic group-containing polymer of the present invention is a polymer having a structure derived from compound having a fluorine atom (hereinafter, referred to as a fluorine-containing mesogenic group polymer), or a polymer having a structure derived from a compound having a siloxane bond. According to the fluorine-containing mesogenic group polymer or the polymer having the structure derived from the compound having the siloxane bond, it is possible to increase surface uneven distribution properties of the polymer of the present invention, and for example, it is possible to perform surface modification with respect to an optical film or the like.

A partial structure derived from a compound having a fluorine atom is preferably a structure obtained by polymerizing a compound represented by General Formula (a), and is more preferably a structure obtained by polymerizing a compound represented by General Formula (b).

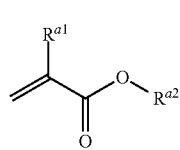

General Formula (a)

In General Formula (a), $R^{a1}$ represents a hydrogen atom or an alkyl group having 1 to 20 carbon atoms, and $R^{a2}$ represents an alkyl group having 1 to 20 carbon atoms or an alkenyl group having 2 to 20 carbon atoms in which at least one carbon atom has a fluorine atom as a substituent.

In General Formula (a), $R^{a1}$ is preferably an alkyl group having 1 to 10 carbon atoms or an alkenylene group having 2 to 10 carbon atoms in which at least one carbon atom has a fluorine atom as a substituent, and is more preferably an alkyl group having 1 to 10 carbon atoms, from the viewpoint of increasing the effect of the present invention by decreasing surface energy of a composition for preparing a liquid crystal layer having a mesogenic group-containing polymer, and it is particularly preferable that more than half of the carbon atoms included in $R^{a2}$ have a fluorine atom as a substituent.

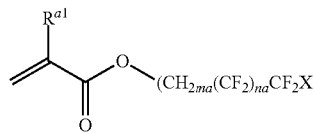

General Formula (b)

In General Formula (b), $R^{a1}$ represents a hydrogen atom or an alkyl group having 1 to 20 carbon atoms, ma and na represent an integer of greater than or equal to 0, and X represents a hydrogen atom or a fluorine atom. ma is preferably an integer of 1 to 10, and na is preferably from 4 to 12.

For example 2,2,2-trifluoroethyl (meth)acrylate, 2,2,3,3,3-pentafluoropropyl (meth)acrylate, 2-(perfluorobutyl) ethyl (meth)acrylate, 2-(perfluorohexyl) ethyl (meth)acrylate, 2-(perfluorooctyl) ethyl (meth)acrylate, 2-(perfluorodecyl) ethyl (meth)acrylate, 2-(perfluoro-3-methyl butyl) ethyl (meth)acrylate, 2-(perfluoro-5-methyl hexyl) ethyl (meth) acrylate, 2-(perfluoro-7-methyl octyl) ethyl (meth)acrylate, 1H,1H,3H-tetrafluoropropyl (meth)acrylate, 1H,1H,5H-octafluoropentyl (meth)acrylate, 1H,1H,7H-dodecafluoroheptyl (meth)acrylate, 1H,1H,9H-hexadecafluorononyl (meth)acrylate, 1H-1-(trifluoromethyl) trifluoroethyl (meth) acrylate, 1H,1H,3H-hexafluorobutyl (meth)acrylate, 3-perfluorobutyl-2-hydroxy propyl (meth)acrylate, 3-perfluorohexyl-2-hydroxy propyl (meth)acrylate, 3-perfluorooctyl-2-hydroxy propyl (meth)acrylate, 3-(perfluoro-3-methyl butyl)-2-hydroxy propyl (meth)acrylate, 3-(perfluoro-5-methyl hexyl)-2-hydroxy propyl (meth)acrylate, 3-(perfluoro-7-methyl octyl)-2-hydroxy propyl (meth) acrylate, and the like are included.

In the present invention, a ratio of copolymerizing a fluoroalkyl group-containing monomer is preferably 0.01 to 100 moles, is particularly preferably 0.1 to 50 moles, and is most preferably 1 to 30 moles, with respect to 1 mole of a monomer which contains a mesogenic group derived from a rod-like liquid crystal compound or a disk-like liquid crystal compound in the molecules and has two or more polymerizable groups (hereinafter, also referred to as a mesogenic group-containing monomer), from the viewpoint of reactivity or a surface modification effect.

A structure derived from a compound having a siloxane bond may be a structure having a repeating unit represented by $—Si(R^{a3})(R^{a4})O—$, and may configure at least a part of the molecules. A graft copolymer is preferable in which a polysiloxane structure is introduced into a side chain of a polymer, and in General Formula (a) described above, it is preferable that $R^{a2}$ contains $—Si(R^{a3})(R^{a4})O—$, and it is more preferable that $R^{a2}$ has a structure obtained by polymerizing a compound represented by General Formula (c) described below.

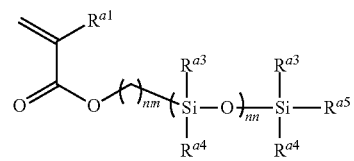

General Formula (c)

$R^{a3}$ and $R^{a4}$ each represent an alkyl group (an alkyl group having 1 to 10 carbon atoms is preferable, and for example, a methyl group, an ethyl group, a hexyl group, and the like), a haloalkyl group (a fluorinated alkyl group having 1 to 10 carbon atoms is preferable, and for example, a trifluoromethyl group, a pentafluoroethyl group, and the like), or an aryl group (an aryl group having 6 to 20 carbon atoms is preferable, and for example, a phenyl group, a naphthyl group, and the like), are preferably a methyl group, a trifluoromethyl group, or a phenyl group, and are particularly preferably a methyl group. $R^{a1}$ is identical to $R^{a1}$ in General Formula (a), and the preferred range thereof is also identical to that of $R^{a1}$ in General Formula (a). $R^{a5}$ is preferably an alkyl group having 1 to 12 carbon atoms, and is more preferably an alkyl group having 1 to 4 carbon atoms.

nn is preferably 10 to 1000, is more preferably 20 to 500, and is particularly preferably 30 to 200. The repeating unit described above may be a single unit, or may be configured of a plurality of units. nm is preferably 1 to 12, and is more preferably 1 to 6. Examples of the graft copolymer can include an one-terminal (meth)acryloyl group-containing polysiloxane macromer (for example, SILAPLANE 0721 and SILAPLANE 0725 (Product Names, manufactured by CHISSO CORPORATION MINAMATA), AK-5, AK-30, and AK-32 (Product Names, manufactured by TOAGOSEI CO., LTD.), KF-100T, X-22-169AS, KF-102, X-22-3701IE, X-22-164B, X-22-164C, X-22-5002, X-22-173B, X-22-

174D, X-22-167B, and X-22-161AS (Product Names, manufactured by Shin-Etsu Chemical Co., Ltd.), and the like.

In the present invention, a ratio of copolymerizing a compound having a siloxane bond is preferably 0.1 to 50 moles, and is particularly preferably 0.5 to 30 moles, with respect to 1 mole of a monomer which contains a mesogenic group derived from a rod-like liquid crystal compound or a disk-like liquid crystal compound in the molecules and has two or more polymerizable groups (hereinafter, also referred to as a mesogenic group-containing monomer), from the viewpoint of reactivity and a surface modification effect.

<Synthesis Method of Mesogenic Group-Containing Polymer>

The mesogenic group-containing polymer of the present invention is obtained by performing polymerization with respect to the rod-like liquid crystal compound or the disk-like liquid crystal compound forming the mesogenic group described above, or with respect to the rod-like liquid crystal compound or the disk-like liquid crystal compound forming the mesogenic group described above and the compound having the fluorine atom described above, or the compound having the siloxane bond in the presence of a predetermined amount of a polymerization initiator, examples of a polymerization method include a known method, for example, solution polymerization, dispersion polymerization, precipitation polymerization, bulk polymerization, and the like, and among them, the solution polymerization or the precipitation polymerization is preferable. In particular, it is preferable that a reaction is performed by solution polymerization in an organic solvent from the viewpoint of controlling a molecular weight. At this time, examples of the organic solvent to be used include an aromatic hydrocarbon-based solvent such as benzene, toluene, xylene, ethyl benzene, and tetralin; an aliphatic hydrocarbon-based solvent or an alicyclic hydrocarbon-based solvent such as n-hexane, n-heptane, mineral spirits, and cyclohexane; a halogen-based solvent such as methyl chloride, methyl bromide, methyl iodide, methylene dichloride, chloroform, carbon tetrachloride, trichloroethylene, perchloroethylene, and orthodichlorobenzene; an ester-based solvent or an ester ether-based solvent such as ethyl acetate, butyl acetate, methoxy butyl acetate, methyl cellosolve acetate, ethyl cellosolve acetate, and propylene glycol monomethyl ether acetate; an ether-based solvent such as diethyl ether, tetrahydrofuran, 1,4-dioxane, methyl cellosolve, ethyl cellosolve, butyl cellosolve, and propylene glycol monomethyl ether; a ketone-based solvent such as acetone, methyl ethyl ketone, methyl isobutyl ketone, di-n-butyl ketone, and cyclohexanone; an alcohol-based solvent such as methanol, ethanol, n-propanol, isopropanol, n-butanol, isobutanol, tert-butanol, 2-ethyl hexyl alcohol, and benzyl alcohol; an amide-based solvent such as N,N-dimethyl formamide and N,N-dimethyl acetamide; a sulfoxide-based solvent such as dimethyl sulfoxide, a heterocyclic compound-based solvent such as N-methyl-2-pyrrolidone, and a mixed solvent of two or more types thereof.

Among them, the aromatic hydrocarbon-based solvent, the halogen-based solvent, the ester-based solvent, the ether-based solvent, the ketone-based solvent, the alcohol-based solvent, the amide-based solvent, the sulfoxide-based solvent, and the like are preferable, and the toluene, the xylene, the orthodichlorobenzene, the butyl acetate, the propylene glycol monomethyl ether acetate, the propylene glycol monomethyl ether, the 1,4-dioxane, the methyl cellosolve, the methyl isobutyl ketone, the N,N-dimethyl formamide, the N,N-dimethyl acetamide, and the like are particularly preferable.

In a case where the polymerization reaction described above is performed in the presence of the organic solvent, the content of the organic solvent in the entire polymerization reactant is preferably 0.5 to 100 parts by mass, and is more preferably 1 to 50 parts by mass, with respect to 1 part by mass of the rod-like liquid crystal compound or the disk-like liquid crystal compound forming the mesogenic group described above.

The polymerization reaction is performed under ordinary pressure, under increased pressure and sealed conditions, or under reduced pressure, but it is preferable that the polymerization reaction is performed under ordinary pressure from the viewpoint of simplicity of a device and an operation. In addition, the polymerization reaction is performed under an inert gas atmosphere such as $N_2$. A temperature of the polymerization reaction is preferably 50° C. to 200° C., and is more preferably 70° C. to 150° C. More preferably, the polymerization reaction is performed at a temperature higher than a 10-hour half-life temperature of the polymerization initiator by higher than or equal to 10° C., and more specifically, it is preferable that a solution containing the rod-like liquid crystal compound or the disk-like liquid crystal compound forming the mesogenic group described above, the compound having the fluorine atom or the compound having the siloxane bond described above, and a polymerization initiator and an organic solvent described below is subjected to dropwise addition into an organic solvent which is retained at the temperature higher than the 10-hour half-life temperature of the polymerization initiator by higher than or equal to 10° C., and thus, the polymerization reaction is performed. After the polymerization reaction ends, the obtained mesogenic group-containing polymer is collected by an arbitrary method, and as necessary, a post treatment such as washing is performed. Examples of a method of collecting a polymer from a reaction solution include a method such as reprecipitation.

The weight-average molecular weight (hereinafter, simply referred to as Mw) of the obtained mesogenic group-containing polymer is preferably 1,000 to 300,000, is more preferably 1,000 to 200,000, is even more preferably 1,000 to 100,000, and is most preferably 2,000 to 6,000, in terms of polystyrene by using a gel permeation chromatography (GPC). By setting the weight-average molecular weight of the mesogenic group-containing polymer to have such a value, it is possible to adjust a viscosity of a composition containing the mesogenic group-containing polymer or a composition for preparing a liquid crystal layer to a suitable value, and it is possible to increase the effect of the present invention.

An azo-based polymerization initiator is preferably used as the polymerization initiator in the present invention. Examples of the azo-based polymerization initiator can include compounds (1) to (6) described below.

(1) Azonitrile Compound:
2,2'-azobisisobutyronitrile, 2,2'-azobis(2-methyl butyronitrile), 2,2'-azobis(2,4-dimethyl valeronitrile), 1,1'-azobis (1-cyclohexane carbonitrile), 2,2'-azobis(4-methoxy-2,4-dimethyl valeronitrile), 2-(carbamoyl azo) isobutyronitrile, and the like;

(2) Azoamide Compound:
2,2'-azobis {2-methyl-N-[1,1-bis(hydroxy methyl)-2-hydroxy ethyl] propion amide}, 2,2'-azobis {2-methyl-N-[2-(1-hydroxy butyl)] propion amide}, 2,2'-azobis[2-methyl-N-(2-hydroxy ethyl) propion amide], 2,2'-azobis[N-(2- propenyl)-2-methyl propion amide], 2,2'-azobis(N-butyl-2-methyl propion amide), 2,2'-azobis(N-cyclohexyl-2-methyl propion amide), and the like;

(3) Cyclic Azoamidine Compound:

2,2'-azobis[2-(2-imidazoline-2-yl) propane] dihydrochloride, 2,2'-azobis[2-(2-imidazoline-2-yl) propane] disulfate dihydrate, 2,2'-azobis[2-[1-(2-hydroxy ethyl)-2-imidazoline-2-yl] propane] dihydrochloride, 2,2'-azobis[2-(2-imidazoline-2-yl) propane], 2,2'-azobis(1-imino-1-pyrrolidino-2-methyl propane) dihydrochloride, and the like;

(4) Azoamidine Compound:

2,2'-azobis(2-methyl propion amidine) dihydrochloride, 2,2'-azobis[N-(2-carboxy ethyl)-2-methyl propion amidine] tetrahydrate, and the like;

(5) Others:

Dimethyl 2,2'-azobisisobutyrate, 4,4'-azobis-4-cyanovalerate, 2,2'-azobis(2,4,4-trimethyl pentane), 1,1'-azobis(1-acetoxy-1-phenyl ethane), dimethyl-1,1'-azobis(1-cyclohexane carboxylate), 4,4'-azobis(4-cyanopentanoate), and the like; and, (6) Fluoroalkyl Group-Containing Azo-Based Polymerization Initiator:

4,4'-azobis(4-cyanopentanoate-2-(perfluoromethyl) ethyl), 4,4'-azobis(4-cyanopentanoate-2-(perfluorobutyl) ethyl), 4,4'-azobis(4-cyanopentanoate-2-(perfluorohexyl) ethyl), and the like.

In the azo-based polymerization initiator described above, an azo-based polymerization initiator having a substituent of which polarity is comparatively low is desirable, and the dimethyl 2,2'-azobisisobutyrate or the 2,2'-azobis(2,4,4-trimethyl pentane) is particularly preferable, from the viewpoint of surface energy of the obtained mesogenic group-containing polymer. In addition, the 4,4'-azobis(4-cyanopentanoate-2-(perfluoromethyl) ethyl) and the 4,4'-azobis(4-cyanopentanoate-2-(perfluorohexyl) ethyl) which are fluoroalkyl group-containing azo-based polymerization initiators can be preferably used.

The content of the polymerization initiator is preferably 1 to 50 molar equivalents, is more preferably 1 to 40 molar equivalents, and is most preferably 2 to 30 molar equivalents, with respect to the mesogenic group-containing monomer.

In the synthesis of the mesogenic group-containing polymer, the polymerization reaction is a radical polymerization reaction from the viewpoint of controlling a molecular weight.

A double bond residual ratio of a mesogen-containing polymer obtained by the radical polymerization reaction is preferably less than or equal to 0.05 mol %, is more preferably less than or equal to 0.01 mol %, and is most preferably less than or equal to 0.001 mol %, with respect to 1 mole of the polymer. By setting the double bond residual ratio to be less than or equal to 0.05 mol %, a monomer is not unevenly distributed on an air interface of a coated film by light irradiation, and thus, coating properties of an upper layer thereof is excellent. Furthermore, the double bond residual ratio can be simply calculated from a peak intensity of nuclear magnetic resonance (NMR) measurement.

Hereinafter, specific preferred examples of the mesogenic group-containing polymer of the present invention will be described, but the present invention is not limited thereto.

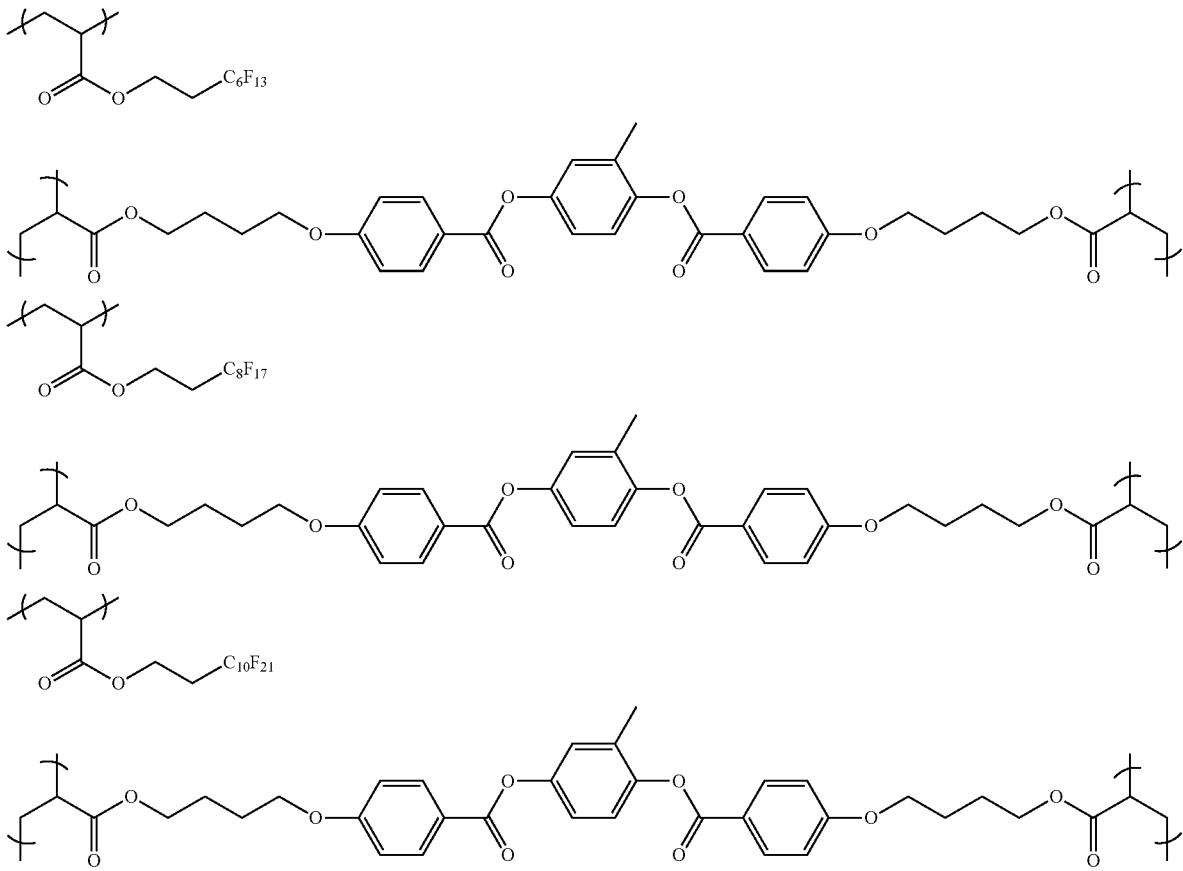

-continued
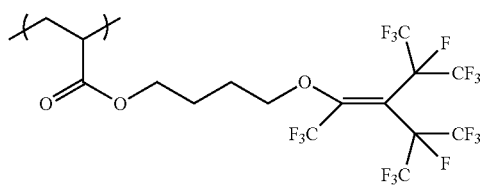
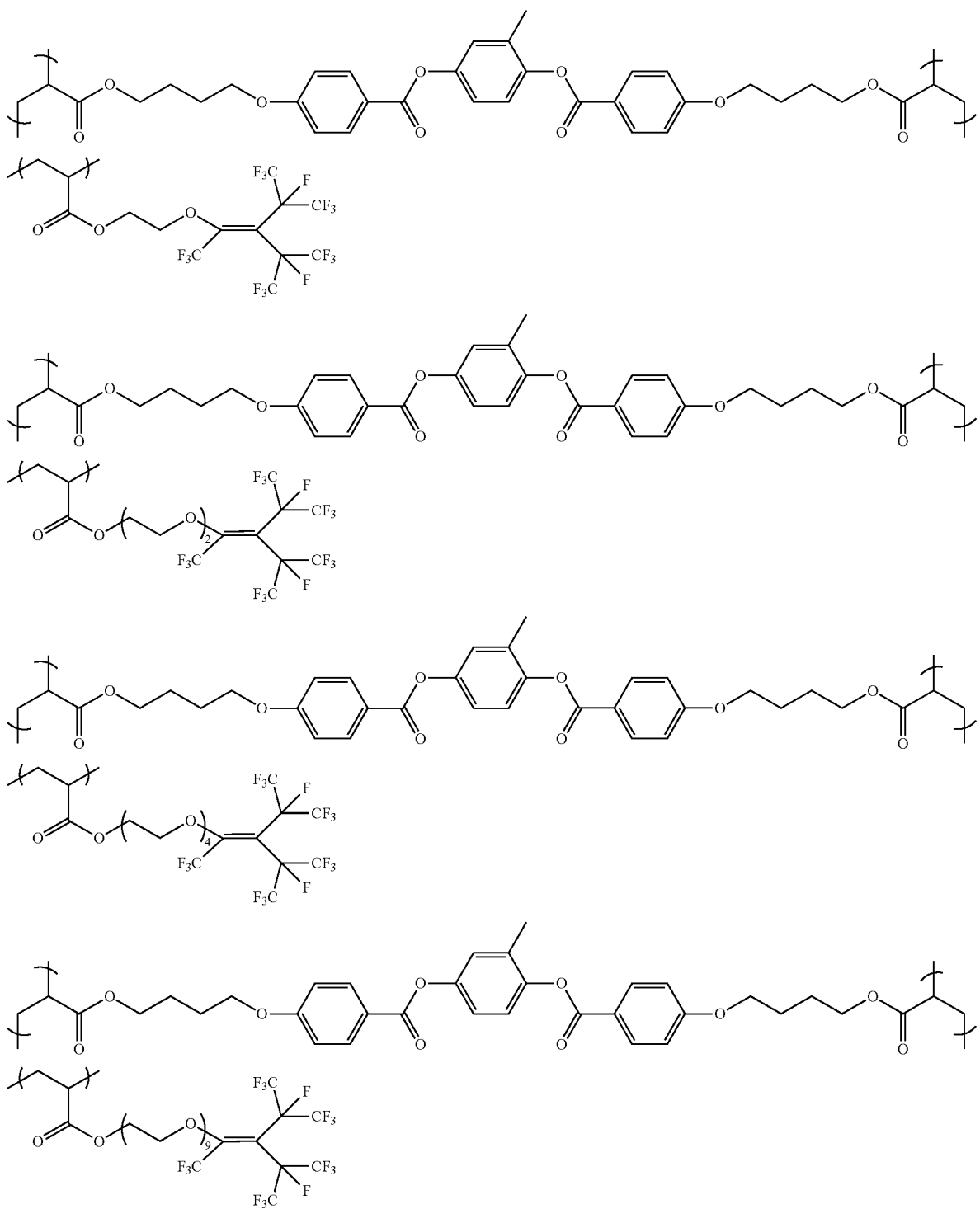

-continued
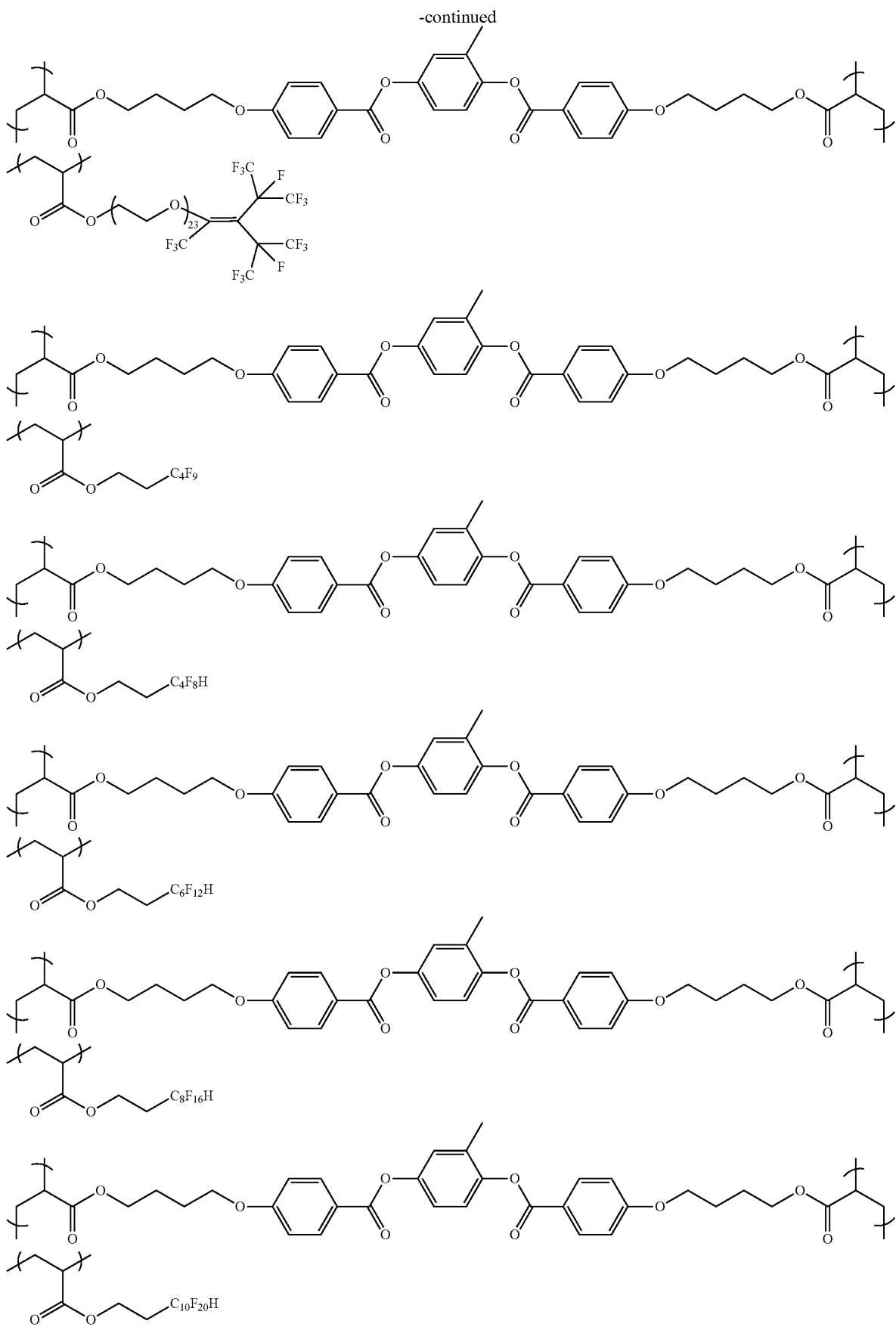

-continued
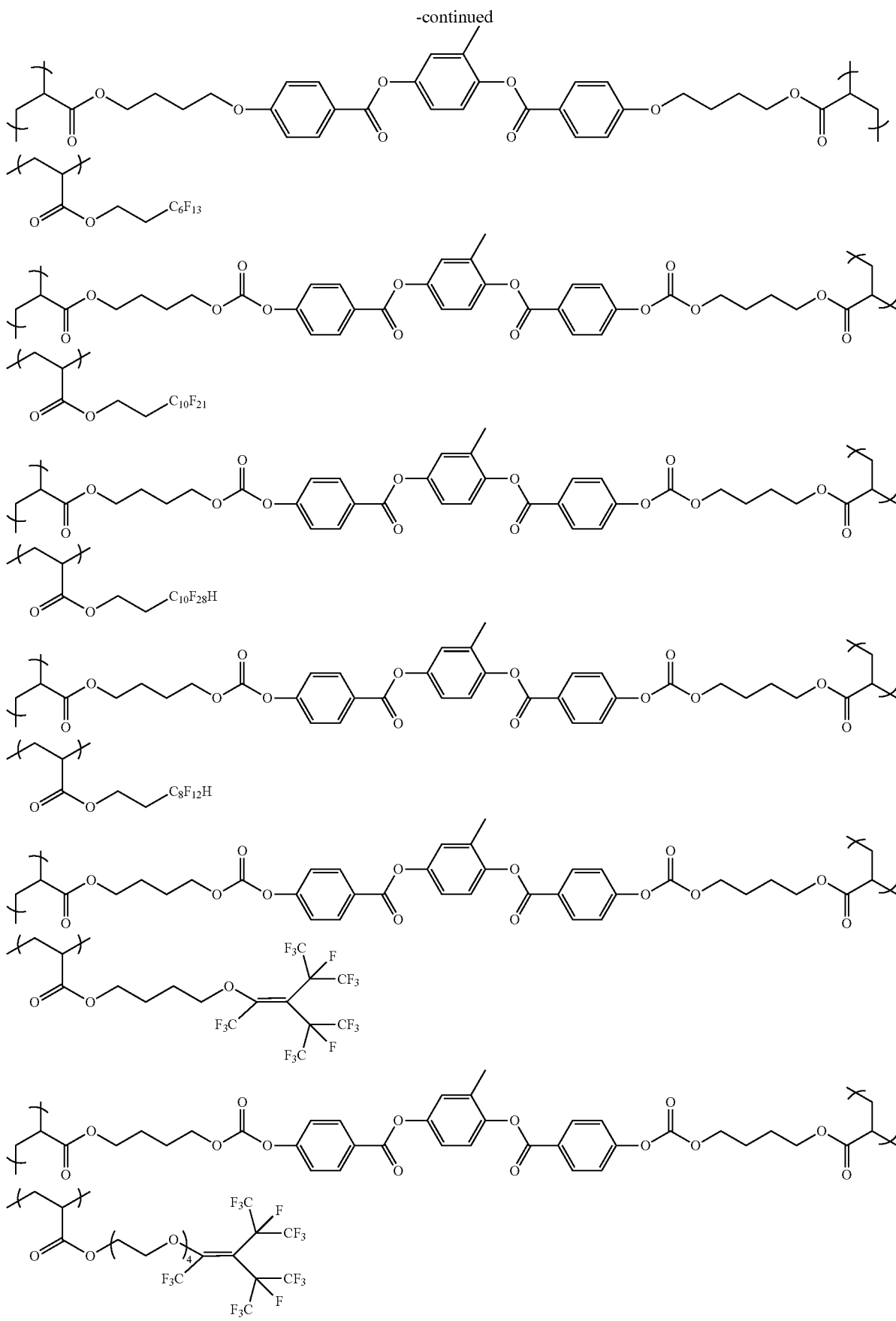

-continued
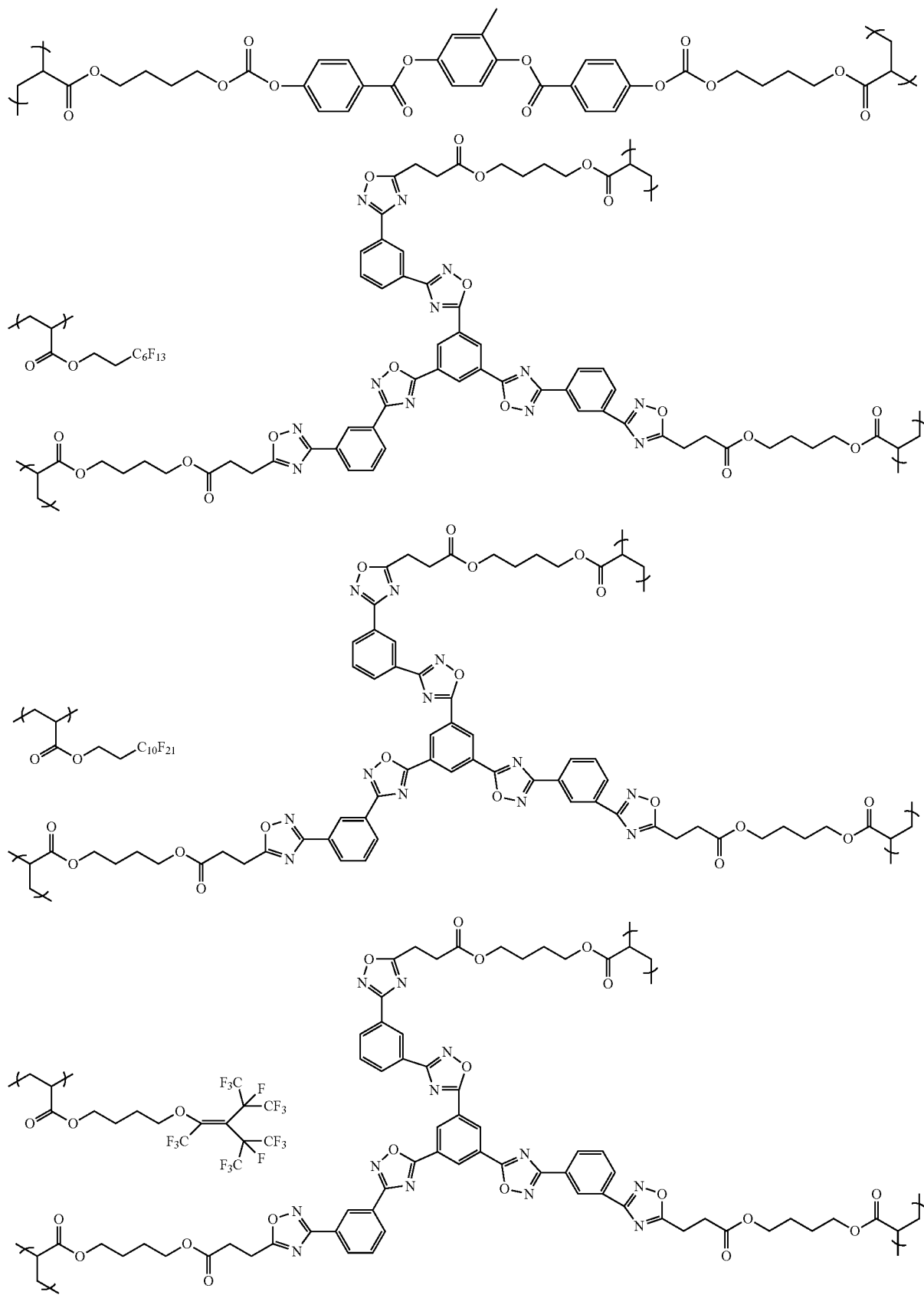

-continued
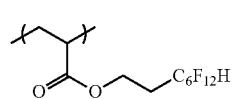
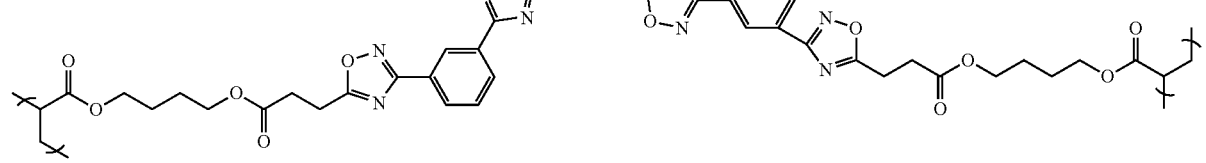
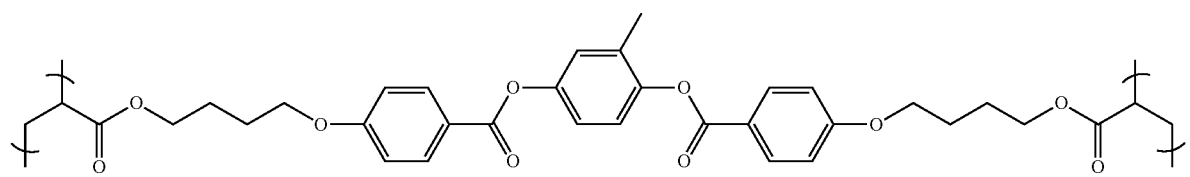
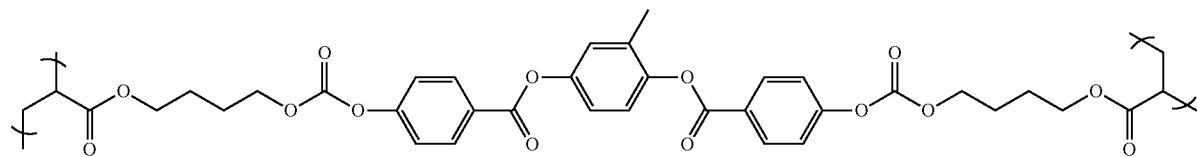
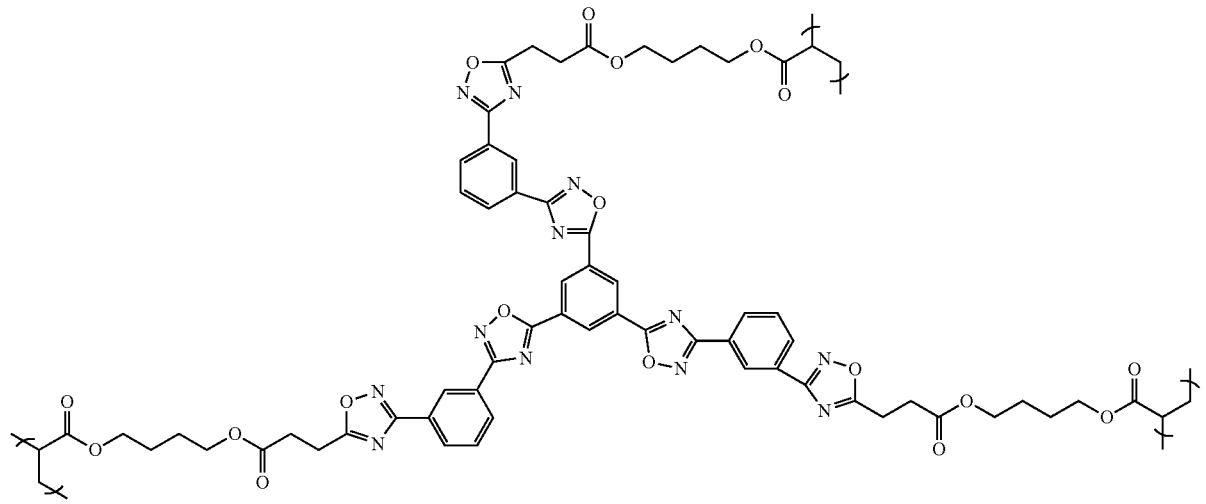

-continued

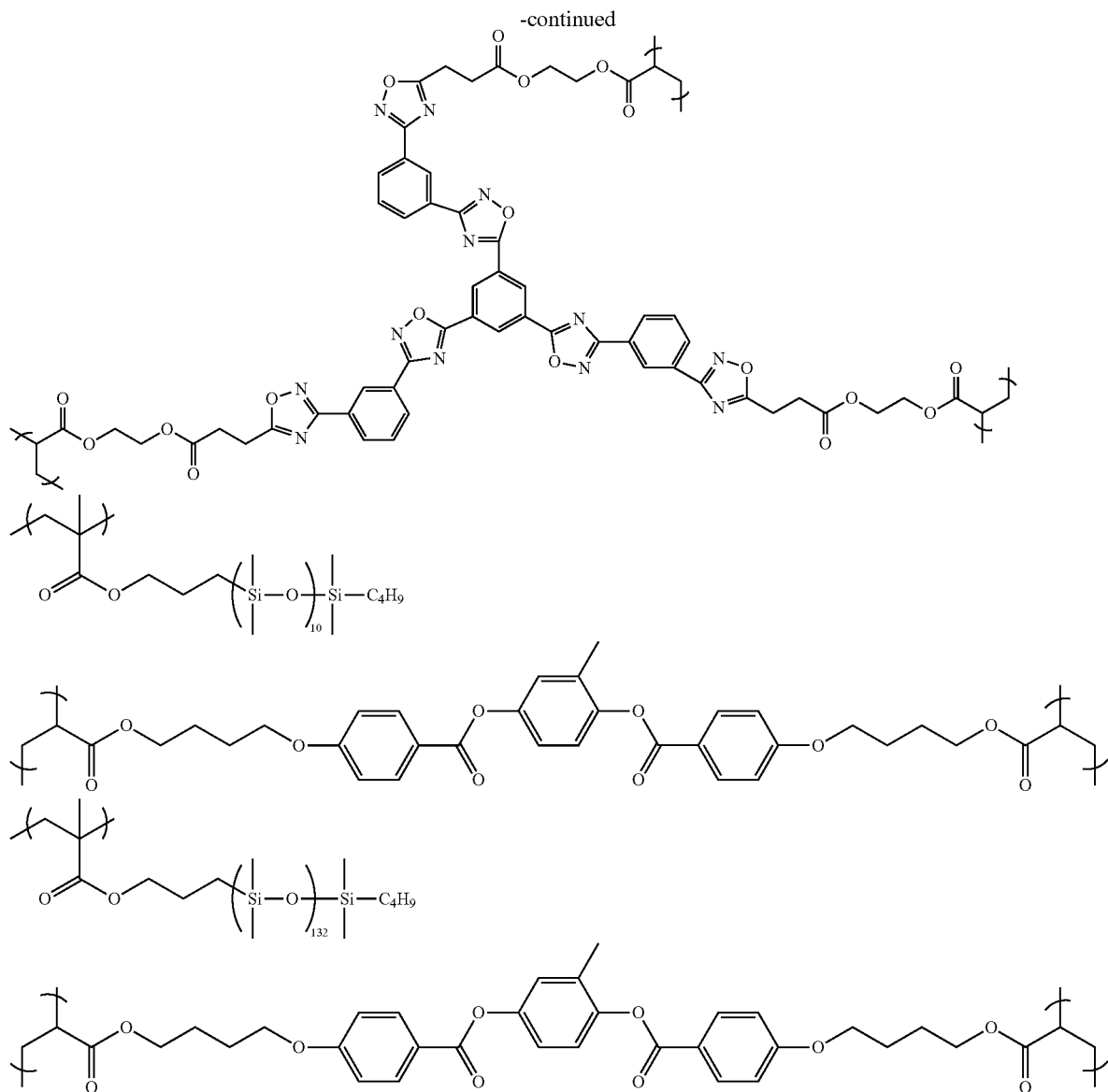

[Optical Film]

An optical film according to an embodiment of the present invention will be described with reference to FIG. 1. FIG. 1 is a schematic sectional view of the optical film of this embodiment. In FIG. 1, the scale of each unit is illustrated by being suitably changed in order to be easily recognized. An optical film 10 includes a λ/4 layer 12, and a liquid crystal layer 13 and a liquid crystal layer 14 which are adjacent to each other on a support 11, and the liquid crystal layer 13 includes a liquid crystal layer containing the polymer of the present invention or a liquid crystal layer formed by curing a composition containing the polymer of the present invention (hereinafter, also referred to as a "liquid crystal layer"). The optical film may be formed of only the liquid crystal layer, may further include a liquid crystal layer, or may include other layers in addition to the liquid crystal layer. Examples of the other layers include an orientation layer, a surface protective layer, and the like. In addition, the optical film may further include a liquid crystal layer other than the liquid crystal layer formed of the composition containing the polymer of the present invention.

In addition, it is preferable that the optical film 10 includes a layer formed by immobilizing a cholesteric liquid crystalline phase, and it is also preferable that the liquid crystal layer 13 is a layer formed by immobilizing a cholesteric liquid crystalline phase.

As illustrated in FIG. 1, it is preferable that the optical film 10 has a structure including the liquid crystal layer (the liquid crystal layer 13) close to the support 11 as a lower layer and the liquid crystal layer 14 formed by coating a composition containing the polymer of the present invention, a liquid crystal component, and a solvent as an upper layer on the surface of the lower layer. At this time, the solvent of the composition can be selected from the organic solvents exemplified as described above. A structure is also preferable in which a similar layer is further formed on the surface of the liquid crystal layer 14, and the optical film 10 may be a laminated film of 3 to 10 liquid crystal layers which are similarly formed.

In the optical film 10, it is preferable that one the liquid crystal layer 13 and the liquid crystal layer 14 is a layer formed of a composition containing a rod-like liquid crystal compound, and the other is a layer formed of a composition containing a disk-like liquid crystal compound. Further, it is also preferable that one of the liquid crystal layer 13 and the liquid crystal layer 14 is a layer formed by curing a composition containing a polymerizable rod-like liquid crystal compound, and the other is a layer formed by curing a composition containing a polymerizable disk-like liquid crystal compound. It is more preferable that the liquid crystal layer 13 is a layer containing a disk-like liquid crystal compound, and the liquid crystal layer 14 is a layer containing a rod-like liquid crystal compound.

The usage of the optical film 10 is not particularly limited. Examples of the optical film include a phase difference film, a reflective film, an optical absorptive film, and the like. More specifically, examples of the optical film include an optical compensation film, a polarizing film, and a brightness enhancement film which are used in a liquid crystal display device or the like, a heat insulating film, a film for projection, and the like.

The optical film prepared by using the polymer of the present invention may be a support film for preparing a laminated film in addition to an aspect of the optical film 10 of the embodiment described above. The support film includes the lower layer described above (the liquid crystal layer 13). It is preferable that the support film includes the liquid crystal layer 13 as the outermost film or includes only a film which can be easily peeled off, such as a laminated film, on the outside of the liquid crystal layer 13. It is preferable that the liquid crystal layer 13 of the support film is a liquid crystal layer. It is more preferable that the liquid crystal layer 13 of the support film is a layer formed by curing a composition containing a polymerizable disk-like liquid crystal compound. The support film may include a layer such as a support, an orientation layer, other liquid crystal layers, in addition to the liquid crystal layer 13.

(Support)

Glass or a polymer film can be used as the support 11. Examples of the material of the polymer film which is used as the support include a cellulose acylate film (for example, a cellulose triacetate film (a refractive index of 1.48), a cellulose diacetate film, a cellulose acetate butyrate film, and a cellulose acetate propionate film), polyolefin such as polyethylene and polypropylene, a polyester-based resin film such as polyethylene terephthalate or polyethylene naphthalate, a polyether sulfone film, a polyacrylic resin film such as polymethyl methacrylate, a polyurethane-based resin film, a polyester film, a polycarbonate film, a polysulfone film, a polyether film, a polymethyl pentene film, a polyether ketone film, a (meth)acryl nitrile film, polyolefin, a polymer having an alicyclic structure ((a norbornene-based resin (Product Name "ARTON", manufactured by JSR Corporation)), amorphous polyolefin (Product Name "ZEONEX", manufactured by ZEON CORPORATION)), and the like. Among them, the triacetyl cellulose, the polyethylene terephthalate, and the polymer having the alicyclic structure are preferable, and the triacetyl cellulose is particularly preferable.

The support may be a temporary support which is not included in the optical film by being peeled off after the liquid crystal layer is formed.

A film thickness of the support may be approximately 5 μm to 1000 μm, is preferably 10 μm to 250 μm, and is more preferably 15 μm to 90 μm.

(Orientation Layer)

The optical film may include an orientation layer. When a layer containing a liquid crystal compound is formed, the orientation layer is used for orienting molecules of the liquid crystal compound in the composition for preparing a liquid crystal layer.

The orientation layer is used at the time of forming a layer such as a liquid crystal layer, and in the optical film, the orientation layer may be or may not be included.

The orientation layer can be disposed by means such as a rubbing treatment of an organic compound (preferably a polymer), oblique vapor deposition of an inorganic compound such as SiO, and formation of a layer including a micro groove. Further, an orientation layer is also known in which an orientation function is generated by applying an electric field, by applying a magnetic field, or by performing light irradiation.

The orientation layer may not be disposed according to the material of the lower layer such as the support and the liquid crystal layer, and the lower layer can function as the orientation layer by performing a direct orientation treatment (for example, a rubbing treatment). Examples of the support which becomes the lower layer can include PET.

In addition, in a case where a direct layer is laminated on the liquid crystal layer, there is also a case where the liquid crystal layer of the lower layer functions as the orientation layer, and the liquid crystal compound for preparing the upper layer can be oriented. In such a case, the orientation layer may not be disposed, and the liquid crystal compound of the upper layer can be oriented even in a case where a special orientation treatment (for example, a rubbing treatment) is not performed.

Hereinafter, a rubbing treatment orientation layer and a photo orientation layer which are used by performing a rubbing treatment with respect to the surface thereof will be described as a preferred example.

—Rubbing Treatment Orientation Layer—

Examples of a polymer which can be used in the rubbing treatment orientation layer include a methacrylate-based copolymer, a styrene-based copolymer, polyolefin, polyvinyl alcohol, modified polyvinyl alcohol, poly(N-methylol acrylamide), polyester, polyimide, a vinyl acetate copolymer, carboxy methyl cellulose, polycarbonate, and the like which are described in paragraph [0022] of the specification of JP1996-338913A (JP-H08-338913A). A silane coupling agent can be used as the polymer. A water-soluble polymer (for example, poly(N-methylol acrylamide), carboxy methyl cellulose, gelatin, polyvinyl alcohol, and modified polyvinyl alcohol) is preferable, the gelatin, the polyvinyl alcohol, and the modified polyvinyl alcohol are more preferable, and the polyvinyl alcohol and the modified polyvinyl alcohol are most preferable.

The composition described above is applied onto a rubbing treatment surface of the orientation layer, and thus, the molecules of the liquid crystal compound are oriented. After that, as necessary, an orientation layer polymer reacts with a polyfunctional monomer contained in an optical anisotropic layer, or the orientation layer polymer is crosslinked by using a crosslinking agent, and thus, the optical anisotropic layer described above can be formed.

It is preferable that a film thickness of the orientation layer is in a range of 0.1 to 10 μm. —Rubbing Treatment—

The surface of the orientation layer, the support, or the other layers onto which the composition for preparing a liquid crystal layer is applied, as necessary, may be subjected to a rubbing treatment. In general, the rubbing treatment can be performed by rubbing a surface of a film containing a polymer as a main component with paper or cloth in a constant direction. A general method of the rubbing treatment, for example, is described in "Liquid Crystal Handbook" (published by MARUZEN PUBLISHING CO., LTD. Oct. 30, 2000).

A method described in "Liquid Crystal Handbook" (published by MARUZEN PUBLISHING CO., LTD.) can be used as a method of changing a rubbing density. A rubbing density (L) is quantified by Formula (A) described below.

$$L = Nl(1 + 2\pi rn/60v) \quad \text{Formula (A)}$$

In Formula (A), N is the number of times of rubbing, l is a contact length of a rubbing roller, r is a radius of the roller, n is the number of rotations of the roller (rpm), and v is a stage movement speed (per second).

In order to increase the rubbing density, the number of times of rubbing may increase, the contact length of the rubbing roller may lengthen, the radius of the roller may increase, the number of rotations of the roller may increase, and the stage movement speed may be slow, whereas, in order to decrease the rubbing density, the opposite may be done. In addition, conditions at the time of performing the rubbing treatment can be referred to as the description in JP4052558B.

—Photo Orientation Layer—

A photo orientation material used in the photo orientation layer which is formed by light irradiation is described in a plurality of literatures. Examples of the photo orientation material include an azo compound described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B, an aromatic ester compound described in JP2002-229039A, a maleimide compound and/or a nadiimide compound substituted with alkenyl which have a photo orientation unit are described in JP2002-265541A and JP2002-317013A, a photocrosslinking silane derivative described in JP4205195B and JP4205198B, and photocrosslinking polyimide, polyamide, or ester described in JP2003-520878A, JP2004-529220A, and JP4162850B as a preferred example. The azo compound, the photocrosslinking polyimide, the polyamide, or the ester is particularly preferable.

The photo orientation layer formed of the material described above is subjected to linearly polarized light irradiation or non-polarized light irradiation, and thus, the photo orientation layer is manufactured.

Herein, "the linearly polarized light irradiation" is an operation for allowing the photo orientation material to perform a photoreaction. A wavelength of light to be used is different according to the photo orientation material to be used, and the wavelength is not particularly limited insofar as the wavelength is a wavelength necessary for the photoreaction. It is preferable that a peak wavelength of light which is used in light irradiation is 200 nm to 700 nm, and ultraviolet light of which a peak wavelength is less than or equal to 400 nm is more preferable.

A light source used in the light irradiation is light source which is generally used, and examples of the light source can include a lamp such as a tungsten lamp, a halogen lamp, a xenon lamp, a xenon flash lamp, a mercury lamp, a mercury xenon lamp, and a carbon arc lamp, various lasers (for example, a semiconductor laser, a helium neon laser, an argon ion laser, a helium cadmium laser, and a YAG laser), a light emitting diode, a cathode ray tube, and the like.

A method using a polarizing plate (for example, an iodine polarizing plate, a dichroic dye polarizing plate, and a wire grid polarizing plate), a method using a prism-based element (for example, a GLAN-THOMSON prism) or a reflective polarizer using a BREWSTER angle, or a method using light exiting from a laser light source including polarized light can be adopted as means for obtaining the linearly polarized light. In addition, only light having a necessary wavelength may be selectively emitted by using a filter, a wavelength conversion element, or the like.

In a case of the linearly polarized light, a method is adopted in which light to be emitted is emitted to the upper surface with respect to the orientation layer, is vertically emitted with respect to the surface of the orientation layer from the back surface, or is emitted from an oblique direction. An incidence angle of the light is different according to the photo orientation material, and for example, the incidence angle is 0° to 90° (vertical), and is preferably 40° to 90°.

In a case where the non-polarized light is used, the non-polarized light is emitted from the oblique direction. An incidence angle is 10° to 80°, is preferably 20° to 60°, and is particularly preferably 30° to 50°.

An irradiation time is preferably 1 minute to 60 minutes, and is more preferably 1 minute to 10 minutes.

[Composition]

A composition of the present invention contains the mesogenic group-containing polymer of the present invention. It is preferable that the composition of the present invention further contains a liquid crystal compound.

(Composition for Preparing Liquid Crystal Layer)

A composition for preparing a liquid crystal layer of the present invention is a composition containing the mesogenic group-containing polymer described above and a liquid crystal compound, and preferably containing a polymerizable liquid crystal compound. According to the present invention, the composition for preparing a liquid crystal layer is provided in which cissing rarely occurs at the time of performing coating. Preferably, a liquid crystal composition is provided in which when the liquid crystal layer is used as the lower layer, and the upper layer is applied onto the surface of the liquid crystal layer, cissing rarely occurs at the time of applying a coating liquid for forming an upper layer. In a case where the composition for preparing a liquid crystal layer of the present invention is used, it is possible to manufacture an optical film including a liquid crystal layer in which cissing rarely occurs at the time of applying the coating liquid for forming an upper layer. For this reason, it is possible to manufacture a laminated film having various functions by using the composition for preparing a liquid crystal layer of the present invention.

The composition for preparing a liquid crystal layer of the present invention contains a mesogenic group-containing polymer. The content of the mesogenic group-containing polymer in the composition for preparing a liquid crystal layer is 0.0001 mass % to 10 mass %, is preferably 0.001 mass % to 5 mass %, and is more preferably 0.005 mass % to 3 mass %, with respect to a liquid crystalline compound.

The present inventors have found that it is possible to prepare a liquid crystal layer in which cissing rarely occurs at the time of performing coating and a film surface is homogeneous without having unevenness by using a composition containing the mesogenic group-containing polymer at a constant ratio described above. In particular, it has been found that it is possible to suppress cissing at the time of forming the upper layer which is a problem in the preparation of the laminated film. The mechanism is not apparent, but is assumed as described below. That is, when the coating is performed, it is possible to prevent cissing since the polarity of the composition is close to the polarity of a base material, in particular, a liquid crystal layer, and thus, is easily wet. In addition, when the composition is a copolymer with a fluorine-containing monomer, surface transitivity is improved, and the surface tension of the coating liquid decreases, and thus, a surface condition smoothing (leveling) function is exhibited. In addition, it is considered that resistance properties with respect to wind in the surrounding environment are improved, and optical unevenness rarely occurs, and thus, cissing can be suppressed.

(Solvent)

It is preferable that the composition of the present invention contains a solvent. The solvent may be a low surface tension solvent or a standard surface tension solvent. Among them, it is preferable that the composition for forming a liquid crystal layer contains the low surface tension solvent.

The surface tension of the low surface tension solvent is 10 to 22 mN/m (10 to 22 dyn/cm), is preferably 15 to 21 mN/m, and is more preferably 18 to 20 mN/m. The surface tension of the standard surface tension solvent is greater than 22 mN/m, is preferably 23 to 50 mN/m, and is more preferably 23 to 40 mN/m.

In addition, a difference between the surface tension of the low surface tension solvent and the surface tension of the standard surface tension solvent is preferably greater than or equal to 2 mN/m, is more preferably greater than or equal to 3 mN/m, is even more preferably 4 to 20 mN/m, and is particularly preferably 5 to 15 mN/m.

Furthermore, herein, the surface tension of the solvent is a value described in a solvent handbook (published by KODANSHA LTD. in 1976). The surface tension of the solvent, for example, is a physical property value which can be measured by using an automatic surface tensiometer CBVP-A3 manufactured by Kyowa Interface Science Co., Ltd. The measurement may be performed in conditions of 25° C.

An organic solvent is preferably used as the solvent, and the low surface tension solvent and the standard surface tension solvent can be selected from the organic solvent. Examples of the organic solvent include alcohol (for example, ethanol and tert-butyl alcohol), amide (for example, N,N-dimethyl formamide), sulfoxide (for example, dimethyl sulfoxide), a heterocyclic compound (for example, pyridine), hydrocarbon (for example, heptane, cyclopentane, toluene, hexane, and tetrafluoroethylene), alkyl halide (for example, chloroform and dichloromethane), ester (for example, methyl acetate, butyl acetate, and isopropyl acetate), ketone (for example, acetone, methyl ethyl ketone, and cyclohexanone), ether (for example, tetrahydrofuran and 1,2-dimethoxy ethane), and amine (for example, triethyl amine) Two or more types of organic solvents may be used together. The solvent which is used as a solvent at the time of performing polymerization can be used as the solvent of the composition without being removed. Examples of the solvent include toluene.

Examples of the low surface tension solvent include tert-butyl alcohol (19.5 mN/m), tetrafluoroethylene (TFE, 20.6 mN/m), triethyl amine (20.7 mN/m), cyclopentane (21.8 mN/m), heptane (19.6 mN/m), a mixed solvent formed of a combination of two or more types of the solvents, and the like. The numerical value indicates the surface tension. Among them, the tert-butyl alcohol, the tetrafluoroethylene, the triethyl amine, and the cyclopentane are preferable, the tert-butyl alcohol or the tetrafluoroethylene is more preferable, and the tert-butyl alcohol is even more preferable, from the viewpoint of stability.

Examples of the standard surface tension solvent include methyl ethyl ketone (MEK, 23.9 mN/m), methyl acetate (24.8 mN/m), methyl isobutyl ketone (MIBK, 25.4 mN/m), cyclohexanone (34.5 mN/m), acetone (23.7 mN/m), isopropyl acetate (22.1 mN/m), a mixed solvent formed of a combination of two or more types of the solvents, and the like. The numerical value indicates the surface tension. Among them, the methyl ethyl ketone, a mixed solvent of the cyclohexanone and another solvent, a mixed solvent of the methyl acetate and the methyl isobutyl ketone, and the like are preferable.

The concentration of the solvent with respect to total mass of the composition for preparing a liquid crystal layer is preferably 95 to 50 mass %, is more preferably 93 to 60 mass %, and is even more preferably 90 to 75 mass %.

In a drying step at the time of forming the liquid crystal layer, the solvent of the composition for preparing a liquid crystal layer is preferably removed by greater than or equal to 95 mass %, is more preferably removed by greater than or equal to 98 mass %, is even more preferably removed by greater than or equal to 99 mass %, and is particularly preferably removed by substantially 100 mass %, with respect to the total amount of the solvent.

(Liquid Crystal Compound)

The liquid crystal compound contains a low molecular liquid crystal compound. In the present invention, the low molecular indicates that a degree of polymerization is less than 100. In addition, a rod-like liquid crystal compound and a disk-like liquid crystal compound are included as the liquid crystal compound.

(Polymerizable Liquid Crystal Compound)

The polymerizable liquid crystal compound indicates a liquid crystal compound having a polymerizable group. Examples of the polymerizable group can include an acryloyl group, a methacryloyl group, an epoxy group, a vinyl group, and the like. By curing the polymerizable liquid crystal compound, it is possible to immobilize the orientation of the liquid crystal compound, and it is possible to use the liquid crystal compound in an optical compensation film or the like.

Azomethines, azoxys, cyanobiphenyls, cyanophenyl esters, benzoic acid esters, cyclohexane carboxylic acid phenyl esters, cyanophenyl cyclohexanes, phenyl pyrimidines substituted with cyano, phenyl pyrimidines substituted with alkoxy, phenyl dioxanes, tolans, and alkenyl cyclohexyl benzonitriles are preferably used as the rod-like liquid crystal compound.

Compounds described in Makromol. Chem., Vol. 190, P. 2255 (1989), Advanced Materials Vol. 5, P. 107 (1993), and each publication of U.S. Pat. Nos. 4,683,327A, 5,622,648A, 5,770,107A, WO95/22586A, WO95/24455A, WO97/00600A, WO98/23580A, WO98/52905A, JP1989-272551A (JP-H01-272551A), JP1994-16616A (JP-H06-16616A), JP1995-110469A (JP-H07-110469A), JP1999-80081A (JP-H11-80081A), and JP2001-64627, and the like can be used as the rod-like liquid crystal compound which is the polymerizable liquid crystal compound. Further, for example, a rod-like liquid crystal compound described in JP1999-513019A (JP-H11-513019A) or JP2007-279688A can be preferably used as the rod-like liquid crystal compound.

Examples of the disk-like liquid crystal compound include a compound described in JP2007-108732A or JP2010-244038A.

(Polymerization Initiator)

In a case or the like where the liquid crystal layer is formed by curing the composition according to polymerization of a polymerizable compound, the liquid crystal component may contain a polymerization initiator.

Examples of the polymerization initiator include an α-carbonyl compound (described in each specification of U.S. Pat. Nos. 2,367,661A and 2,367,670A), acyloin ether (described in the specification of U.S. Pat. No. 2,448,828A), an aromatic acyloin compound substituted with α-hydrocarbon (described in the specification of U.S. Pat. No. 2,722,512A), a multinuclear quinone compound (described in each specification of U.S. Pat. Nos. 3,046,127A and 2,951,758A), a combination between a triaryl imidazole dimer and p-aminophenyl ketone (described in the specification of U.S. Pat. No. 3,549,367A), an acridine compound and a phenazine compound (described in JP1985-105667A (JP-S60-105667A) and in the specification of U.S. Pat. No. 4,239,850A), an oxadiazole compound (described in the specification of U.S. Pat. No. 4,212,970A), an acyl phosphine oxide compound (described in JP1988-40799B (JP-S63-40799B), JP1993-29234B (JP-H05-29234B), JP1998-95788A (JP-H10-95788A), and JP1998-29997A (JP-H10-29997A), and the like.

(Chiral Agent)

The liquid crystal layer formed of the composition for preparing a liquid crystal layer may be a layer formed by immobilizing a cholesteric liquid crystalline phase. In this case, it is preferable that the liquid crystal component contains a chiral agent.

The chiral agent can be selected from various known chiral agents (for example, a chiral agent for TN and STN described in Liquid Crystal Device Handbook, Chapter 3, Section 4-3, Page 199, edited by the 142nd committee of Japan Society for the Promotion of Science, 1989). In general, the chiral agent includes an asymmetric carbon atom, but an axial asymmetric compound or a planar asymmetric compound which does not include the asymmetric carbon atom can also be used as the chiral agent. Examples of the axial asymmetric compound or the planar asymmetric compound include binaphthyl, helicene, paracyclophane, and a derivative thereof. The chiral agent may have a polymerizable group. In a case where the chiral agent has a polymerizable group, and the rod-like liquid crystal compound to be used together also has a polymerizable group, it is possible to form a polymer having a repeating unit derived from the rod-like liquid crystal compound and a repeating unit derived from the chiral agent by a polymerization reaction between the chiral agent having the polymerizable group and the polymerizable rod-like liquid crystal compound. In this aspect, it is preferable that the polymerizable group of the chiral agent having the polymerizable group is identical to the polymerizable group of the polymerizable rod-like liquid crystal compound. Accordingly, the polymerizable group of the chiral agent is preferably an unsaturated polymerizable group, an epoxy group, or an aziridinyl group, is more preferably an unsaturated polymerizable group, and is particularly preferably an ethylenically unsaturated polymerizable group.

In addition, the chiral agent may be a liquid crystal compound.

Examples of the chiral agent exhibiting a strong twisting force include chiral agents described in JP2010-181852A, JP2003-287623A, JP2002-80851A, JP2002-80478A, and JP2002-302487A, and the chiral agents can be preferably used. Further, isomannide compounds having a corresponding structure can be used as isosorbide compounds described in the publications, and isosorbide compounds having a corresponding structure can be used as isomannide compounds described in the publications.

(Fluorine-Based Surfactant and Silicone-Based Surfactant)

The composition of the present invention may contain a fluorine-based surfactant and a silicone-based surfactant. It is preferable that the content of the fluorine-based surfactant and the silicone-based surfactant in the composition for preparing a liquid crystal layer is less than or equal to 5 mass % with respect to the total mass of the composition.

The fluorine-based surfactant is a compound containing fluorine, and is a compound which is unevenly distributed on a surface of a solvent to be used in the composition for preparing a liquid crystal layer. Examples of a fluorine-based surfactant having a hydrophilic portion include a compound containing fluorine in compounds described in paragraphs 0028 to 0034 of JP2011-191582A as an orientation control agent, a fluorine-based surfactant described in JP2841611B, a fluorine-based surfactant described in paragraphs 0017 to 0019 of JP2005-272560A, and the like.

Examples of a commercially available product of the fluorine-based surfactant can include SURFLON manufactured by AGC SEIMI CHEMICAL CO., LTD., MEGAFACE manufactured by manufactured by DIC Corporation, or the like.

The silicone-based surfactant is a compound containing silicone, and is a compound which is unevenly distributed on a surface of a solvent to be used in the composition for preparing a liquid crystal layer.

Examples of the silicone-based surfactant include polymethyl phenyl siloxane, polyether-modified silicone oil, polyether-modified dimethyl polysiloxane, dimethyl silicone, diphenyl silicone, hydrogen-modified polysiloxane, vinyl-modified polysiloxane, hydroxy-modified polysiloxane, aminomodified polysiloxane, carboxyl-modified polysiloxane, chloro-modified polysiloxane, epoxy-modified polysiloxane, methacryloxy-modified polysiloxane, mercapto-modified polysiloxane, fluorine-modified polysiloxane, long-chain alkyl-modified polysiloxane, phenyl-modified polysiloxane, silicon atom-containing low molecular compound such as a silicone-modified copolymer, and the like.

Examples of a commercially available product of the silicone-based surfactant can include KF-96 and X-22-945 manufactured by Shin-Etsu Chemical Co., Ltd., TORAY SILICONE DC3PA, TORAY SILICONE DC7PA, TORAY SILICONE SH11PA, TORAY SILICONE SH21PA, TORAY SILICONE SH28PA, TORAY SILICONE SH29PA, TORAY SILICONE SH30PA, and TORAY SILICONE FS-1265-300 (all are manufactured by Dow Corning Toray Co., Ltd.), TSF-4300, TSF-4440, TSF-4445, TSF-4446, TSF-4452, and TSF-4460 (all are manufactured by GE Toshiba Silicones Co., Ltd.), POLYSILOXANE POLYMER KP341 (manufactured by Shin-Etsu Chemical Co., Ltd.), BYK-301, BYK-302, BYK-307, BYK-325, BYK-331, BYK-333, BYK-341, BYK-345, BYK-346, BYK-348, and BYK-375 (all are manufactured by BYK Japan KK.), ARON GS-30 (manufactured by TOAGOSEI CO., LTD.), SILICONE L-75, SILICONE L-76, SILICONE L-77, SILICONE L-78, SILICONE L-79, SILICONE L-520, and SILICONE L-530 (all are manufactured by Nippon Unica Systems Co., Ltd.), and the like.

<Formation of Liquid Crystal Layer>

The liquid crystal layer is formed of a coated film which is formed of the composition of the present invention. The liquid crystal layer, for example, may be a layer formed by applying the composition onto the support, and by drying the obtained coated film, and may be a layer formed through a curing step in which light irradiation, heating, or the like is performed.

The composition of the present invention can be applied by a method or the like in which the composition is spread by using a suitable method such as a roll coating method, a gravure printing method, and a spin coating method. Further, the composition of the present invention can be applied by various methods such as a wire bar coating method, an extrusion coating method, a direct gravure coating method, a reverse gravure coating method, and a die coating method. In addition, the composition can be ejected from a nozzle by using an ink jet device, and thus, the coated film can also be formed.

The drying may be performed by being left to stand, or may be performed by being heated. In the drying step, an optical function derived from a liquid crystal component may be exhibited. For example, in a case where the liquid crystal component contains a liquid crystal compound, the liquid crystalline phase may be formed in a process where a solvent is removed by drying. The liquid crystalline phase may be formed by setting the temperature to a transition temperature of a liquid crystalline phase by heating. For example, first, heating is performed to a temperature of an isotropic phase, and after that, cooling is performed to the transition temperature of the liquid crystal phase, and thus, the state of the liquid crystalline phase can be stably obtained. The transition temperature of the liquid crystal phase is preferably in a range of 10° C. to 250° C., and is more preferably in a range of 10° C. to 150° C., from the viewpoint of manufacturing suitability or the like. In a case where the transition temperature of the liquid crystal phase is lower than 10° C., a cooling step or the like is necessary in order to lower the temperature to a temperature range in which the liquid crystalline phase is exhibited. In addition, in a case where the transition temperature of the liquid crystal phase is higher than 250° C., first, a high temperature is necessary in order to obtain an isotropic liquid state at a temperature higher than the temperature range in which the liquid crystalline phase is exhibited, and thus, it is disadvantageous from the viewpoint of waste of thermal energy, deformation or modification of a substrate, and the like.

For example, in a case where the liquid crystal component contains a polymerizable compound, it is preferable that the film after being dried described above is cured. In a case where the liquid crystal component contains a polymerizable liquid crystal compound, it is possible to maintain and immobilize an orientation state of the molecules of the liquid crystal compound by curing. The curing can be performed by a polymerization reaction of a polymerizable group in the polymerizable compound.

The polymerization reaction includes a thermal polymerization reaction using a thermal polymerization initiator and a photopolymerization reaction using a photopolymerization initiator. The photopolymerization reaction is preferable. In light irradiation for polymerizing the polymerizable compound, in particular, the polymerizable liquid crystal compound, an ultraviolet ray is preferably used. Irradiation energy is preferably 50 mJ/cm$^2$ to 1,000 mJ/cm$^2$, and is more preferably 100 to 800 mJ/cm$^2$. In order to accelerate the photopolymerization reaction, the light irradiation may be performed under heating conditions.

In order to accelerate a curing reaction, ultraviolet ray irradiation may be performed under heating conditions. In addition, an oxygen concentration in the atmosphere is relevant to a degree of polymerization, and thus, in a case where a desired degree of polymerization is not obtained in the air, and a film strength is insufficient, it is preferable to decrease the oxygen concentration in the atmosphere by a method of nitrogen substitution. The oxygen concentration is preferably less than or equal to 10%, is more preferably less than or equal to 7%, and is most preferably less than or equal to 3%.

A reaction rate of the curing reaction (for example, a polymerization reaction) performed by the ultraviolet ray irradiation is preferably greater than or equal to 60%, is more preferably greater than or equal to 70%, and is even more preferably greater than or equal to 80%, from the viewpoint of retaining a mechanical strength of a layer or suppressing outflow of an unreacted substance from the layer. In order to improve the reaction rate, a method of increasing the irradiation dose of the ultraviolet ray to be emitted or polymerization under a nitrogen atmosphere or under heating conditions is effective. In addition, it is possible to use a method in which first, the polymerization is performed, and then, the polymerizable compound is retained in a temperature state higher than a polymerization temperature, and thus, the reaction is further accelerated by the thermal polymerization reaction or a method in which an ultraviolet ray is emitted again. The reaction rate can be measured by comparing absorption intensities of an infrared vibration spectrum of a reactive group (for example polymerizable group) before and after the reaction.

It is sufficient that optical properties based on the orientation of the molecules of the liquid crystal compound of the liquid crystal layer using the liquid crystal compound as the liquid crystal component, for example, optical properties of a cholesteric liquid crystalline phase are retained in the layer, and it is not necessary to exhibit liquid crystallinity of the liquid crystal composition of the liquid crystal layer after being cured any more. For example, the molecules of the liquid crystal compound have a high molecular weight by the curing reaction, and thus, the liquid crystallinity may not be exhibited any more.

It is also preferable that the liquid crystal layer is a cholesteric liquid crystal layer formed by immobilizing a cholesteric liquid crystalline phase. The cholesteric liquid crystal layer and a manufacturing method of the cholesteric liquid crystal layer, for example, can be referred to the description in JP1989-133003A (JP-H01-133003A), JP3416302B, JP3363565B, and JP1996-271731A (JP-H08-271731A).

<Manufacturing Method of Optical Film>

The optical film can be manufactured by forming the liquid crystal layer on the support as described above. The support may be peeled off after the liquid crystal layer is formed.

Herein, "on the support" indicates "directly on the surface of the support" or "through other layers formed on the surface of the support".

The liquid crystal layer may be formed on a surface of a layer which is formed in advance.

It is preferable that the liquid crystal layer is further formed on the surface of the liquid crystal layer as described above. In the liquid crystal layer formed of the composition for preparing a liquid crystal layer of the present invention, cissing rarely occurs, and thus, it is possible to prepare various laminated optical films. In particular, it is preferable that the composition of the present invention is directly applied onto the surface of the liquid crystal layer which is formed in advance. When the coated film is formed of the composition of the present invention, cissing rarely occurs, surface conditions are excellent, and an orientation defect can also be reduced.

Hereinafter, a liquid crystal display device of the present invention will be described.

[Liquid Crystal Display Device]

Figure 2:
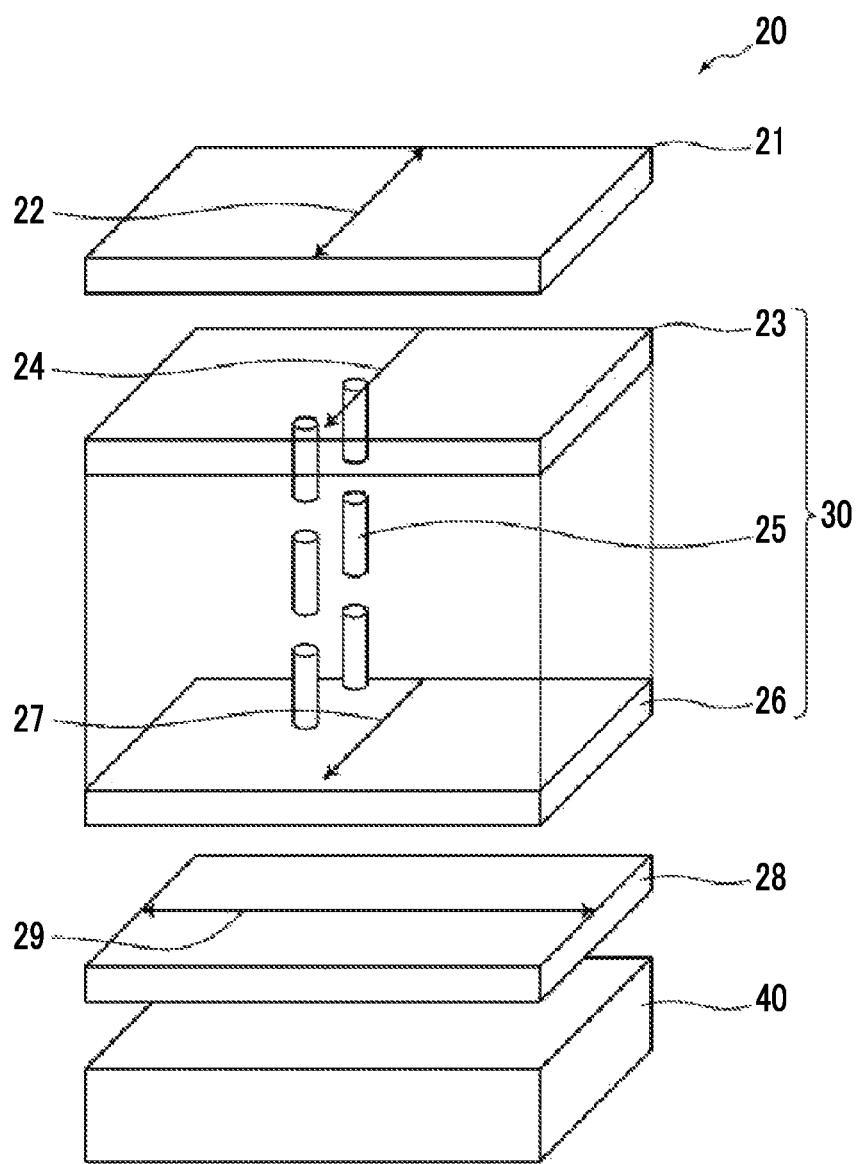
FIG. 2 is a schematic view illustrating configuration of a liquid crystal display device of an embodiment of the present invention.
Figure 3:
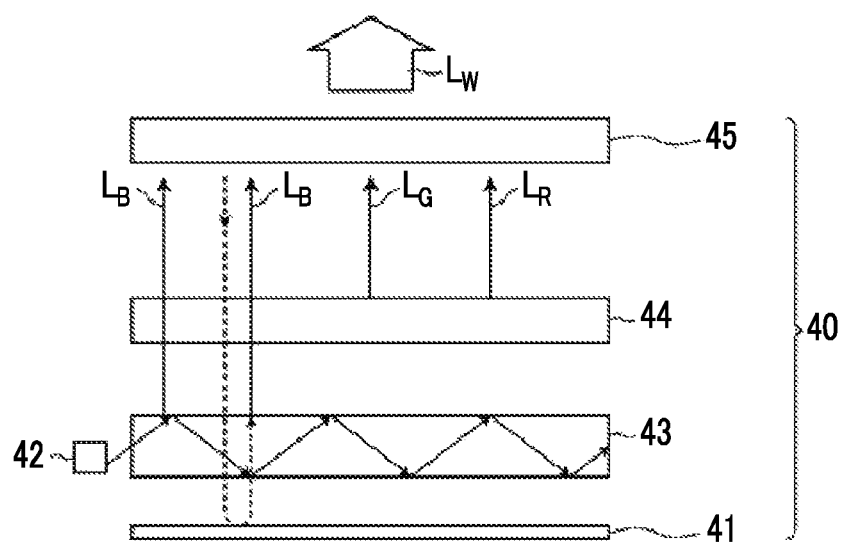
FIG. 3 is a schematic sectional view of a backlight in the liquid crystal display device of the embodiment of the present invention.

An optical film of the present invention can be used as a brightness enhancement film which is used in a backlight of a liquid crystal display device. Hereinafter, a liquid crystal display device which is an embodiment of the present invention will be described. FIG. 2 is a schematic view illustrating a configuration of a liquid crystal display device 20 which is the embodiment according to the present invention. FIG. 3 is a schematic sectional view of a backlight unit.

As illustrated in FIG. 2, the liquid crystal display device 20 includes a pair of polarizing plates (an upper side polarizing plate 21 and a lower side polarizing plate 28), a liquid crystal cell 30 sandwiched between the polarizing plates, and a backlight unit 40 on the surface of the lower side polarizing plate 28 on a side opposite to the liquid crystal cell, and the liquid crystal cell 30 includes a liquid crystal 25, and a liquid crystal cell upper electrode substrate 23 and a liquid crystal cell lower electrode substrate 26 which are arranged on and below the liquid crystal 25. Furthermore, the backlight unit 40 includes a polarized light emitting film, and thus, the lower side polarizing plate 28 can also be omitted.

In a case where the liquid crystal display device 20 is used as a transmissive liquid crystal display device, an aspect is obtained in which the upper side polarizing plate 21 is set to a front side (visible side) polarizing plate, the lower side polarizing plate 28 is set to a rear side (backlight side) polarizing plate, a color filter (not illustrated) is disposed between the liquid crystal 25 and the upper side polarizing plate 21. In FIG. 2, the reference numerals 22 and 29 indicate directions absorption axes of the respective polarizing plates which are approximately orthogonal to each other, and the reference numerals 24 and 27 indicate orientation control directions of the respective electrode substrates.

As illustrated in FIG. 3, the backlight unit 40 includes a light source 42 which allows primary light (blue light $L_B$) to exit, a light guide plate 43 which guides the primary light exiting from the light source 42 and allows the primary light to exit, a wavelength conversion member 44 which is disposed on the light guide plate 43, a brightness enhancement film 45 which is disposed to face the light source 42 through the wavelength conversion member 44, and a reflective plate 41 which is disposed to face the wavelength conversion member 44 through the light guide plate 43. The wavelength conversion member 44 emits fluorescent light by using at least a part of the primary light $L_B$ exiting from the light source 42 as exciting light, and allows secondary light ($L_G$ and $L_R$) formed of the fluorescent light and the primary light $L_B$ which has been transmitted through the wavelength conversion member 44 to exit. The backlight unit 40 allows white light $L_W$ to exit by the secondary light ($L_G$ and $L_R$) and the primary light $L_B$ which has been transmitted through the wavelength conversion member 44.

The brightness enhancement film 45 includes the optical film 10 of the present invention.

A light source emitting blue light having a light emission center wavelength in a wavelength range of 430 nm to 480 nm, for example, a blue light emitting diode emitting blue light can be used as the light source 42. In a case where the light source emitting blue light is used, it is preferable that the wavelength conversion member 44 contains at least a quantum dot R which is excited by exciting light and emits red light, and a quantum dot G emitting green light. Accordingly, the blue light which is emitted from the light source and is transmitted through the wavelength conversion member can embody white light by the red light and the green light emitted from the wavelength conversion member.

Alternatively, in another aspect, a light source emitting ultraviolet light having a light emission center wavelength in a wavelength range of 300 nm to 430 nm, for example, an ultraviolet ray light emitting diode can be used as the light source. In this case, it is preferable that the wavelength conversion member 44 contains a quantum dot B which is excited by exciting light and emits blue light, along with the quantum dots R and G. Accordingly, it is possible to embody white light the red light, the green light, and the blue light emitted from the wavelength conversion member.

In addition, in the another aspect, a laser light source can be used instead of the light emitting diode.

The light source includes a light source which emits blue light having a light emission center wavelength in a wavelength range of 430 to 500 nm, green light having a light emission center wavelength in a wavelength range of 500 to 600 nm, and red light having at least a part of a light emission intensity peak in a wavelength range of 600 to 700 nm, and thus, an aspect of a light source other than the light source described above may be a white light source such as a white light emitting diode (LED).

In a case where the backlight unit 40 includes the light guide plate 43, the wavelength conversion member 44 is disposed on a path of light exiting from the light guide plate 43. A known light guide plate can be used as the light guide plate 43 without any limitation. In addition, the backlight unit 40 can include a reflective member in the rear portion of the light guide plate 43. Such a reflective member is not particularly limited, known reflective members described in JP3416302B, JP3363565B, JP4091978B, JP3448626B, and the like can be used, and the contents of the publications are incorporated in the present invention.

It is also preferable that the backlight unit 40 further includes a known diffusion plate or a known diffusion sheet, a prism sheet (for example, BEF series manufactured by Sumitomo 3M Limited, and the like), and a light guide device. The other members are also described in JP3416302B, JP3363565B, JP4091978B, JP3448626B, and the like, and the contents of the publications are incorporated in the present invention.

Furthermore, in the liquid crystal display device including the backlight unit described above, a driving mode of the liquid crystal cell is not particularly limited, and various modes such as a twisted nematic (TN) mode, a super twisted nematic (STN) mode, a vertical alignment (VA) mode, an in-plane switching (IPS) mode, and an optically compensated bend cell (OCB) mode can be used. It is preferable that the liquid crystal cell is in the VA mode, the OCB mode, the IPS mode, or the TN mode, but the liquid crystal cell is not limited thereto. Examples of the configuration of the liquid crystal display device in the VA mode include a configuration illustrated in FIG. 2 of JP2008-262161A. Here, a specific configuration of the liquid crystal display device is not particularly limited, and a known configuration can be adopted.

The brightness enhancement film of the backlight unit includes the optical film of the present invention, and thus, in particular, a red wavelength conversion range and a green wavelength conversion range widen, and a backlight and a liquid crystal display device having a high brightness can be obtained.

EXAMPLES

Hereinafter, the present invention will be described in more detail with reference to examples. Materials, test reagents, the amount of substances and ratios thereof, operations, and the like of the following examples can be suitably changed unless the changes cause deviance from the gist of the present invention. Accordingly, the range of the present invention will not be restrictively interpreted by the following examples.

Synthesis Example 1

(Synthesis Example of Polymer 101)

25.0 g of toluene was put into a three-neck flask of 300 milliliters which was provided with a stirrer, a thermometer, a reflux cooling pipe, and a nitrogen gas introduction pipe, and was heated to 120° C. Subsequently, a mixed solution formed of 4.2 g (6.8 millimoles) of 2-(perfluorodecyl) ethyl acrylate, 1.3 g (2.1 millimoles) of a difunctional rod-like liquid crystal compound represented by Formula (A) described below, 25.0 g of toluene, and 4.7 g of a polymerization initiator "V-601" (manufactured by Wako Pure Chemical Industries, Ltd.) was subjected to dropwise addition at a constant velocity such that the dropwise addition completed in 30 minutes. After the dropwise addition completed, stirring was further performed for 2 hours, and then, a solvent was distilled under reduced pressure, and drying was performed at 130° C. under reduced pressure, and thus, 5.0 g of a polymer (101) of the present invention was obtained. A weight-average molecular weight (Mw) of the polymer was 5,500 (calculated in terms of polystyrene by using a gel permeation chromatography (GPC), a column which was used was TSKgel SuperHZM-H, TSKgel SuperHZ4000, and TSKgel SuperHZ200 (manufactured by TOSOH CORPORATION)). It was confirmed that the polymer (101) had a branched structure by a proton nuclear magnetic resonance (NMR) spectrum measurement and element analysis measurement. In addition, it was confirmed that a polymerization initiator segment at the time of using V-601 had a structure described below by proton NMR spectrum measurement and mass analysis measurement.

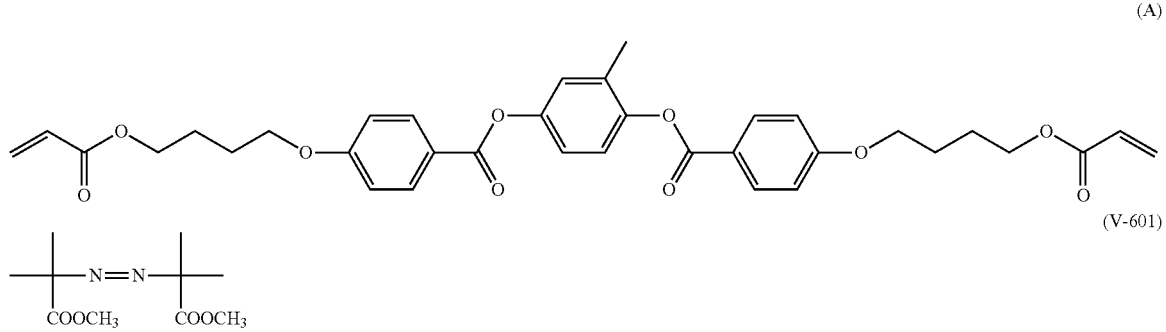

(A)

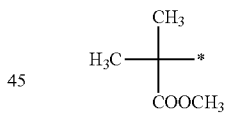

(V-601)

(Polymerization Initiator Segment)

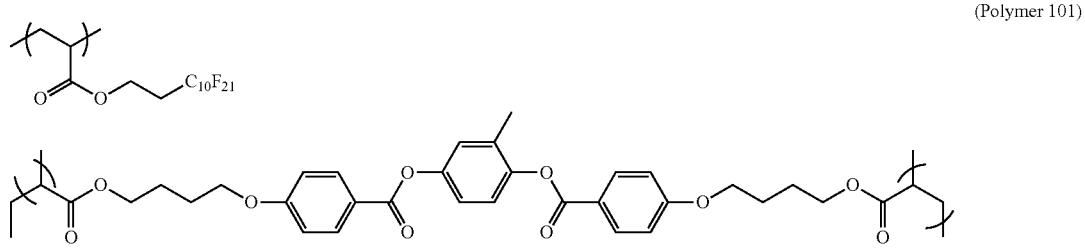

(Polymer 101)

Synthesis Examples 2 to 12

Polymers 102 to 112 of the present invention were synthesized by the same method as that in Synthesis Example 1 except that a monomer and a compositional ratio were respectively changed as shown in Table 1.

(Mesogenic Group-Containing Monomer)
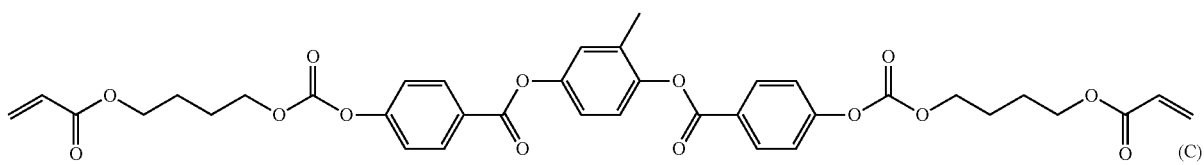
(B)
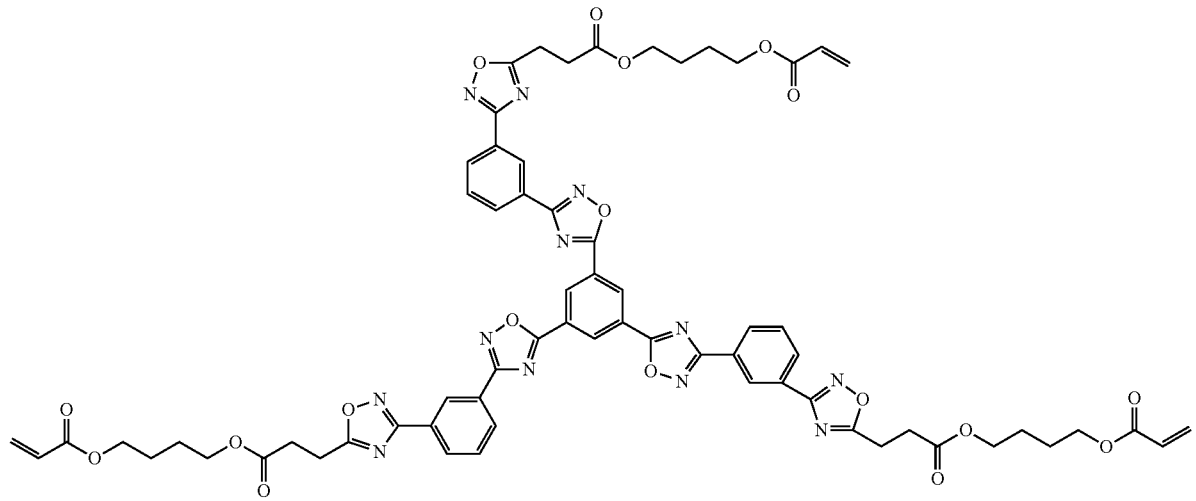
(C)
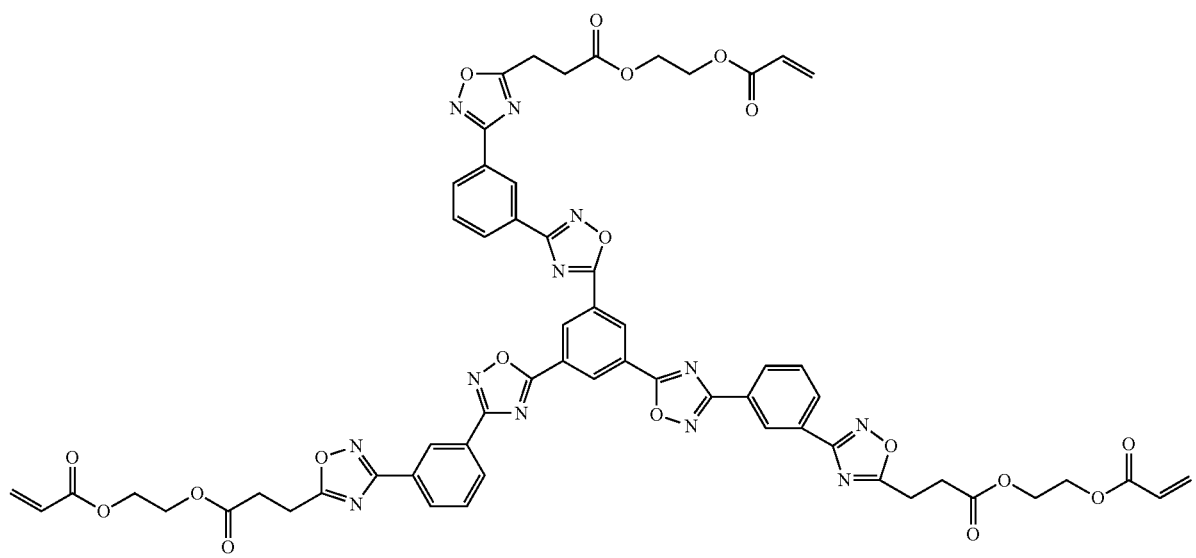
(D)
TABLE 1
| | Polymer | Mesogenic Group-Containing Monomer Type | Parts by Mass | Fluorine-Containing Monomer Type | Parts by Mass | Double Bond Residual Ratio (mol %) | Polymerization Initiator Type | Amount [eq. (mol)]* | Molecular Weight (GPC) Mw(k) | Mn(k) | Mw/Mn |
|---|---|---|---|---|---|---|---|---|---|---|---|
| 101 | Synthesis Example 1 | A | 24 | C10FA | 76 | 0 | V-601 | 9.7 | 5.5 | 0.7 | 7.40 |
| 102 | Synthesis Example 2 | A | 24 | C6FA | 76 | 0 | V-601 | 2.4 | 17.7 | 1.8 | 9.74 |
| 103 | Synthesis Example 3 | C | 41 | C6FA | 59 | 0 | V-601 | 2.9 | 17.8 | 2.6 | 6.77 |

TABLE 1-continued

| | Polymer | Mesogenic Group-Containing Monomer Type | Parts by Mass | Fluorine-Containing Monomer Type | Parts by Mass | Double Bond Residual Ratio (mol %) | Polymerization Initiator Type | Amount [eq. (mol)]* | Molecular Weight (GPC) Mw(k) | Mn(k) | Mw/Mn |
|---|---|---|---|---|---|---|---|---|---|---|---|
| 104 | Synthesis Example 4 | B | 24 | C10FA | 76 | 0 | V-601 | 9.8 | 4.1 | 0.7 | 5.73 |
| 105 | Synthesis Example 5 | D | 32 | C6FA | 68 | 0 | V-601 | 3.5 | 10.1 | 2.6 | 3.88 |
| 106 | Synthesis Example 6 | A | 44 | C10FA | 56 | 0 | V-601 | 6.7 | 8.8 | 1.2 | 7.33 |
| 107 | Synthesis Example 7 | C | 50 | C8FA | 50 | 0 | V-601 | 7.5 | 7.7 | 1.3 | 5.92 |
| 108 | Synthesis Example 8 | A | 60 | C6FA | 40 | 0 | V-601 | 2.6 | 12.5 | 1.3 | 9.62 |
| 109 | Synthesis Example 9 | A | 100 | None | — | 0 | V-601 | 8.5 | 5.2 | 0.9 | 5.78 |
| 110 | Synthesis Example 10 | A | 52 | C6FHA | 48 | 0 | V-601 | 3.2 | 9.7 | 1.1 | 8.82 |
| 111 | Synthesis Example 11 | A | 24 | C6FA | 76 | 0 | V-601 | 11.8 | 4.0 | 0.6 | 6.68 |
| 112 | Synthesis Example 12 | A | 20 | C6FA | 80 | 50 | V-601 | 5.8 | 6.5 | 1.8 | 3.61 |

*Equivalent with respect to Di(Poly)functional Monomer

Furthermore, elision marks in Table 1 indicate as follows.

C6FHA: 1H,1H,7H-Dodecafluoroheptyl Acrylate
C6FA: 2-(Perfluorohexyl) Ethyl Acrylate
C8FA: 2-(Perfluorooctyl) Ethyl Acrylate
C10FA: 2-(Perfluorodecyl) Ethyl Acrylate <<Preparation of Optical Film>>

Optical films of the examples and the comparative examples using the polymers 101 to 112 obtained as described above were prepared. The optical film was formed by sequentially laminating an orientation layer, a λ/4 layer, an orientation layer, a liquid crystal layer 1, and a liquid crystal layer 2 on a support. A formation method and a coating liquid of each layer will be described below.

Example 1

(Support: TD40UL)

A commercially available cellulose acylate film "TD40UL" (manufactured by Fujifilm Corporation) was used as the support. Hereinafter, the support will be referred to as TD40UL.

(TD40UL with Orientation Layer)

—Alkali Saponification Treatment—

TD40UL passed through dielectric heating rolls at a temperature of 60° C., and a surface temperature of a film rose to 40° C., and then, an alkali solution having a composition described below was applied onto one surface of the film at a coating amount of 14 ml/m² by using a bar coater, and the film was handled for 10 seconds under a steam type far infrared heater manufactured by NORITAKE CO., LIMITED, which was heated at 110° C. Subsequently, 3 ml/m² of pure water was applied by using the same bar coater. Subsequently, water washing using a fountain coater and drainage using an air knife were repeated three times, and then, the film was dried by being handled into a drying zone at 70° C. for 10 seconds, and thus, a cellulose acylate film which had been subjected to an alkali saponification treatment was prepared.

—Alkali Solution Composition—

| | |
|---|---|
| Potassium Hydroxide | 4.7 parts by mass |
| Water | 15.8 parts by mass |
| Isopropanol | 63.7 parts by mass |
| Surfactant SF-1: $C_{14}H_{29}O(CH_2CH_2O)_{20}H$ | 1.0 part by mass |
| Propylene Glycol | 14.8 parts by mass |

—Formation of Orientation Layer—

An orientation layer coating liquid having a composition described below was continuously applied onto a long cellulose acetate film which has been subjected to the saponification treatment as described above by using a wire bar of #14. The orientation layer coating liquid was dried by hot air at 60° C. for 60 seconds, and further dried by hot air at 100° C. for 120 seconds. The obtained coated film was continuously subjected to a rubbing treatment, and thus, an orientation layer was prepared. At this time, a longitudinal direction and a handling direction of the long film were parallel to each other, and a rotation axis of a rubbing roller was in a direction of 45° in a clockwise direction with respect to a film longitudinal direction.

—Composition of Orientation Layer Coating Liquid—

| | |
|---|---|
| Modified Polyvinyl Alcohol Described below | 10 parts by mass |
| Water | 371 parts by mass |
| Methanol | 119 parts by mass |
| Glutar Aldehyde | 0.5 parts by mass |
| Photopolymerization Initiator (IRGACURE 2959, manufactured by BASF SE) | 0.3 parts by mass |

A structural formula of the modified polyvinyl alcohol in the orientation layer coating liquid will be described below. In the structural formula described below, a ratio is a molar ratio.

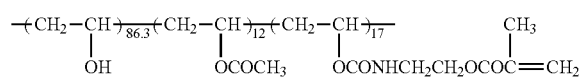

(TD40UL+Orientation Layer+λ/4 Layer)

A coating liquid A1 containing a disk-like liquid crystal compound having a composition described below was continuously applied onto the orientation layer prepared as described above by using a wire bar of #3.6. A handling velocity (V) of the film was 20 m/min. In order to dry the solvent of the coating liquid and to perform orientation and aging with respect to the disk-like liquid crystal compound, heating was performed by hot air at 80° C. for 90 seconds. Subsequently, UV irradiation was performed at 60° C., and thus, a λ/4 layer formed by immobilizing the orientation of the liquid crystal compound was formed. At this time, UV irradiation dose was 230 mJ/cm$^2$.

—Coating Liquid A1—

| | |
|---|---|
| Disk-Like Liquid Crystal Compound (Compound 301) | 80 parts by mass |
| Disk-Like Liquid Crystal Compound (Compound 302) | 20 parts by mass |
| Orientation Auxiliary Agent 1 | 0.9 parts by mass |
| Orientation Auxiliary Agent 2 | 0.1 parts by mass |
| Surfactant 1 (MEGAFACE F444, manufactured by DIC Corporation) | 0.12 parts by mass |
| Polymerization Initiator 1 | 3 parts by mass |
| Methyl Ethyl Ketone | 250 parts by mass |
| tert-Butanol | 50 parts by mass |

Compound 301

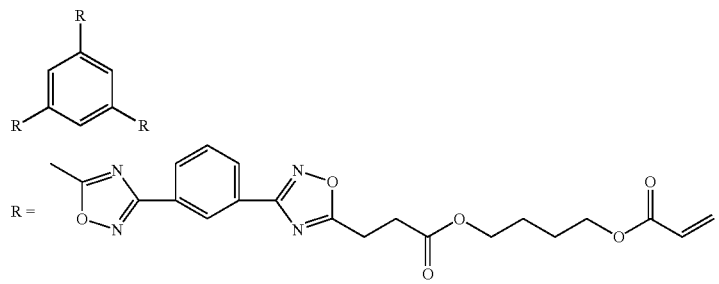

Compound 302

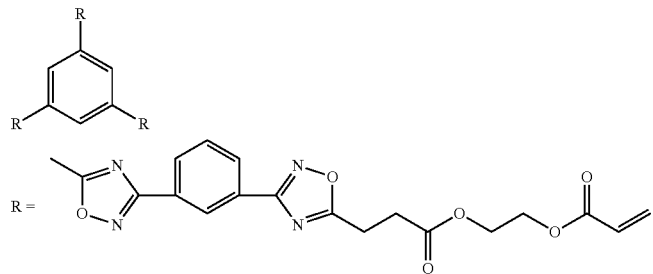

Orientation Auxiliary Agent 1

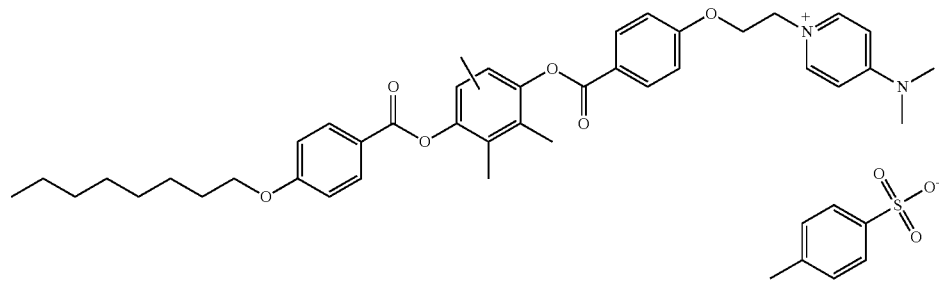

Orientation Auxiliary Agent 2

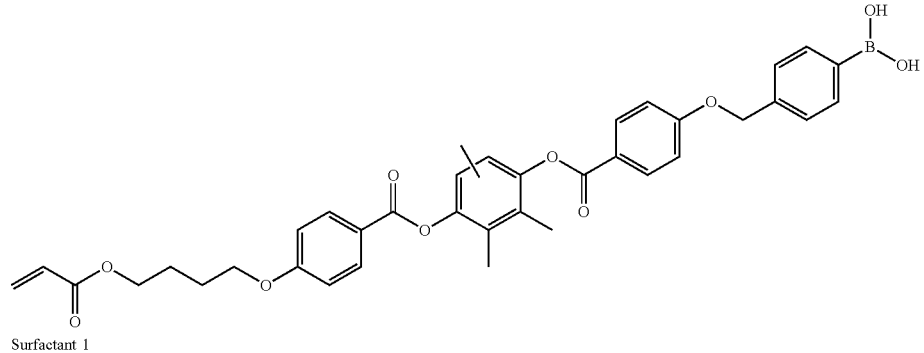

Surfactant 1

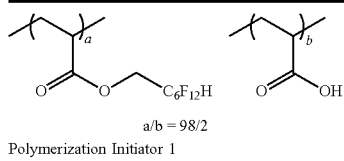

a/b = 98/2

Polymerization Initiator 1

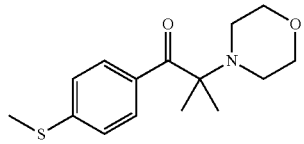

Each of the orientation auxiliary agents 1 and 2 described above is a mixture of two types of compounds having different substituted positions of a methyl group in a benzene ring substituted with trimethyl (a mixing ratio of two types of compounds of 50:50 (a mass ratio)). In addition, in the description of "a/b=98/2" of the surfactant 1, a indicates 98 mass %, and b indicates 2 mass %.

(TD40UL+Orientation Layer+λ/4 Layer+Orientation Layer)

The orientation layer was prepared on the surface of the λ/4 layer as described above.

(TD40UL+Orientation Layer+λ/4 Layer+Orientation Layer+Liquid Crystal Layer 1)

A coating liquid B1 described below was continuously applied onto the surface of the laminated structure (TD40UL+Orientation Layer+λ/4+Orientation Layer) described above such that a film thickness was adjusted to be 3 μm. Subsequently, the solvent was dried at 70° C. for 2 minutes, and the solvent was gasified, and then, heating and aging were performed at 115° C. for 3 minutes, and thus, a homogeneous orientation state was obtained. After that, the coated film was retained at 45° C., and was subjected to ultraviolet ray irradiation under a nitrogen atmosphere by using a high pressure mercury lamp, and thus, a cholesteric liquid crystal layer was formed. At this time, UV irradiation dose was 250 mJ/cm².

—Coating Liquid B1—

| | |
|---|---|
| Disk-Like Liquid Crystal Compound (Compound 301) | 80 parts by mass |
| Disk-Like Liquid Crystal Compound (Compound 302) | 20 parts by mass |
| Polymerizable Monomer | 10 parts by mass |
| Surfactant 1 (MEGAFACE F444, manufactured by DIC Corporation) | 0.18 parts by mass |
| Polymerization Initiator 1 | 3 parts by mass |
| Chiral Agent 1 | 3.8 parts by mass |
| Methyl Ethyl Ketone | 290 parts by mass |
| Cyclohexanone | 50 parts by mass |

Polymerizable Monomer

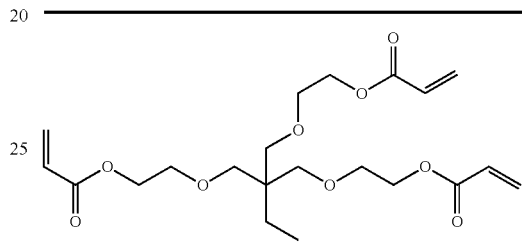

Surfactant 1

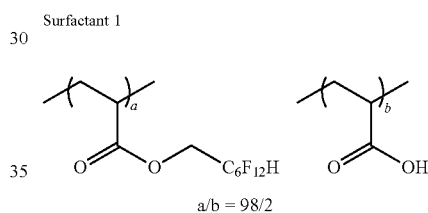

a/b = 98/2

Chiral Agent 1

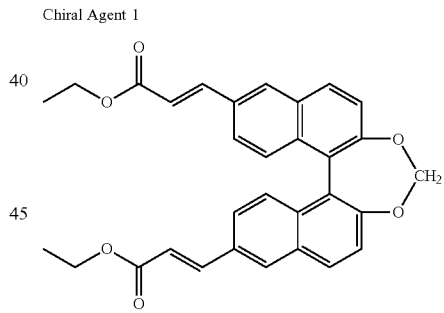

(TD40UL+Orientation Layer+λ/4 Layer+Orientation Layer+Liquid Crystal Layer 1+Liquid Crystal Layer 2)

A coating liquid C1 containing a rod-like liquid crystal compound having a composition described below was continuously applied onto the surface of the liquid crystal layer 1 prepared from the coating liquid B1 described above such that a film thickness was adjusted to be 5 μm. A handling velocity of the film was 20 m/min. In order to dry the solvent of the coating liquid and to perform orientation and aging with respect to the rod-like liquid crystal compound, heating was performed by hot air at 85° C. for 120 seconds. Subsequently, UV irradiation was performed at 30° C., and the orientation of the liquid crystal compound was immobilized, and thus, an optical anisotropic layer (a liquid crystal layer 2) was formed. At this time, UV irradiation dose was 300 mJ/cm².

—Coating Liquid C1—

| | |
|---|---|
| Rod-Like Liquid Crystal Compound 201 | 83 parts by mass |
| Rod-Like Liquid Crystal Compound 202 | 15 parts by mass |
| Rod-Like Liquid Crystal Compound 203 | 2 parts by mass |
| Polyfunctional Monomer A-TMMT (manufactured by Shin Nakamura Chemical Co., Ltd.) | 1 part by mass |
| Polymerization Initiator IRGACURE 819 (manufactured by BASF SE) | 4 parts by mass |
| Polymer 101 of Present Invention | 0.25 parts by mass |
| Chiral Agent LC756 (manufactured by BASF SE) | 5.1 parts by mass |
| Toluene | 165 parts by mass |
| Cyclohexanone | 10 parts by mass |

Rod-Like Liquid Crystal Compound 201

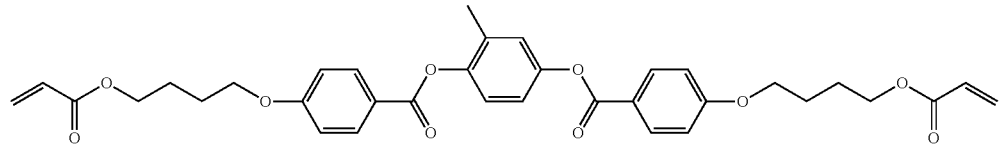

Rod-Like Liquid Crystal Compound 202

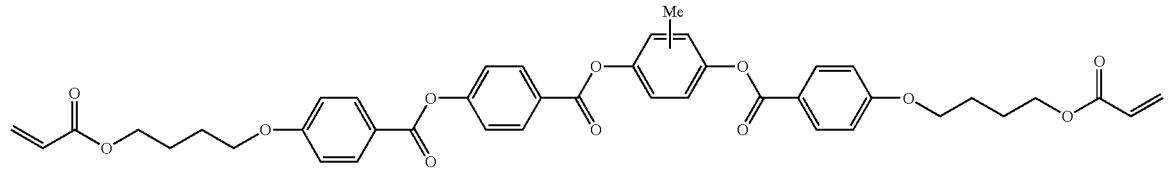

Rod-Like Liquid Crystal Compound 203

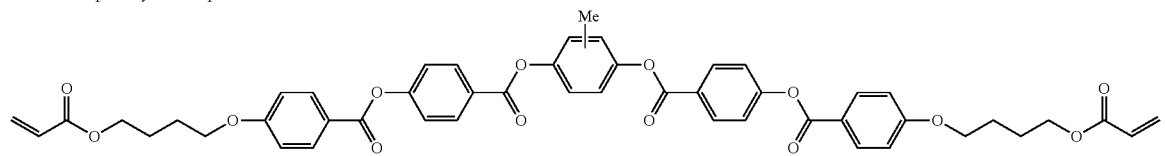

Examples 2 to 22

An optical film was prepared by the same method as that in Example 1 except that the coating liquids A1, B1, and C1 described above and coating liquids A2, B2, B3, and C2 to C12 described below were used, and the optical film had a configuration shown in Table 2.

Furthermore, the coating liquids C2 to C12 were prepared by the same prescription as that of the coating liquid C1 except that the polymers 102 to 112 were used instead of the polymer 101, and the added amount was changed as shown in Table 2.

—Coating Liquid A2—

| | |
|---|---|
| Disk-Like Liquid Crystal Compound (Compound 301) | 80 parts by mass |
| Disk-Like Liquid Crystal Compound (Compound 302) | 20 parts by mass |
| Orientation Auxiliary Agent 1 | 0.9 parts by mass |
| Orientation Auxiliary Agent 2 | 0.1 parts by mass |
| Polymerizable Monomer (VISCOAT #360, manufactured by OSAKA ORGANIC CHEMICAL INDUSTRY LTD.) | 10 parts by mass |
| Surfactant (MEGAFACE F444, manufactured by DIC Corporation) | 0.12 parts by mass |
| Fluorine-Containing Compound 1 | 0.03 parts by mass |
| Polymerization Initiator 1 | 3 parts by mass |
| Methyl Ethyl Ketone | 218.7 parts by mass |
| tert-Butanol | 62.5 parts by mass |
| Cyclohexanone | 31.2 parts by mass |

—Coating Liquid B2—

| | |
|---|---|
| Disk-Like Liquid Crystal Compound (Compound 301) | 80 parts by mass |
| Disk-Like Liquid Crystal Compound (Compound 302) | 20 parts by mass |
| Polymerizable Monomer | 10 parts by mass |
| Surfactant 1 (MEGAFACE F444, manufactured by DIC Corporation) | 0.18 parts by mass |
| Polymer 101 of Present Invention | 0.05 parts by mass |
| Polymerization Initiator 1 | 3 parts by mass |
| Chiral Agent 1 | 3.8 parts by mass |
| Methyl Ethyl Ketone | 290 parts by mass |
| Cyclohexanone | 50 parts by mass |

The polymerizable monomer is identical to that used in the coating liquid B1.

—Coating Liquid B3—

| | |
|---|---|
| Disk-Like Liquid Crystal Compound (Compound 301) | 80 parts by mass |
| Disk-Like Liquid Crystal Compound (Compound 302) | 20 parts by mass |
| Surfactant (MEGAFACE F444, manufactured by DIC Corporation) | 0.18 parts by mass |
| Fluorine-Containing Compound 1 | 0.03 parts by mass |
| Polymerization Initiator 1 | 3 parts by mass |
| CHIRAL AGENT 1 | 5.1 parts by mass |
| Methyl Ethyl Ketone | 125.2 parts by mass |
| tert-Butanol | 38.5 parts by mass |
| Cyclohexanone | 28.9 parts by mass |

The fluorine-containing compound 1 has a structure described below.
Fluorine-Containing Compound 1

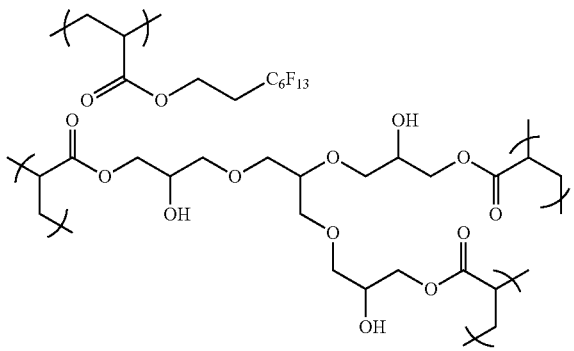

<Comparative Synthesis Example 1>
50.0 g of toluene was put into a three-neck flask of 300 milliliter which was provided with a stirrer, a thermometer, a reflux cooling pipe, and a nitrogen gas introduction pipe, and was heated to 120° C. Subsequently, a mixed solution formed of 8.4 g (20.0 millimoles) of 2-(perfluorohexyl) ethyl acrylate, 2.6 g (20.0 millimoles) of divinyl benzene, 50.0 g of toluene, and 4.6 g of a polymerization initiator "V-601" (manufactured by Wako Pure Chemical Industries, Ltd.) was subjected to dropwise addition at a constant velocity such that the dropwise addition completed in 30 minutes. After the dropwise addition completed, stirring was performed for 2 hours, and then, a solvent was distilled under reduced pressure, drying was performed at 120° C. under reduced pressure, and the solution was solved in 30 g of methyl ethyl ketone. The solution was reprecipitated in 100 g of methanol, and thus, 3.8 g of a comparative example compound (H-101) was obtained. A weight-average molecular weight (Mw) of the polymer was 16,600 (calculated in terms of polystyrene by using a gel permeation chromatography (GPC), a column which was used was TSKgel SuperHZM-H, TSKgel SuperHZ4000, and TSKgel SuperHZ200 (manufactured by TOSOH CORPORATION)).

Hereinafter, compounds (H-101) to (H-104) used in Comparative Examples 1 to 4 will be described.

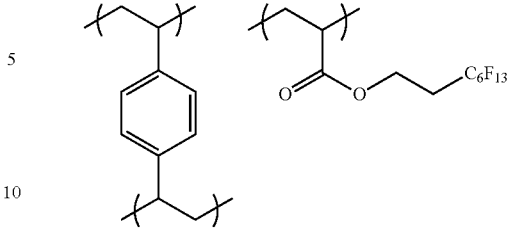

Comparative Example Compound (H-102)

F-552: Commercially Available Fluorine-Based Surface Modifier (Product Name: MEGAFACE F-552, manufactured by DIC Corporation)

According to [0103] and [0120] of JP2006-016599A, a comparative example compound H-103 described below was synthesized.

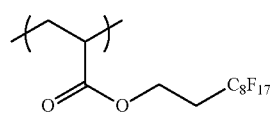 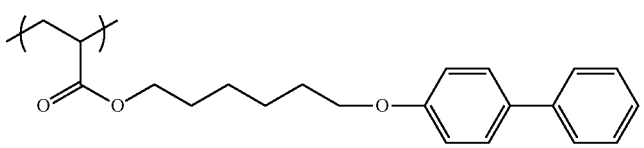

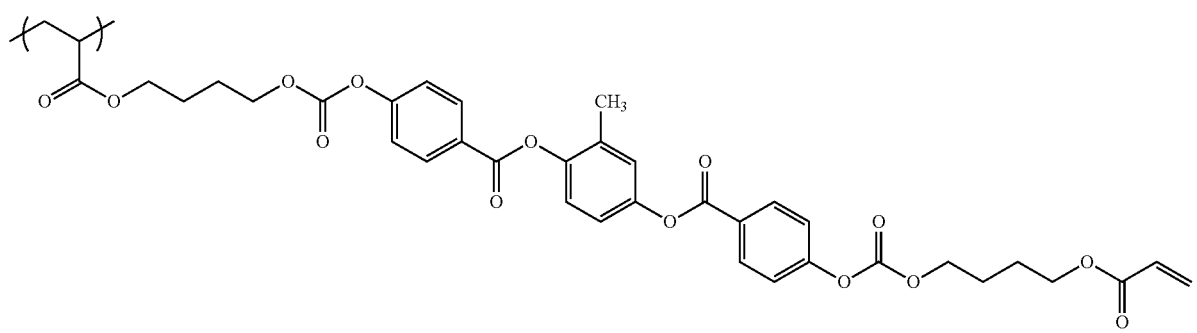

(Preparation of Comparative Example Coating Liquids CH1 to CH4)

Comparative example coating liquids CH1 to CH4 were prepared by the same prescription as that of the coating liquid C1 except that H-101 to H-104 were used instead of the polymer 101, and the added amount was changed as shown in Table 2.

Comparative Examples 1 to 4

Optical films were prepared by the same method as that in Example 1 except that CH1 to CH4 were used in the liquid crystal layer 2.

(Viscosity Measurement of Coating Liquid)

Viscosities of the coating liquids C1 to C12 and CH1 to CH4 were measured by using Vm-100 (a vibration type viscometer, manufactured by SEKONIC CORPORATION), and all of the viscosities were in a range of 1.5 to 10 mPa·s.

The prepared optical film was evaluated on the basis of the following standards. The evaluation results are shown in Table 2. In Table 2, a lower layer indicates the liquid crystal layer 1, and an upper layer indicates the liquid crystal layer 2.

<Cissing>

The number of cissings on a layer formed by using each composition was counted in 15 cm×20 cm of the film of each of the examples and the comparative examples. Here, a region on the surface of the lower layer in which the upper layer is not formed was regarded as the cissing. According to the results, evaluation was performed on the basis of the following standards. In a case of an evaluation standard A or B, a production efficiency is excellent, and the optical film can be preferably used, and the evaluation standard A is more preferable.

A: The number of cissings is less than or equal to 1
B: The number of cissings is 1 to 3
C: The number of cissings is 4 to 9
D: The number of cissings is greater than 10

<Surface Conditions>

The surface conditions of the layer after being applied were visually confirmed. Any one of evaluation standards A to C is preferable. In a case of the evaluation standard A or B, a production efficiency is excellent, and the optical film can be preferably used, and the evaluation standard A is more preferable.

A: Surface conditions have no drying unevenness or wrinkle
B: Drying unevenness is slightly observed, but the optical film can be used without any problem
C: Drying unevenness or concavities and convexities are frequently observed compared to B, but the optical film can be used without any problem
D: Apparent concavities and convexities due to drying unevenness are observed, and the optical film is not preferably used <Orientation>

Relative merits and demerits of liquid crystal orientation were determined on the basis of the following standards according to the presence or absence of an orientation defect at the time of observing the film by using a polarization microscope. Any one of evaluation standards A to C is preferable. In a case of the evaluation standard A or B, a production efficiency is excellent, and the optical film can be preferably used, and the evaluation standard A is more preferable.

A: An orientation defect is not observed
B: An orientation defect is rarely observed
C: An orientation defect slightly observed in a part of the film
D: An orientation defect is observed on the entire film <<Liquid Crystal Display Device>>

The liquid crystal display device of the present invention was obtained by disassembling a commercially available liquid crystal display device (Product Name "TH-L42D2", manufactured by Panasonic Corporation), and by changing a brightness enhancement film disposed in a backlight unit to the optical film of the present invention, and the performance of the liquid crystal display device of the present invention was excellent.

TABLE 2

| | | Coating Liquid | | | Polymer | | Double Bond | Performance | | |
|---|---|---|---|---|---|---|---|---|---|---|
| | Support | λ/4 layer | Lower Layer | Upper Layer | Type | Added Amount (Parts by Mass) | Residual Ratio (mol %) | Cissing | Surface Conditions | Orientation |
| Example 1 | TD40UL | A1 | B1 | C1 | 101 | 0.25 | 0 | A | A | A |
| Example 2 | TD40UL | A1 | B1 | C2 | 102 | 0.25 | 0 | A | A | A |
| Example 3 | TD40UL | A1 | B1 | C3 | 103 | 0.25 | 0 | A | A | A |
| Example 4 | TD40UL | A1 | B1 | C4 | 104 | 0.25 | 0 | A | A | A |
| Example 5 | TD40UL | A1 | B1 | C5 | 105 | 0.2 | 0 | A | A | A |
| Example 6 | TD40UL | A1 | B1 | C6 | 106 | 0.3 | 0 | A | A | A |
| Example 7 | TD40UL | A1 | B1 | C7 | 107 | 0.4 | 0 | A | A | A |
| Example 8 | TD40UL | A1 | B1 | C8 | 108 | 0.3 | 0 | A | A | A |
| Example 9 | TD40UL | A1 | B1 | C9 | 109 | 0.25 | 0 | A | C | B |
| Example 10 | TD40UL | A1 | B1 | C10 | 110 | 0.25 | 0 | A | B | A |
| Example 11 | TD40UL | A1 | C1 | C1 | 101 | 0.12 | 0 | A | A | A |
| Example 12 | TD40UL | A1 | C1 | C1 | 101 | 0.25 | 0 | A | A | A |
| Example 13 | TD40UL | A1 | C1 | B2 | 101 | 0.05 | 0 | A | A | B |
| Example 14 | TD40UL | A1 | B1 | C1 | 101 | 0.01 | 0 | B | B | A |
| Example 15 | TD40UL | A1 | B1 | B2 | 101 | 0.05 | 0 | A | A | B |
| Example 16 | TD40UL | A1 | B1 | C1 | 101 | 0.05 | 0 | B | A | A |
| Example 17 | TD40UL | A1 | B1 | C2 | 102 | 0.03 | 0 | B | A | A |
| Example 18 | TD40UL | A1 | B1 | C3 | 103 | 0.45 | 0 | A | A | A |
| Example 19 | TD40UL | A1 | B1 | C1 | 101 | 0.4 | 0 | A | A | A |
| Example 20 | TD40UL | A1 | B1 | C3 | 103 | 0.01 | 0 | B | C | A |
| Example 21 | TD40UL | A2 | B3 | C11 | 111 | 0.17 | 0 | A | A | A |
| Example 22 | TD40UL | A1 | B1 | C12 | 112 | 0.2 | 50 | C | A | B |
| Comparative Example 1 | TD40UL | A1 | B1 | CH1 | H-101 | 0.25 | — | D | D | D |
| Comparative Example 2 | TD40UL | A1 | B1 | CH2 | H-102 | 0.3 | — | D | B | D |
| Comparative Example 3 | TD40UL | A1 | B1 | CH3 | H-103 | 0.2 | — | D | D | D |
| Comparative Example 4 | TD40UL | A1 | B1 | CH4 | H-104 | 0.3 | 100 | D | D | D |

As apparent from Table 2, in Examples 1 to 22 where the liquid crystal layer was formed by using the polymer of the present invention in the composition for preparing a liquid crystal layer, evaluation of higher than or equal to C could be obtained in all evaluation items of the cissing, the surface conditions, and the orientation. As apparent from Examples 1 to 10 and 14 to 22, in the evaluation of the cissing, evaluation of higher than or equal to C could be obtained even in a case of being laminated on the lower layer containing the fluorine-based surfactant. In addition, as apparent from Examples 11 and 12, the evaluation A could be obtained in all of the evaluation items even in a case of applying the composition containing the polymer of the present invention onto the lower layer containing the polymer of the present invention. In addition, as apparent from Example 13, evaluation of higher than or equal to B could be obtained in all of the evaluation items even in a case of applying the composition containing the fluorine-based surfactant onto the lower layer containing the polymer of the present invention.

Example 21 in which a double bond residual ratio was 0 mol % was excellent in the evaluation of the cis sing and the orientation, compared to Example 22 in which the double bond residual ratio was 50 mol %.

In contrast, Comparative Examples 1 and 2 in which a polymer not having a mesogenic group was contained, Comparative Example 3 in which only one polymerizable group was included, and Comparative Example 4 in which a double bond residual ratio was 100 mol % deteriorated in performance evaluation.

What is claimed is:

1. A branched polymer, comprising:
   (i) a mesogenic group-containing monomeric first component selected from the group consisting of a compound represented by General Formula (X) and a compound represented by General Formula (I),

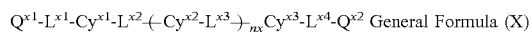
   $Q^{x1}\text{-}L^{x1}\text{-}Cy^{x1}\text{-}L^{x2}\text{-}(Cy^{x2}\text{-}L^{x3})_{nx}\text{-}Cy^{x3}\text{-}L^{x4}\text{-}Q^{x2}$    General Formula (X)

in the formula, $Q^{X1}$ and $Q^{X2}$ each independently represent a polymerizable group, $L^{X1}$ and $L^{X4}$ each independently represent a divalent linking group, $L^{X2}$ and $L^{X3}$ each independently represent a single bond or a divalent linking group, $Cy^{X1}$, $Cy^{X2}$, and $Cy^{X3}$ represent a divalent cyclic group, and nx represents an integer of 0 to 3, General Formula (I)

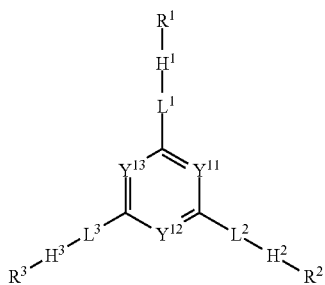

in General Formula (I), $Y^{11}$, $Y^{12}$ and $Y^{13}$ each independently represent a methine which may be substituted or a nitrogen atom, $L^1$, $L^2$, and $L^3$ each independently represent a single bond or a divalent linking group, $H^1$, $H^2$, and $H^3$ each independently represent General Formula (I-A) described below or General Formula (I-B) described below, and $R^1$, $R^2$, and $R^3$ each independently represent General Formula (I-R) described below, General Formula (I-A)

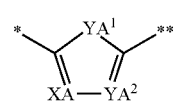

in General Formula (I-A), $YA^1$ and $YA^2$ each independently represent methine which may have a substituent or a nitrogen atom, XA represents an oxygen atom, a sulfur atom, methylene, or imino, * represents a bonding position with respect to an $L^1$ side to an $L^3$ side in General Formula (I) described above, and ** represents a bonding position with respect to an $R^1$ side to a $R^3$ side in General Formula (I) described above, General Formula (I-B)

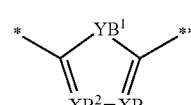

in General Formula (I-B), $YB^1$ and $YB^2$ each independently represent methine which may have a substituent or a nitrogen atom, XB represents an oxygen atom, a sulfur atom, methylene, or imino, * represents a bonding position with respect to an $L^1$ side to an $L^3$ side in General Formula (I) described above, and ** represents a bonding position with respect to an $R^1$ side to a $R^3$ side in General Formula (I) described above, and

*$\text{-}(L^{r1}\text{-}Q^2)_{n1}L^{r2}\text{-}L^{r3}\text{-}Q^1$    General Formula (I-R)

in General Formula (I-R), * represents a bonding position with respect to an $H^1$ side to an $H^3$ side in General Formula (I), $L^{r1}$ represents a single bond or a divalent linking group, $Q^2$ represents a divalent group having at least one type of cyclic structure, n1 represents an integer of 0 to 4, $L^{r2}$ and $L^{r3}$ each independently represent a divalent linking group, $Q^1$ represents a polymerizable group or a hydrogen atom, and here, at least two of a plurality of $Q^1$'s represent a polymerizable group; and (ii) a fluorine-containing monomeric second component represented by General Formula (a) described below, General Formula (a)

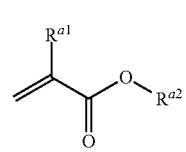

in General Formula (a), $R^{a1}$ represents a hydrogen atom or an alkyl group having 1 to 20 carbon atoms, and $R^{a2}$ represents an alkyl group having 1 to 20 carbon atoms or an alkenyl group having 1 to 20 carbon atoms in which at least one carbon atom has a fluorine atom as a substituent.

2. The branched polymer according to claim 1,
wherein a weight-average molecular weight of the polymer is 1,000 to 300,000 in terms of polystyrene by using a gel permeation chromatography.

3. A composition, comprising:
the branched polymer according to claim 1.

4. The composition according to claim 3, further comprising:
a liquid crystal compound.

5. The composition according to claim 4,
wherein the liquid crystal compound is a polymerizable liquid crystal compound.

6. The composition according to claim 5,
wherein the polymerizable liquid crystal compound comprises at least one polymerizable liquid crystal compound selected from a polymerizable rod-shaped liquid crystal compound or a polymerizable disk-shaped liquid crystal compound.

7. An optical film, comprising:
a cholesteric liquid crystal layer containing the branched polymer according to claim 1 on a support.

8. The optical film according to claim 7,
wherein the optical film has a laminated structure formed by laminating a plurality of the cholesteric liquid crystal layers.

9. The optical film according to claim 8,
wherein the plurality of cholesteric liquid crystal layers comprises at least one cholesteric liquid crystal layer containing a rod-shaped liquid crystal compound and at least one cholesteric liquid crystal layer containing a disk-shaped liquid crystal compound.

10. The optical film according to claim 9,
wherein the cholesteric liquid crystal layer containing the rod-shaped liquid crystal compound and the cholesteric liquid crystal layer containing the disk-shaped liquid crystal compound are in contact with each other.

11. A liquid crystal display device, comprising at least:
a backlight unit including the optical film according to claim 7; and
a liquid crystal cell.

\* \* \* \* \*